US007516086B2

(12) United States Patent  (10) Patent No.: US 7,516,086 B2
Chu et al.  (45) Date of Patent: Apr. 7, 2009

(54) BUSINESS RATING PLACEMENT HEURISTIC

(75) Inventors: Lester K. Chu, Southlake, TX (US); Edwin Y. Harada, Irving, TX (US); Douglas G. Heatherly, Coppell, TX (US)

(73) Assignee: Idearc Media Corp., DFW Airport, TX (US)

( * ) Notice: Subject to any disclaimer, the term of this patent is extended or adjusted under 35 U.S.C. 154(b) by 615 days.

(21) Appl. No.: 10/948,425

(22) Filed: Sep. 23, 2004

(65) Prior Publication Data
US 2005/0065811 A1      Mar. 24, 2005

Related U.S. Application Data

(63) Continuation-in-part of application No. 10/801,156, filed on Mar. 15, 2004, and a continuation-in-part of application No. 10/800,887, filed on Mar. 15, 2004, and a continuation-in-part of application No. 10/800,444, filed on Mar. 15, 2004, and a continuation-in-part of application No. 10/680,952, filed on Oct. 8, 2003, now Pat. No. 7,050,990.

(60) Provisional application No. 60/505,597, filed on Sep. 24, 2003.

(51) Int. Cl.
    *G06F 17/60*   (2006.01)
(52) U.S. Cl. .............................. 705/14; 705/1; 705/26; 705/37; 707/2; 707/3
(58) Field of Classification Search ...................... 705/1, 705/14, 26, 27
See application file for complete search history.

(56) References Cited

U.S. PATENT DOCUMENTS

| 4,532,554 A | 7/1985 | Skala |
| 4,546,382 A | 10/1985 | McKenna et al. |
| 4,602,279 A | 7/1986 | Freeman |
| 4,789,235 A | 12/1988 | Borah et al. |
| 4,850,007 A | 7/1989 | Marino et al. |
| 4,992,940 A | 2/1991 | Dworkin |

(Continued)

FOREIGN PATENT DOCUMENTS

JP       2003-233684       8/2003

(Continued)

OTHER PUBLICATIONS

Sherman, C. "Google introduces web directory using netscape's open directory project data," Information Today, vol. 17, No. 5, p. 14, May 200.*

(Continued)

*Primary Examiner*—Jeffrey A. Smith
*Assistant Examiner*—Jason B. Dunham
(74) *Attorney, Agent, or Firm*—Rader, Fishman & Grauer PLLC

(57) ABSTRACT

A system and method for distributing information (collectively the "system") is disclosed. The system includes category-based, geography-based, and ratings-based attributes to better "focus" the information distributed by the system. In the processing of listing-based attributes (e.g. attributes limited to a particular listing), the system can also be influenced by relationship-based attributes (e.g. attributes between the administrator of the system and the advertisers, and even potentially users).

18 Claims, 53 Drawing Sheets

U.S. PATENT DOCUMENTS

| | | | |
|---|---|---|---|
| 5,144,663 | A | 9/1992 | Kudelski et al. |
| 5,155,591 | A | 10/1992 | Wachob |
| 5,162,989 | A | 11/1992 | Matsuda |
| 5,187,735 | A | 2/1993 | Herrero et al. |
| 5,220,501 | A | 6/1993 | Lawlor et al. |
| 5,231,494 | A | 7/1993 | Wachob |
| 5,237,157 | A | 8/1993 | Kaplan |
| 5,267,171 | A | 11/1993 | Suzuki et al. |
| 5,283,731 | A | 2/1994 | Lalonde et al. |
| 5,305,195 | A | 4/1994 | Murphy |
| 5,319,455 | A | 6/1994 | Hoarty et al. |
| 5,339,239 | A | 8/1994 | Manabe et al. |
| 5,347,632 | A | 9/1994 | Filepp |
| 5,359,508 | A | 10/1994 | Rossides |
| 5,408,417 | A | 4/1995 | Wilder |
| 5,410,344 | A | 4/1995 | Graves et al. |
| 5,446,919 | A | 8/1995 | Wilkins |
| 5,479,491 | A | 12/1995 | Herrero Garcia et al. |
| 5,502,636 | A | 3/1996 | Clarke |
| 5,515,098 | A | 5/1996 | Carles |
| 5,532,735 | A | 7/1996 | Blahut et al. |
| 5,636,346 | A | 6/1997 | Saxe |
| 5,659,732 | A | 8/1997 | Kirsch |
| 5,704,560 | A | 1/1998 | Wimmer |
| 5,717,923 | A | 2/1998 | Dedrick |
| 5,724,424 | A | 3/1998 | Gifford |
| 5,724,521 | A | 3/1998 | Dedrick |
| 5,724,524 | A | 3/1998 | Hunt et al. |
| 5,727,129 | A | 3/1998 | Barrett et al. |
| 5,740,549 | A | 4/1998 | Reilly |
| 5,748,954 | A | 5/1998 | Mauldin |
| 5,752,238 | A | 5/1998 | Dedrick |
| 5,758,257 | A | 5/1998 | Herz et al. |
| 5,758,258 | A | 5/1998 | Giovannoli |
| 5,768,521 | A | 6/1998 | Dedrick |
| 5,774,170 | A | 6/1998 | Hite et al. |
| 5,774,868 | A | 6/1998 | Cragun et al. |
| 5,781,632 | A | 7/1998 | Odom |
| 5,781,894 | A | 7/1998 | Petrecca et al. |
| 5,794,210 | A | 8/1998 | Goldhaber et al. |
| 5,826,241 | A | 10/1998 | Stein et al. |
| 5,835,896 | A | 11/1998 | Fisher et al. |
| 5,848,397 | A | 12/1998 | Marsh et al. |
| 5,848,407 | A | 12/1998 | Ishikawa et al. |
| 5,852,820 | A | 12/1998 | Burrows |
| 5,855,008 | A | 12/1998 | Goldhaber et al. |
| 5,864,845 | A | 1/1999 | Voorhees et al. |
| 5,864,846 | A | 1/1999 | Voorhees et al. |
| 5,903,882 | A | 5/1999 | Asay et al. |
| 5,905,975 | A | 5/1999 | Ausubel |
| 5,915,243 | A | 6/1999 | Smolen |
| 5,918,014 | A | 6/1999 | Robinson |
| 5,920,854 | A | 7/1999 | Kirsch et al. |
| 5,920,859 | A | 7/1999 | Li |
| 5,930,474 | A | 7/1999 | Dunworth et al. |
| 5,933,811 | A | 8/1999 | Angles et al. |
| 5,948,061 | A | 9/1999 | Merriman et al. |
| 5,974,398 | A | 10/1999 | Hanson et al. |
| 5,991,735 | A | 11/1999 | Gerace |
| 6,006,257 | A | 12/1999 | Slezak |
| 6,009,410 | A | 12/1999 | LeMole et al. |
| 6,023,686 | A | 2/2000 | Brown |
| 6,026,369 | A | 2/2000 | Capek |
| 6,055,510 | A | 4/2000 | Henrick et al. |
| 6,058,379 | A | 5/2000 | Odom et al. |
| 6,078,866 | A | 6/2000 | Buck et al. |
| 6,161,099 | A | 12/2000 | Harrington et al. |
| 6,253,189 | B1 | 6/2001 | Feezell et al. |
| 6,269,361 | B1 | 7/2001 | Davis et al. |
| 6,324,519 | B1 | 11/2001 | Eldering |
| 6,360,222 | B1 | 3/2002 | Quinn |
| 6,496,843 | B1 | 12/2002 | Getchius et al. |
| 6,560,620 | B1 | 5/2003 | Ching |
| 6,564,208 | B1 | 5/2003 | Littlefield et al. |
| 6,785,671 | B1 * | 8/2004 | Bailey et al. ................... 707/3 |
| 6,801,906 | B1 * | 10/2004 | Bates et al. ................... 707/3 |
| 6,826,559 | B1 | 11/2004 | Ponte |
| 6,868,525 | B1 * | 3/2005 | Szabo ........................ 715/738 |
| 7,031,961 | B2 * | 4/2006 | Pitkow et al. ................. 707/4 |
| 7,080,064 | B2 * | 7/2006 | Sundaresan .................... 707/3 |
| 7,089,237 | B2 * | 8/2006 | Turnbull et al. ................ 707/5 |
| 7,110,993 | B2 * | 9/2006 | Soulanille et al. ............. 707/3 |
| 7,206,778 | B2 * | 4/2007 | Bode et al. ..................... 707/5 |
| 7,231,358 | B2 * | 6/2007 | Singh et al. ................... 705/14 |
| 2001/0047354 | A1 * | 11/2001 | Davis et al. ................... 707/3 |
| 2003/0078991 | A1 | 4/2003 | Harris |
| 2003/0093482 | A1 * | 5/2003 | Watanabe et al. .......... 709/206 |
| 2003/0101126 | A1 | 5/2003 | Cheung et al. |
| 2003/0177076 | A1 * | 9/2003 | Might et al. .................. 705/28 |
| 2003/0177111 | A1 | 9/2003 | Egendorf et al. |
| 2003/0220918 | A1 | 11/2003 | Roy et al. |
| 2004/0006478 | A1 | 1/2004 | Alpdemir et al. |
| 2004/0023644 | A1 | 2/2004 | Montemer |
| 2004/0167845 | A1 | 8/2004 | Corn et al. |
| 2004/0249713 | A1 * | 12/2004 | Gross .......................... 705/14 |
| 2004/0260604 | A1 | 12/2004 | Bedingfield, Sr. |
| 2005/0004835 | A1 * | 1/2005 | Roslansky et al. ............ 705/14 |
| 2005/0015307 | A1 | 1/2005 | Simpson et al. |
| 2005/0021596 | A1 | 1/2005 | Do |
| 2005/0119957 | A1 * | 6/2005 | Faber et al. ................... 705/35 |
| 2005/0125307 | A1 * | 6/2005 | Hunt et al. ................... 705/26 |
| 2005/0246332 | A1 | 11/2005 | Wang |
| 2006/0190328 | A1 * | 8/2006 | Singh et al. ................... 705/14 |
| 2006/0282336 | A1 * | 12/2006 | Huang ......................... 705/26 |

FOREIGN PATENT DOCUMENTS

| | | |
|---|---|---|
| WO | WO 97/17774 | 5/1997 |
| WO | WO 98/28906 | 7/1998 |
| WO | WO 98/34189 | 8/1998 |
| WO | WO 99/20486 | 4/1999 |
| WO | WO 99/48028 | 9/1999 |
| WO | WO 00/04190 | 1/2000 |
| WO | WO 00/16218 | 3/2000 |

OTHER PUBLICATIONS

Pelline, "New search engine goes commercial" from http://news.cnet.com/news/0,10000,0-1005-200-326672,00.html, Feb. 18, 1998.

Haar, "Service To Let Ad Bids Dictate Search Rankings" from Tech InfoBase, Feb. 23, 1998.

McKenna, "New Search Engines GoTo Charges For Hits" from Tech InfoBase, Feb. 23, 1998.

Rich, "New Search Engine Allows Sites to Pay Their Way to Top" from http://www.adweek.com, Feb. 23, 1998.

Mardesh, "Search engine charges hit sites" from San Jose Mercury News, Feb. 21, 1998.

Swartz, "Browser Only Lists Paying Web Sites" from San Francisco Chronical, Feb. 21, 1998.

Riedman, "Search engine startup to auction listings" from Advertising Age, Feb. 23, 1998.

"Lycos Adds New Features, Reorganizes Suggested Links" from http://www.searchenginewatch.com/sereport/98/01-lycos.html, Jan. 9, 1998.

"Lycos Adds Predetermined Listings" from http://www.searchenginewatch.com/sereport/97/12-lycos.html, Dec. 4, 1997.

Pontin, "Gross Idea" from http://www.herring.com/story_redirect.asp?layout=story_generic&doc-id=RH640016664&ch..., Aug. 6, 2001.

Yahoo.com (as archived on archive.org).

Google.com (as archived on archive.org).

Superpages.com (as archived on archive.org).

Findwhat.com (as archived on archive.org).

Looksmart.com (as archived on archive.org).

MSN.com (as archived on archive.org).

Dogpile.com (as archived on archive.org).
WebCrawler.com (as archived on archive.org).
Internet Discussion Group, Aug. 7, 2001.
metacrawler.com (as archived on archive.org).
BellSouth_RealPages.com (as archived on archive.org).
SmartPages.com (as archived on archive.org).
qwestdex.com (as archived on archive.org).
business.com (as archived on archive.org).
Shopping.com (as archived on archive.org).
Citysearch.com (as archived on archive.org).
BizRate.com (as archived on archive.org).
Kuchinskas, S., "Attention, please," Brandwek, vol. 41, No. 3, pp. 56-60, Jan. 17, 2000.
Anon., "Digest (News Briefs)," New Media Age, 4, Mar. 16, 2000.
Webb, C.L., "Search Engine Resurgence," WashingtonPost.com, Feb. 19, 2003.
Maddox, K., "Slicing up IT Niches," BtoB, vol. 88, No. 6, p. 20, Jun. 9, 2003.
Examiner's Answer dated Jan. 11, 2008 in U.S. Appl. No. 10/800,444. (48 pages).
Final Office Action dated May 9, 2007 in U.S. Appl. No. 10/800,444. (32 pages).
Advisory Action dated Jul. 31, 2007 in U.S. Appl. No. 10/800,444. (3 pages).
Office Action dated Nov. 24, 2006 in U.S. Appl. No. 10/800,444. (32 pages).
Appeal Brief filed Oct. 5, 2007 in U.S. Appl. No. 10/800,444. (49 pages).
Examiner Interview Summary dated Jul. 10, 2007 in U.S. Appl. No. 10/800,444. (1 page).
Reply Brief filed Mar. 11, 2008 in U.S. Appl. No. 10/800,444. (21 pages).
Response to Final Office Action dated May 9, 2007 in U.S. Appl. No. 10/800,444. (18 pages).
Response to Non-Final Office Action dated Nov. 24, 2006 in U.S. Appl. No. 10/800,444. (14 pages).
Supplemental Appeal Brief filed Nov. 2, 2007 in U.S. Appl. No. 10/800,444. (50 pages).
Non-Final Office Action dated May 13, 2008 in U.S. Appl. No. 10/800,887. (8 pages).
Response to Non-Final Office Action dated May 13, 2008 in U.S. Appl. No. 10/800,887. (11 pages).
Non-Final Office Action dated May 11, 2005 in U.S. Appl. No. 10/680,952. (39 pages).
Response to Non-Final Office Action dated May 11, 2005 in U.S. Appl. No. 10/680,952. (17 pages).
Examiner's Statement on Notice of Allowance dated Oct. 11, 2005 in U.S. Appl. No. 10/680,952. (4 pages).
Examiner Interview Summary dated Jul. 19, 2005 in U.S. Appl. No. 10/680,952. (2 pages).
Appeal Brief filed Feb. 19, 2008 in U.S. Appl. No. 10/801,156. (49 pages).
Examiner's Answer dated Mar. 28, 2008 U.S. Appl. No. 10/801,156. (40 pages).
Examiner Interview Summary dated Jul. 10, 2007 in U.S. Appl. No. 10/801,156. (1 page).
Final Office Action dated Oct. 22, 2007 in U.S. Appl. No. 10/801,156. (31 pages).
Non-Final Office Action dated Apr. 19, 2007 in U.S. Appl. No. 10/801,156. (31 pages).
Reply Brief filed May 9, 2008 in U.S. Appl. No. 10/801,156. (17 pages).
Response to Non-Final Office Action dated Apr. 19, 2007 in U.S. Appl. No. 10/801,156. (17 pages).
Response to Restriction Requirement dated Jan. 8, 2007 in U.S. Appl. No. 10/801,156. (3 pages).
Restriction Requirement dated Jan. 8, 2007 in U.S. Appl. No. 10/801,156. (5 pages).
Final Office Action dated Sep. 4, 2008 in U.S. Appl. No. 11/340,647. (29 pages).
Response to Final Office Action dated Sep. 4, 2008 in U.S. Appl. No. 11/340,647. (24 pages).
Non-Final Office Action dated Nov. 3, 2008 in U.S. Appl. No. 10/800,887. (22 pages).
Response to Non-Final Office Action dated Nov. 03, 2008 in U.S. Appl. No. 10/800,887. (17 pages).

* cited by examiner

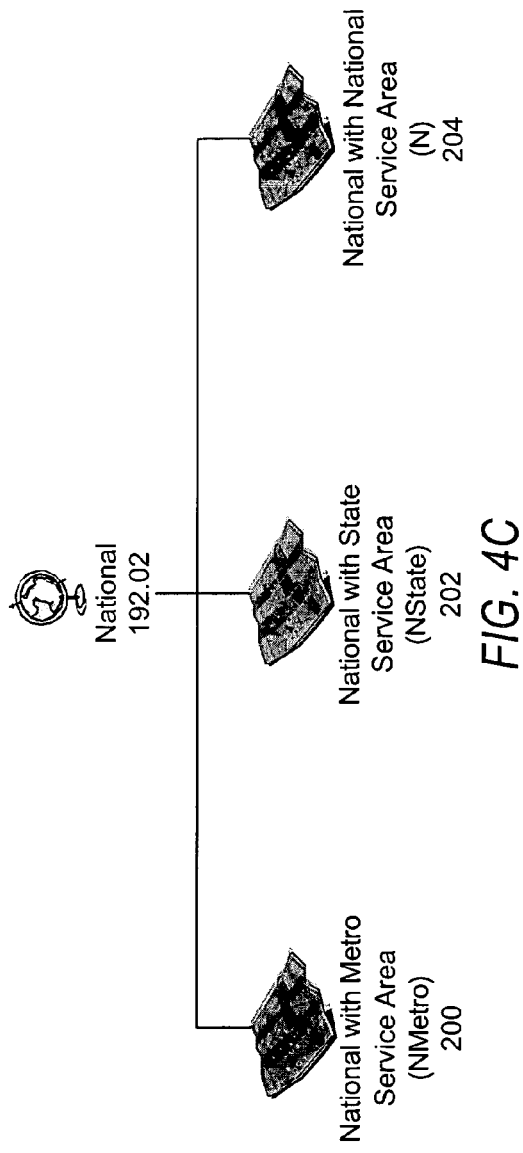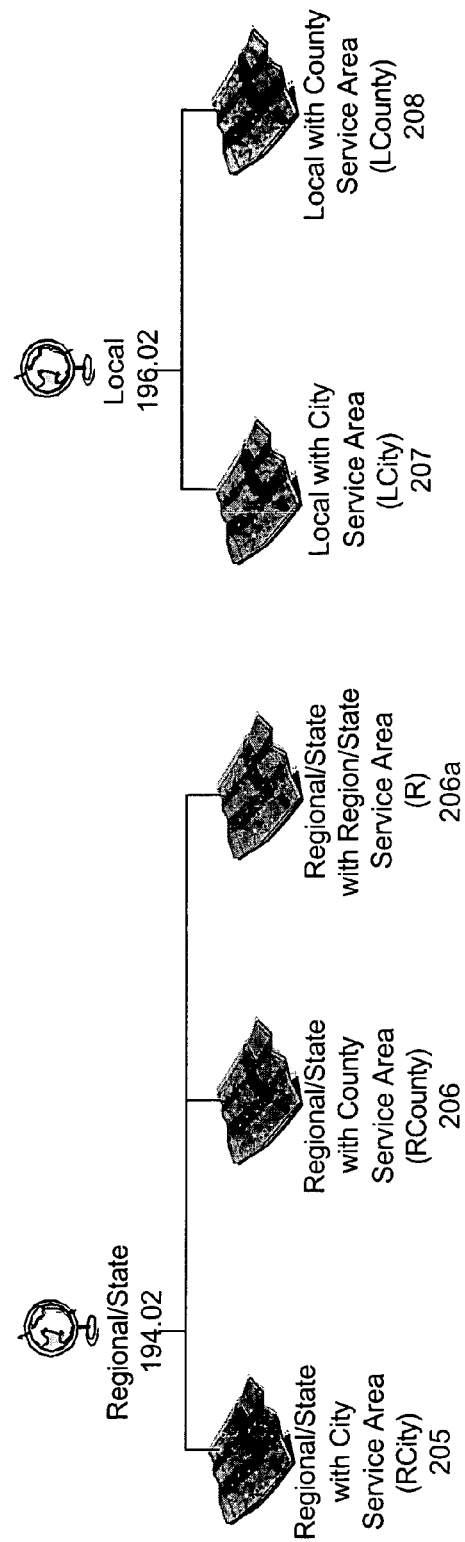

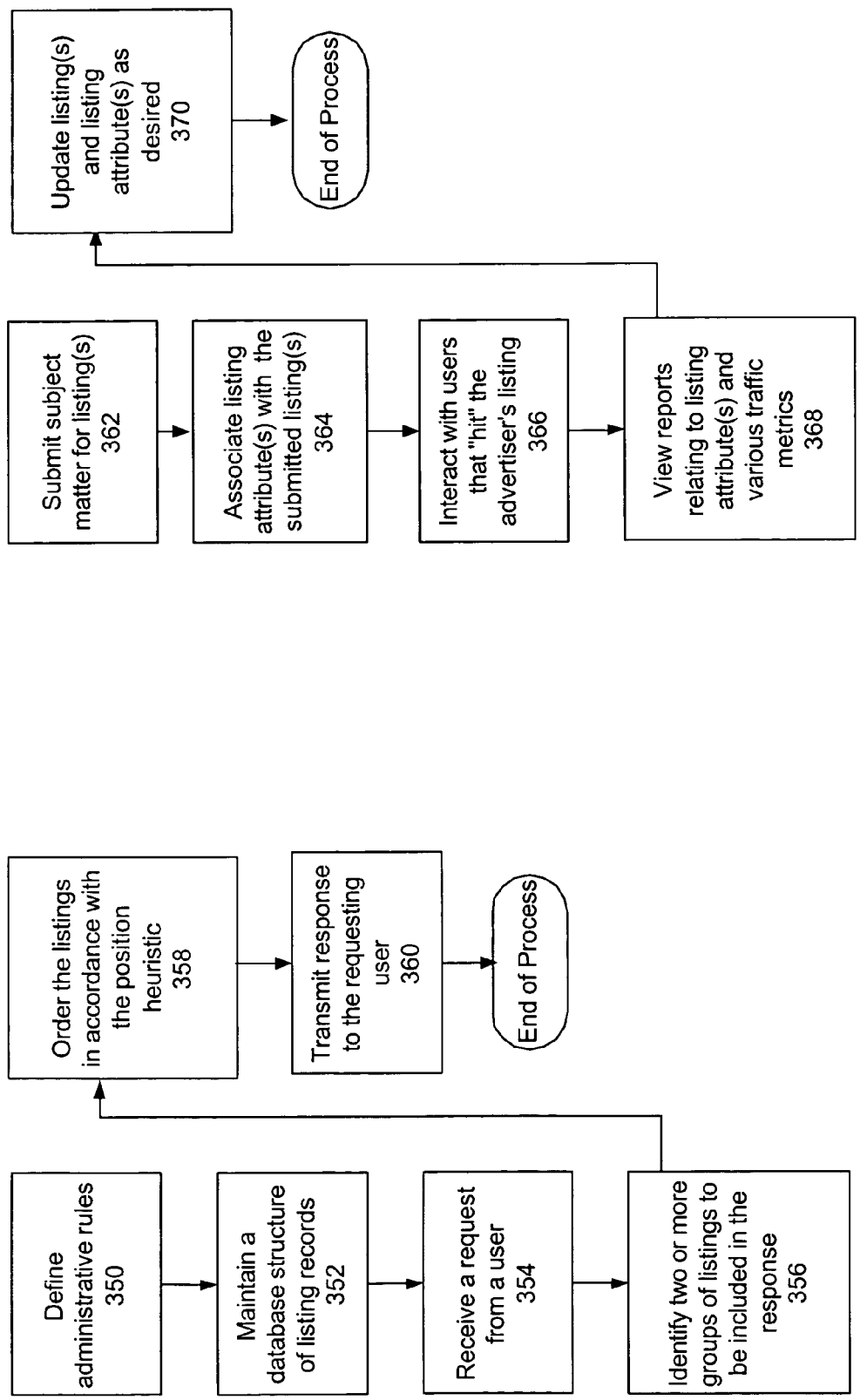

SUPERPAGES
SEARCH FOR PRODUCTS AND SERVICES
COMPARE MERCHANTS AND MERCHANDISE
BUY FROM LOCAL OR ONLINE BUSINESSES

Consumers | Merchants

Consumers

My Saved Information
Help / Customer Service

Look at the Bid page for Merchants.
Click on the MERCHANTS tab.

Product, Brand, Service

OR, Enter Business Name

City: (optional)   State: (optional)   Zip: (optional)

[Find It]

Advanced Search
Help

Popular Products

Cars
New Cars, Used Cars, more...

Electronics
Digital Cameras, DVD Players, Camcorders, Desktops, Notebooks, PDA's, more...

Flowers & Gifts
Wine, Flowers & Plants, more...

Jewelry & Watches
Earrings, Watches, more...

Sports & Fitness
Golf Clubs, Tents, more...

Toys & Video Games
Action Figures, PS2 Games, Barbie, more...

Popular Services

Home Services
Electrician, Landscaping, Exterminator, Contracting, Plumbing, Cleaning Services, more...

Personal Services
Dry-cleaning, Beauty, Personal Concierge, more...

Professional Services
Legal, Accounting, Real Estate, Catering, more...

Small Business
Distribution, Marketing, Bookkeeping, more...

Travel
Hotels, Car Rentals, Flights, Cruises, Trains, Travel Agents, more...

Copyright © 2003 All rights reserved.
about | privacy | terms and conditions

*FIG. 20*

SUPERPAGES
SEARCH FOR PRODUCTS AND SERVICES
COMPARE MERCHANTS AND MERCHANDISE
BUY FROM LOCAL OR ONLINE BUSINESSES

Consumers | Merchants

Consumers

My Saved Information

Help / Customer Service

Product, Brand, Service

Furniture is entered into Product - Brand - Service field.
No City, State or Zip is entered (all optional).
Click the FIND IT button to continue. Click on the SuperPages logo on any page to return to this start page.

[Furniture]

OR: Enter Business Name

[          ]

City: (optional)    State: (optional)   Zip: (optional)
[        ]          [        ]          [        ]

[Find It]

Advanced Search
Help

Popular Products

Cars
New Cars, Used Cars, more...

Electronics
Digital Cameras, DVD Players, Camcorders, Desktops, Notebooks, PDA's, more...

Flowers & Gifts
Wine, Flowers & Plants, more...

Jewelry & Watches
Earrings, Watches, more...

Sports & Fitness
Golf Clubs, Tents, more...

Toys & Video Games
Action Figures, PS2 Games, Barbie, more...

Popular Services

Home Services
Electrician, Landscaping, Exterminator, Contracting, Plumbing, Cleaning Services, more...

Personal Services
Dry-cleaning, Beauty, Personal Concierge, more...

Professional Services
Legal, Accounting, Real Estate, Catering, more...

Small Business
Distribution, Marketing, Bookkeeping, more...

Travel
Hotels, Car Rentals, Flights, Cruises, Trains, Travel Agents, more...

Copyright © 2003. All rights reserved.
about | privacy | terms and conditions

*FIG. 21*

SUPERPAGES

Consumers | Merchants

Furniture is entered into Product, Brand, Service field. White Plains, NY is entered for a City / State location. Click the FIND IT button to continue.

Consumers

My Saved Information
Help / Customer Service

Product, Brand, Service

Furniture

OR, Enter Business Name

City: (optional)  State: (optional)  Zip: (optional)
White Plains    NY

[Find It]

Advanced Search
Help

Popular Products

Cars
New Cars, Used Cars, more...

Electronics
Digital Cameras, DVD Players, Camcorders, Desktops, Notebooks, PDA's, more...

Flowers & Gifts
Wine, Flowers & Plants, more...

Jewelry & Watches
Earrings, Watches, more...

Sports & Fitness
Golf Clubs, Tents, more...

Toys & Video Games
Action Figures, PS2 Games, Barbie, more...

Popular Services

Home Services
Electrician, Landscaping, Exterminator, Contracting, Plumbing, Cleaning Services, more...

Personal Services
Drycleaning, Beauty, Personal Concierge, more...

Professional Services
Legal, Accounting, Real Estate, Catering, more...

Small Business
Distribution, Marketing, Bookkeeping, more...

Travel
Hotels, Car Rentals, Flights, Cruises, Trains, Travel Agents, more...

Copyrights 2003, All rights reserved
about | privacy | terms and conditions

*FIG. 22*

SUPERPAGES
SEARCH FOR PRODUCTS AND SERVICES
COMPARE MERCHANTS AND MERCHANDISE
BUY FROM LOCAL OR ONLINE BUSINESSES

This is the Furniture Products and Services page.
Make a selection within the products or services category.
Click the ROOM ACCESSORIES link to continue.

| Consumers | Merchants |

Change Search

Search within results:

Product, Brand, Service
[        ]

City: (optional)
[        ]

State: (optional)  Zip: (optional)
[        ]   [        ]

New Search    [Find It]

Results: Home > Furniture

Products:
Antique
Baby
Bedroom Sets
Desks / Tables
Lighting
Mirrors
Room Accessories
Rugs
Seating
Shelves / Stands
Storage

Services:
Antique Furniture Refinishing
Furniture Cleaning
Furniture Dealers Showrooms
Furniture Movers
Furniture Renting & Leasing
Furniture Repair, Refinish & Restore
Upholstery Cleaners

Furniture Direct
Ship Nationwide In Home Delivery
Discounting Name Brand Furniture

Home Furniture
Buy Brand Name Furniture at
Incredible Prices directly from NC

Eco-Furniture.com
Wide Selection of Beds, Mattresses,
Dressers, Futons, Accessories, etc.

Furniture
Compare Prices at over 2000 Stores
Find the best deals at BizRate.com!

How to...
Accessorize Your Home
Arrange Furniture
Balance, Scale and Proportion
Liven Up Your Room with Texture
Styles and Design
Universal Design-Furniture Copyright © 2003 All rights reserved.
about | privacy | terms and conditions

*FIG. 23*

SUPERPAGES
SEARCH FOR PRODUCTS AND SERVICES
COMPARE MERCHANT'S AND MERCHANDISE
BUY FROM LOCAL OR ONLINE BUSINESSES

Consumers | Merchants

This is the Room Accessories listings page.
Note that only National Sponsors are listed.
Search within a specific area. Enter White Plains, NY.
Click the FIND IT button to continue.

Change Search
Search within results:
Product, Brand, Service
[                    ]
City: (optional)
[White Plains       ]
State: (optional) Zip: (optional)
[NY]  [      ]
New Search    [Find It]

Home > Furniture > Room Accessories

National Sponsors

Shopping for Room Accessories? Save at HomeCenter.com!
http://www.homecenter.com    Choose lamps, artwork, vases, bookends & more.

West Coast Furnishings
www.westcoastfurnishings.com  Quality Furniture/Wholesale Prices Save 50%-75%  Service!

Save at HomeDecorator.com. HUGE selection. LOW prices.
http://www.homedecorator.com    Accent your room with the perfect accessory more...

What would you like to do?

- Perform research on Room Accessories?
- Find Room Accessories products?
- Find local Room Accessories businesses?
- Purchase Room Accessories online?

Related Services
Home Decorators
Home Improvement
Home Loans
Financing
Fixtures
Remodeling
Research Kitchens

Matching Categories:
Hardware
Home Appliances
Home Improvement
Interior Decorators Sponsored Links

Accessories
Find the best deal! Compare prices
on all products from across the web
www.mysimon.com

Discount Accessories
Good deals on your accessory needs
Save now on all products! Affiliate
www.ebay.com more like these...

Copyright © 2003 All rights reserved.
about | privacy | terms and conditions

*FIG. 24*

SUPERPAGES
SEARCH FOR PRODUCTS AND SERVICES
COMPARE MERCHANTS AND MERCHANDISE
BUY FROM LOCAL OR ONLINE BUSINESSES

Consumers | Merchants

This is the Antiques results page within Furniture in White Plains, NY.
To continue, click the HOME link in the breadcrumbs.

Change Search

Search within results:

Product, Brand, Service
[          ]

City: (optional)
[          ]

State: (optional)   Zip: (optional)
[     ]            [     ]

NewSearch          [Find It]

Refine Search

Choose sub-topic
Features/Specialties

Chairs
Desks
Lighting
Tables

[Submit]

Results: Home > Furniture in White Plains, NY > Antiques

National/Regional Sponsors

Orchard Park AntiqueMall
Antiques and collectibles  Over 600 dealers
opantiquemall.com

Local Sponsors

Old & New Shop                                              Financing Available
Museum Quality Restoration                                  Closed Sundays
1240 Bassett Ave, Bronx, NY 10461
phone | more info | map | email                             ☐ compare Alessandro Danny Ltd                                        Since 1983
Specialty: Antique Fireplace Mantles/Accessories            By Appt. Only
223 East 59th Street, New York, NY 10022
phone | more info | map | email                             ☐ compare Russo Galleries Inc.                                        Since 1953
Free Appraisals, Auction & Clean Out Services               M-F 9-6, Sat 10-2
3000 Middletown Rd, Bronx, NY 10461
phone | more info | map | email                             ☐ compare Compare two or more businesses side-by-side.    [Compare]

Sponsored Links

Antiques on Ruby Lane
Hundreds of antique shops online
Thousands of unique items for sale

GoAntiques
Search our virtual warehouse of
antiques from around the world.

Antiques on eBay
Great selection of Antiques.
Check out the deals now! affiliate

Old And Sold Antiques
On-line auction service
for antiques and collectibles!

antiques and furnitures
auction of antiques, furnitures,
weapons. Catalogs online more like these...

*FIG. 25A*

Compare two or more businesses side-by-side. [Compare]

Related Services

Custom Made
Furniture - Home
Furniture - Office
Furniture - Outdoor

Premium Listings more like these...

C & C Austion Gallery
3356 Garden Brook Drive, White Plains, NY 10461
phone | more info | map | email Member NFRA
MasterCard and Visa ☐ compare 14th Street Gallery Inc.
315 14th Street, White Plains, NY 10461
phone | more info | map | email ☐ compare Compare two or more businesses side-by-side. [Compare]

All Listings

Alexis Miscellaneous
735 North Westmoreland Rd, White Plains, NY 10461
phone | map | add to My Directory Since 1990
M-F 10-6, Sat 8-3

☐ compare

Ambience Interiors Inc
14213 Proton Road, White Plains, NY 10461
phone | map | add to My Directory M-F 9-7, Sat 11-7
Check or Credit Card ☐ compare

*FIG. 25B*

SUPERPAGES
SEARCH FOR PRODUCTS AND SERVICES
COMPARE MERCHANTS AND MERCHANDISE
BUY FROM LOCAL OR ONLINE BUSINESSES

| Consumers | Merchants |

This is the "Furniture in White Plains, NY" listings page.
Note that National and Local Sponsors, Premium Listings and All Listings are shown.
Click HOME within the breadcrumbs to continue.

Change Search
Search within results:
Product, Brand, Service
[          ]

City: (optional)
[          ]

State: (optional)  Zip: (optional)
[     ]  [     ]

New Search   Find It

Results: Home > Furniture in White Plains, NY

National/Regional Sponsors

Bedroom Furniture
Contemporary, Modern & Traditional Huge Selection, Fast Delivery
www.bedroomfurniture.com | phone | email

Home & Office Furniture on eBay
eBay Furniture: Buy or Sell Here
www.eBay.com | phone | email

Huge Selection of High Quality Furniture
Save 30-50% - 12 Months Same as Cash - SHOP Now!
www.FurnitureFind.com | phone | email

*CLICK HERE!* more like these

Local Sponsors

Mulberry Street Furniture
30,000 sq ft Showroom, Free Delivery
113 Parsons Ave S, White Plains, NY 10461
phone | more info | map | email Financing Available
Member of BBB
M-F 9-6, Sat 10-2

☐ compare

Freedman's Furniture
Modern, Contemporary, Traditional
3935 W Cypress, Bronx, NY 10461
phone | more info | map | email FREEDMANS
furniture ☐ compare

Refurbished Furniture
Gently Used and Antique Furniture
1212 39th St N, White Plains, NY 10461
phone | more info | map | email Home Furnishings
Accessories
Closed Sundays ☐ compare   Compare

Refine Search
Choose sub-topic:
Features/Specialties
- Bedroom
- Chairs
- Lighting
- Living Room

Brands
- Ashley
- Bassett
- Broyhill
- Eckhart

Submit

Related Services

Sponsored Links

Sears Furniture & Appliance
Shop online for furniture, home improvement, and appliances

The Home Depot
Electrical, hardware, tools, plumbing, and landscaping!

Lowes
25,000+ home improvement products online! Shop now and SAVE

Bill's Remodeling
In the area for over 15 years
References available

Custom Furniture
Serving the Area
References available more like these

Compare two or more businesses side-by-side.

*FIG. 26A*

| Related Services |
|---|
| Antiques |
| Custom Made |
| Furniture - Home |
| Furniture - Office |
| Furniture - Outdoor |

Compare two or more businesses side-by-side. [ Compare ]

Premium Listings                                                      more like these...

A Affordable Billiards                                                    CLICK HERE
536 Main Street, White Plains, NY 10461
phone | more info | map | email                                           ☐ compare Omnia Leather Gallery                                                     M-F 9-7, Sat 11-7
3356 Garden Brook Drive, White Plains, NY 10461                           Member NFRA
phone | more info | map | email                                           MasterCard and Visa
                                                                          ☐ compare Advance Furniture                                                         Member NFRA
326 West 52nd Street, White Plains, NY 10461                              Since 1980
phone | more info | map | email                                           M-F 10-6, Sat 8-3
                                                                          ☐ compare Bargain Town
4350 Gannon Lane, White Plains, NY 10461
phone | more info | map | email                                           ☐ compare Amish Furniture Farmside Village
Secure Online Catalog Of Lawn/Garden Furniture
phone | more info | map | email                                           ☐ compare Compare two or more businesses side-by-side. [ Compare ]

All Listings

Alexis Miscellaneous                                                      Member NFRA
735 North Westmoreland Rd, White Plains, NY 10461                         Since 1990
phone | map | add to My Directory                                         M-F 10-6, Sat 8-3
                                                                          ☐ compare Ambience Interiors Inc                                                    M-F 9-7, Sat 11-7
14213 Proton Road, White Plains, NY 10461                                 Check or Credit Card
phone | map | add to My Directory                                         ☐ compare

*FIG. 26B*

SUPERPAGES
SEARCH FOR PRODUCTS AND SERVICES
COMPARE MERCHANTS AND MERCHANDISE
BUY FROM LOCAL OR ONLINE BUSINESSES

Choose "Antiques" in the Related Services area located in the left sidebar.
To continue, click the ANTIQUES link.

[ Consumers | Merchants ]

Change Search
Search within results:
Product, Brand, Service
[           ]
City: (optional)
[           ]
State: (optional) Zip: (optional)
[     ] [     ]
New Search    [Find It]

Refine Search
Choose sub-topic
Features/Specialties
Bedroom
Chairs
Lighting
Living Room
Brands
Ashley
Bassett
Broyhill
Eckhart
[Submit]

Related Services

Results: Home > Furniture in White Plains, NY

National/Regional Sponsors

Bedroom Furniture
Contemporary, Modern & Traditional Huge Selection, Fast Delivery
www.bedroomfurniture.com | phone | email Home & Office Furniture on eBay
eBay Furniture: Buy or Sell Here
www.eBay.com | phone | email Huge Selection of High Quality Furniture
Save 30-50% - 12 Months Same as Cash - SHOP Now!
www.FurnitureFind.com | phone | email

*CLICK HERE!* more like these...

Local Sponsors

Mulberry Street Furniture                              Financing Available
30,000 sq ft Showroom, Free Delivery                   Member of BBB
113 Parsons Ave S, White Plains, NY 10461              M-F 9-6, Sat 10-2
phone | more info | map | email          ☐ compare Freedman's Furniture                                   FREEDMANS
Modern, Contemporary, Traditional                      furniture
3935 W Cypress, Bronx, NY 10461
phone | more info | map | email          ☐ compare Refurbished Furniture                                  Home Furnishings
Gently Used and Antique Furniture                      Accessories
1212 39th St N, White Plains, NY 10461                 Closed Sundays
phone | more info | map | email          ☐ compare Compare two or more businesses side-by-side.   [Compare]

Sponsored Links

Sears Furniture & Appliance
Shop online for furniture, home improvement, and appliances The Home Depot
Electrical, hardware, tools, plumbing, and landscaping!

Lowes
25,000+ home improvement products online! Shop now and SAVE

Bill's Remodeling
In the area for over 15 years
References available

Custom Furniture
Serving the Area
References available more like these...

*FIG. 27A*

| Related Services |
|---|
Antiques
Custom Made
Furniture - Home
Furniture - Office
Furniture - Outdoor Compare two or more businesses side-by-side. [Compare]

Premium Listings
more like these...

A Affordable Billiards　　　　　　　　　　　　CLICK HERE
536 Main Street, White Plains, NY 10461
phone | more info | map | email　　　　　　　　☐ compare

Omnia Leather Gallery　　　　　　　　　　　　M-F 9-7, Sat 11-7
3356 Garden Brook Drive, White Plains, NY 10461　Member NFRA
phone | more info | map | email　　　　　　　　MasterCard and Visa
　　　　　　　　　　　　　　　　　　　　　　　☐ compare

Advance Furniture　　　　　　　　　　　　　Member NFRA
326 West 52nd Street, White Plains, NY 10461　Since 1980
phone | more info | map | email　　　　　　　M-F 10-6, Sat 8-3
　　　　　　　　　　　　　　　　　　　　　　☐ compare

Bargain Town
4350 Gannon Lane, White Plains, NY 10461
phone | more info | map | email　　　　　　　☐ compare

Amish Furniture Farmside Villiage
Secure Online Catalog Of Lawn/Garden Furniture
phone | more info | map | email　　　　　　　☐ compare Compare two or more businesses side-by-side. [Compare]

All Listings

Alexis Miscellaneous　　　　　　　　　　　Member NFRA
735 North Westmoreland Rd, White Plains, NY 10461　Since 1990
phone | map | add to My Directory　　　　　　M-F 10-6, Sat 8-3
　　　　　　　　　　　　　　　　　　　　　　☐ compare

Ambience Interiors Inc　　　　　　　　　　M-F 9-7, Sat 11-7
14213 Proton Road, White Plains, NY 10461　　Check or Credit Card
phone | map | add to My Directory　　　　　　☐ compare

Compare two or more businesses side-by-side. Compare

Related Services

Antiques
Custom Made
Furniture - Home
Furniture - Office
Furniture - Outdoor

Premium Listings more like these...

A Affordable Billiards
536 Main Street, White Plains, NY 10461
phone | more info | map | email

*CLICK HERE*
☐ compare

Omnia Leather Gallery
3356 Garden Brook Drive, White Plains, NY 10461
phone | more info | map | email M-F 9-7, Sat 11-7
Member NFRA
MasterCard and Visa
☐ compare

Advance Furniture
325 West 52nd Street, White Plains, NY 10461
phone | more info | map | email Member NFRA
Since 1980
M-F 10-6, Sat 8-3
☐ compare

Bargain Town
4350 Gannon Lane, White Plains, NY 10461
phone | more info | map | email ☐ compare

Amish Furniture Farmside Village
Secure Online Catalog Of Lawn/Garden Furniture
phone | more info | map | email ☐ compare Compare two or more businesses side-by-side. Compare

All Listings

Alexis Miscellaneous
735 North Westmoreland Rd, White Plains, NY 10461
phone | map | add to My Directory Member NFRA
Since 1990
M-F 10-6, Sat 8-3
☐ compare

Ambience Interiors Inc
14213 Proton Road, White Plains, NY 10461
phone | map | add to My Directory M-F 9-7, Sat 11-7
Check or Credit Card
☐ compare

*FIG. 28B*

SUPERPAGES
SEARCH FOR PRODUCTS AND SERVICES
COMPARE MERCHANTS AND MERCHANDISE
BUY FROM LOCAL OR ONLINE BUSINESSES

| Consumers | Merchants |

Change Search

Search within results:

Product, Brand, Service

City: (optional)

State: (optional) Zip: (optional)

New Search        Find It

Refine Search

Choose sub-topic:
Features/Specialties
- Bedroom
- Chairs
- Lighting
- Living Room

Brands
- Ashley
- Bassett
- Broyhill
- Eckhart

Submit

Related Services

---

Choose "Living Room" in the Refine Search area located in the left sidebar.
To continue, click the SUBMIT button.

Results: Home > Furniture in White Plains, NY

National/Regional Sponsors

Bedroom Furniture
Contemporary, Modern & Traditional Huge Selection, Fast Delivery
www.bedroomfurniture.com | phone | email Home & Office Furniture on eBay
eBay Furniture: Buy or Sell Here
www.eBay.com | phone | email Huge Selection of High Quality Furniture
Save 30-50% - 12 Months Same as Cash - SHOP Now!
www.FurnitureFind.com | phone | email

*CLICK HERE!* more like these

Local Sponsors

Mulberry Street Furniture                    Financing Available
30,000 sq ft Showroom, Free Delivery         Member of BBB
113 Parsons Ave S, White Plains, NY 10461    M-F 9-5, Sat 10-2
phone | more info | map | email              ☐ compare Freedman's Furniture                         FREEDMANS
Modern, Contemporary, Traditional            furniture
3935 W Cypress, Bronx, NY 10461
phone | more info | map | email              ☐ compare Refurbished Furniture                        Home Furnishings
Gently Used and Antique Furniture            Accessories
1212 39th St N, White Plains, NY 10461       Closed Sundays
phone | more info | map | email              ☐ compare Compare two or more businesses side-by-side.   Compare

---

Sponsored Links

Sears Furniture & Appliance
Shop online for furniture, home improvement, and appliances The Home Depot
Electrical, hardware, tools, plumbing, and landscaping!

Lowes
25,000+ home improvement products online! Shop now and SAVE

Bill's Remodeling
In the area for over 15 years
References available

Custom Furniture
Serving the Area
References available more like these...

*FIG. 29A*

| Related Services |
|---|
| Antiques |
| Custom Made |
| Furniture - Home |
| Furniture - Office |
| Furniture - Outdoor |

Compare two or more businesses side-by-side. [Compare]

Premium Listings
more like these...

A Affordable Billiards  CLICK HERE
536 Main Street, White Plains, NY 10461
phone | more info | map | email
☐ compare

Omnia Leather Gallery
3356 Garden Brook Drive, White Plains, NY 10461
phone | more info | map | email
M-F 9-7, Sat 11-7
Member NFRA
MasterCard and Visa
☐ compare

Advance Furniture
326 West 52nd Street, White Plains, NY 10461
phone | more info | map | email
Member NFRA
Since 1980
M-F 10-6, Sat 8-3
☐ compare

Bargain Town
4350 Gannon Lane, White Plains, NY 10461
phone | more info | map | email
☐ compare

Amish Furniture Farmside Villiage
Secure Online Catalog Of Lawn/Garden Furniture
phone | more info | map | email
☐ compare Compare two or more businesses side-by-side. [Compare]

All Listings

Alexis Miscellaneous
735 North Westmoreland Rd, White Plains, NY 10461
phone | map | add to My Directory
Member NFRA
Since 1990
M-F 10-6, Sat 8-3
☐ compare

Ambience Interiors Inc
14213 Proton Road, White Plains, NY 10461
phone | map | add to My Directory
M-F 9-7, Sat 11-7
Check or Credit Card
☐ compare

*FIG. 29B*

SUPERPAGES
SEARCH FOR PRODUCTS AND SERVICES
COMPARE MERCHANTS AND MERCHANDISE
BUY FROM LOCAL OR ONLINE BUSINESSES

Consumers | Merchants

Change Search
Search within results:

Product, Brand, Service
[          ]

City: (optional)
[          ]

State: (optional) Zip: (optional)
[     ] [     ]

New Search   [Find It]

Refine Search
Choose sub-topic
Features/Specialties
- Bedroom
- Chairs
- Lighting
- Living Room

Brands
- Ashley
- Bassett
- Broyhill
- Eckhart

[Submit]

Related Services

---

This is the "Furniture in White Plains, NY" listings page.
Click on the PHONE link for Mulberry Street Furniture.
Close phone window.
Next, click the MORE INFO link.

Results: Home > Furniture in White Plains, NY

National/Regional Sponsors

Bedroom Furniture
Contemporary, Modern & Traditional Huge Selection, Fast Delivery
www.bedroomfurniture.com | phone | email

Home & Office Furniture on eBay
eBay Furniture: Buy or Sell Here
www.eBay.com | phone | email

Huge Selection of High Quality Furniture
Save 30-50% - 12 Months Same as Cash - SHOP NOW!
www.FurnitureFind.com | phone | email

*CLICK HERE!* more like these...

Local Sponsors

Mulberry Street Furniture
30,000 sq ft Showroom, Free Delivery
113 Parsons Ave S, White Plains, NY 10461
phone | more info | map | email Financing Available
Member of BBB
M-F 9-6, Sat 10-2

☐ compare

Freedman's Furniture
Modern, Contemporary, Traditional
3935 W Cypress, Bronx, NY 10461
phone | more info | map | email

FREEDMANS furniture

☐ compare

Refurbished Furniture
Gently Used and Antique Furniture
1212 39th St N, White Plains, NY 10461
phone | more info | map | email Home Furnishings
Accessories
Closed Sundays ☐ compare Compare two or more businesses side-by-side. [Compare]

Sponsored Links

Sears Furniture & Appliance
Shop online for furniture, home improvement, and appliances

The Home Depot
Electrical, hardware, tools, plumbing, and landscaping!

Lowes
25,000+ home improvement products online! Shop now and SAVE

Bill's Remodeling
In the area for over 15 years
References available

Custom Furniture
Serving the Area
References available more like these...

*FIG. 30A*

| Related Services |
| --- |
| Antiques |
| Custom Made |
| Furniture - Home |
| Furniture - Office |
| Furniture - Outdoor |

Compare two or more businesses side-by-side. [Compare]

Premium Listings more like these...

A Affordable Billiards
536 Main Street, White Plains, NY 10461
phone | more info | map | email

CLICK HERE

☐ compare

Omnia Leather Gallery
3356 Garden Brook Drive, White Plains, NY 10461
phone | more info | map | email M-F 9-7, Sat 11-7
Member NFRA
MasterCard and Visa
☐ compare

Advance Furniture
326 West 52nd Street, White Plains, NY 10461
phone | more info | map | email Member NFRA
Since 1980
M-F 10-6, Sat 8-3
☐ compare

Bargain Town
4350 Gannon Lane, White Plains, NY 10461
phone | more info | map | email ☐ compare

Amish Furniture Farmside Villiage
Secure Online Catalog Of Lawn/Garden Furniture
phone | more info | map | email ☐ compare Compare two or more businesses side-by-side. [Compare]

All Listings

Alexis Miscellaneous
735 North Westmoreland Rd, White Plains, NY 10461
phone | map | add to My Directory Member NFRA
Since 1990
M-F 10-6, Sat 8-3
☐ compare

Ambience Interiors Inc
14213 Proton Road, White Plains, NY 10461
phone | map | add to My Directory M-F 9-7, Sat 11-7
Check or Credit Card
☐ compare

*FIG. 30B*

SUPERPAGES
SEARCH FOR PRODUCTS AND SERVICES
COMPARE MERCHANTS AND MERCHANDISE
BUY FROM LOCAL OR ONLINE BUSINESSES

| Consumers | Merchants |

Change Search

This is the Living Room results pages within Furniture in White Plains, NY. Click the EMAIL link located under Corner Furniture. Close email window.
To continue, click the FURNITURE IN WHITE PLAINS, NY link.

Search within results:

Product, Brand, Service
[                    ]

City: (optional)
[                    ]

State: (optional)  Zip: (optional)
[        ]  [        ]

New Search   [ Find It ]

Results: Home > Furniture in White Plains, NY > Living Room

National/Regional Sponsors

Contemporary Furniture
Online shopping for contemporary office and home furnishings!
www.eurway.com

Living Room Furniture on eBay
eBay Furniture: Buy or Sell Here
www.eBay.com | phone | email

Huge Selection of High Quality Furniture
Save 30-50% - 12 Months Same as Cash - SHOP Now!
www.FurnitureFind.com | phone | email

*CLICK HERE!* more like these

Sponsored Links

BeHome Furniture
Savings for every room of your home
Quality, Selection, Service & Value

Living Room Furniture
Find Quality, Name Brand Furniture
Save 30-50% and get Free Delivery!

Furnitureland South
One million square feet of
home furnishings and accessories

Living Room Furniture
Shop for deals on Furniture here!
Simply Fast Savings

Oak Showcase - Arizona
Distinctive furniture for home and
office - Value, selection, service!

Local Sponsors

Erin's Furnishings
Quality Brand Name Furniture.
2556 White Plains Rd, Bronx, NY 10467
phone | more info | map | email Free Delivery
Financing Available
M-F 9-6, Sat 10-2
☐ compare

Refine Search

Choose sub-topic:
Features/Specialties
Chairs
Drapes
Entertainment Centers
Lighting

Brands
Ashley
Bassett
Broyhill
Eckhart

[ Submit ]

Corner Furniture Store
Traditional and Contemporary Living Room Furniture.
808 East 136 Street, Bronx, NY 10454
phone | more info | map | email 6 Months
Interest Free
Open 7 Days
☐ compare

All New York Furniture
Same Day Delivery No Problem
5035 Grand Concourse, Bronx, NY 10453
phone | more info | map | email Online Store
Since 1953
Closed Sundays
☐ compare Compare two or more businesses side-by-side.  [ Compare ]

Related Services

*FIG. 31A*

| Related Services |
| --- |
| Antiques |
| Custom Made |
| Furniture - Home |
| Furniture - Office |
| Furniture - Outdoor |

Compare two or more businesses side-by-side.　[ Compare ]

Premium Listings more like these...

Omnia Leather Gallery
3356 Garden Brook Drive, White Plains, NY 10461
phone | more info | map | email M-F 9-7, Sat 11-7
Member NFRA
MasterCard and Visa
☐ compare

Advance Furniture
326 West 52nd Street, White Plains, NY 10461
phone | more info | map | email Member NFRA
Since 1980
M-F 10-6, Sat 8-3
☐ compare

Bargain Town
4350 Gannon Lane, White Plains, NY 10461
phone | more info | map | email ☐ compare

Amish Furniture Farmside Villiage
Secure Online Catalog Of Lawn/Garden Furniture
phone | more info | map | email ☐ compare Compare two or more businesses side-by-side.　[ Compare ]

All Listings

Alexis Miscellaneous
735 North Westmoreland Rd, White Plains, NY 10461
phone | map | add to My Directory Member NFRA
Since 1990
M-F 10-6, Sat 8-3
☐ compare

Ambience Interiors Inc
14213 Proton Road, White Plains, NY 10461
phone | map | add to My Directory M-F 9-7, Sat 11-7
Check or Credit Card
☐ compare

SUPERPAGES
SEARCH FOR PRODUCTS AND SERVICES
COMPARE MERCHANTS AND MERCHANDISE
BUY FROM LOCAL OR ONLINE BUSINESSES

Advertiser Center    Consumers | Merchants

Here is the Report page for Mulberry Street Furniture.
Click the CONSUMERS tab to advance this demo to the
beginning page again.

Mulberry Street Furniture

Monthly Report    Area: White Plains, NY    Bid | Report

| | August 2003 | | | | | |
|---|---|---|---|---|---|---|
| Category | Maximum Cost-Per-Click | Average Position | # of Clicks Last 30 Days | Average Per Click | Average Total | |
| Furniture | $ .50 | 1.5 | 143 | $0.35 | $50.05 | change |
| Interior Decorating | $ .25 | 3.8 | 544 | $0.17 | $92.48 | change |
| Sofas | $ .50 | 2.6 | 73 | $0.32 | $23.36 | change |
| Overall | | | | | $166.05 | |

Maximum Monthly Budget: $ 600.00

Copyright © 2003 All rights reserved.
about | privacy | terms and conditions

*FIG. 34*

SUPERPAGES
SEARCH FOR PRODUCTS AND SERVICES
COMPARE MERCHANTS AND MERCHANDISE
BUY FROM LOCAL OR ONLINE BUSINESSES

| Consumers | Merchants |

This is the Mulberry St Furniture Fast Facts page.
Get Driving Directions.
Click on the GET DRIVING DIRECTIONS link or the MAP.

Results: Home > Furniture in White Plains, NY > Mulberry Street Furniture

What's Nearby

Save Listing

Print-Friendly Version

Fast Facts

Mulberry Street Furniture
113 Parsons Ave S, White Plains, NY 10461
(718) 988-5362   Call for Free

Additional Phone Numbers
Fax: (718) 988-5363
1-800-456-3498

Online
www.customcraft.com
email: info@customcraft.com

Appears in the Categories:
Cabinets
Kitchen Remodeling
Custom Cabinets

Products and Services Offered:
Cabinets custom built to your specifications

Specialties
Free design consultation

Get Driving Directions

Years in Business
Since 1975

Hours:
M-F 8:00-5:00

Methods of Payment
Visa, Mastercard, American Express, Checks

Commercial, Residential, Industrial

*FIG. 35A*

Brands:
Wilsonart
Kraft Maid
Corian

Additional Information:
Custom Cabinets
Granite, Tile, Counter Tops
Countertops & Flooring - Door & Drawer Repairs

Certifications
ACA

Affiliations
Member of Better Business Bereau

Licensed, Bonded, Insured

Serving:
White Plains and Surrounding Areas

Copyright © 2003 All rights reserved.
about | privacy | terms and conditions

*FIG. 35B*

SUPERPAGES
SEARCH FOR PRODUCTS AND SERVICES
COMPARE MERCHANTS AND MERCHANDISE
BUY FROM LOCAL OR ONLINE BUSINESSES

Consumers | Merchants

| Related Services |
|---|
| Appliances |
| Bedding |
| Furniture Movers |
| Interior Decorators |
| Lighting |

Print-Friendly Version

Here is the Merchant Comparison page for Mulberry Street Furniture and Freedman's Furniture.
To continue, click the FURNITURE IN WHITE PLAINS, NY link in the breadcrumbs.

Results: Home > Furniture in White Plains, NY > Merchant Comparison

Merchant Comparison

Mulberry Street Furniture

113 Parsons Ave S, Westchester, NY 10461
(718) 988-5362
Fax: (718) 988-5363
1-800-456-3498
Website: www.customcraft.com
Email: info@customcraft.com
Save Information

Years in Business
Since 1975

Methods of Payment
Visa, Mastercard, American Express, Checks

Affiliations
Member of Better Business Bereau

Specialities
Antique Furniture
Refinishing
New - Used - Lease
Desks - Chairs - Bedroom - Living Room
Buy - Sell - Trade

Hours:
M-F 8:00-5:00

Freedman's Furniture

3935 W Cypress, Bronx, NY 10461
(718) 536-9828
Fax: (718) 538-9863
Website: www.freedmans.com
Email: info@freedmans.com
Save Information

Years in Business
Since 1958

Methods of Payment
Visa, Mastercard, American Express

Affiliations
Member of the Better Business Bureau

Brands
Ashley
Bassett
Broyhill
Thomasville

Hours
M-F 9-5 Sat 12-6

CopyrightM © 2003 All rights reserved.
about | privacy | terms and conditions

FIG. 36

BUSINESS RATING PLACEMENT HEURISTIC

RELATED APPLICATIONS

This application is a Continuation-In-Part of U.S. application Ser. No. 10/800,887, filed Mar. 15, 2004, titled "INFORMATION DISTRIBUTION SYSTEM AND METHOD UTILIZING A POSITION ADJUSTMENT FACTOR", and also a Continuation-In-Part of U.S. application Ser. No. 10/801,156, filed Mar. 15, 2004, titled "INFORMATION DISTRIBUTION SYSTEM AND METHOD UTILIZING A POSITION ADJUSTMENT FACTOR"; and is also a Continuation-In-Part of U.S. application Ser. No. 10/800,444, filed Mar. 15, 2004, titled "INFORMATION DISTRIBUTION SYSTEM AND METHOD UTILIZING A POSITION ADJUSTMENT FACTOR", all of which are Continuations-In-Part of U.S. patent application Ser. No. 10/680,952, filed Oct. 8, 2003, titled "INFORMATION DISTRIBUTION SYSTEM", and which further claims priority to U.S. Provisional Application No. 60/505,597, filed Sep. 24, 2003, titled "INFORMATION DISTRIBUTION SYSTEM", the entire teachings of these applications being incorporated herein by reference.

BACKGROUND OF THE INVENTION

The invention is a system and method for distributing information (collectively "information system" or simply the "system").

I. Focused Distribution of Information

The information system can make it easier and more efficient for potential customers to identify potentially desirable providers of goods and/or services (collectively "providers"), while at the same time, making it easier for providers to more effectively "focus" advertising to potentially interested customers.

The yellow pages and other traditional "hard copy" telephone directories (collectively "phone books") have over the years provided individuals and organizations (collectively "customers") with the ability to obtain information about potential providers of goods and services. Phone books typically organize provider listings ("listings") into a variety of different categories based on the types of the goods, services or other offerings (collectively "products") being offered. For example, an Italian restaurant may be listed under the category of "restaurants." Although many providers are listed in the phone book without any fees being charged by the provider of the phone book, many providers choose to pay advertisement fees in order to obtain larger listings or better placement for their listings. In addition to organizing listings by category, traditional phone books also provide a geographic focus for customers using the phone book. For example, a phone book for the city of Chicago will not include restaurants located in New York City unless the restaurants are affiliated with national chains that also have operations in Chicago. Although phone books do provide customers and providers with a useful way to reach out to each other, phone books suffer from various flaws and limitations that are intrinsic to "hard copy" documents.

Listings in phone books are inherently static. Advertisers in the phone book cannot update their listings once the phone book is published. Thus, the information provided in a phone book listing or advertisement may include out of date information relating to the location of the business, the operating hours, phone numbers, sales and other time-sensitive events, product offerings, and other potentially important information relating to the provider. Moreover, phone books are not, and cannot be, specifically tailored to the specific needs of a specific customer at a desired time and place. One day, a particular customer may be exclusively interested in looking for restaurants within a particular suburb. On another day, that same person may be solely interested in looking for nightclubs located in a broader metropolitan area. A printed phone book cannot adapt itself to the ever changing specific goals of the customer, or to the specific intentions of the supplier in the context of customers with such goals. The lack of flexibility provided by conventional phone books is particularly evident in evaluating the geographical and categorical goals of the potential customer.

The functionality of geographical distinctions is limited in phone books. The ability of phone books to incorporate the geographical desires of customers is limited to a single binary variable. Listings are either included in a particular phone book or they are excluded. Phone books do not typically allow the customer to perform a more narrow inquiry limited to a mere subset of the geographical regions covered by the phone book. For example, a phone book for a particular metropolitan area does not typically allow the customer to limit their view to listings within a geographical area that is selected by the customer. Moreover, depending on the location of the particular customer, there may be geographical regions just outside the geographical coverage of the phone book that are closer to the particular customer than the listings provided in the phone book even though the customer is located within the geographical region covered by the phone book. It would be desirable to provide customers with more flexible and sophisticated geographic functionality to provide for a more focused and efficient exchange of information between providers and customers. A hierarchy of geographical distinctions would provide customers with a powerful tool for obtaining the information that they desire.

The functionality of organizing listings into various subject matter categories is also significantly limited in a traditional printed phone book. Phone books provide listings sequentially because the listings are physically printed on paper. Phone books cannot incorporate a hierarchy of categories without introducing a prohibitive quantity of redundancy. For example, a phone book does not typically include many overlapping categories of different scopes and foci. For example, most phone books do not differentiate between categories organized in a hierarchical fashion. For example, the categories of "retail stores," "consumer electronics," "digital optical equipment," "digital cameras," and "digital video cameras" are distinct from each other, but at the same time, are interrelated as to subject matter. For example, digital video cameras are a type of digital camera, and digital cameras are a type of digital optical equipment. In the context of a phone book, category "hierarchies" are typically limited to a hierarchical "depth" of only one level. True hierarchies of categories are not an option, because the paper medium of a phone book does not provide the dynamic ability to "drill down" or "drill up" a hierarchy. Thus, a customer looking for listings of digital video cameras may have to settle for consumer electronics listings that include providers having nothing to do with digital video cameras. It would be desirable to provide customers with the ability to flexibly navigate categories from within an integrated hierarchy of categories that is more than one level deep. It may also be desirable to provide a fully "normalized" hierarchy of categories and geographical regions so that potential options within a particular area of interest are made accessible to customers in a prioritized manner in accordance with the selections made by customers. The phrase "fully normalized" refers to the ability of a system to potentially distinguish between any two attributes that are differentiated by only a single material distinction. In a normalized hierarchy, differences between data elements are treated differently to the extent of the differences, and similar data elements are treated similarly to the extent of the similarities. A "normalized hierarchy" of relevant information would provide for a more focused and efficient exchange of information between providers and customers. By limiting the ability of customers to "zero in" and focus on the listings that are of interest, traditional phone books force customers to wade through information that is not of interest to the information that they are currently looking for.

Limitations of physical phone books also impede the desires and goals of advertisers. Just as customers may want to focus on a particular geographical region or a particular category, providers may also desire to limit or "focus" their listings and other advertisements. For example, a small barbershop may not be interested in trying to bring in customers more than a few miles away from the location of the barbershop. Moreover, the barbershop may not provide the range of hair care and other appearance-related services of a beauty salon, spa, or similar business. In many instances, the provider is either forced to pay for reaching an audience that the provider is not truly interested in pursuing, or the provider must forego pursuing an audience that the provider is interested in pursuing. If the provider chooses not to pay for a listing, both the provider and the publisher of the phone book are negatively impacted by the inherent limitations of the phone book.

Phone books lack a direct feedback mechanism to inform phone book publishers and their advertisers of the usage of the various categories or advertisements in the phone book. The number of people who actually view a particular listing or ad provided in the phone book can only be estimated. Similarly, the percentage of people who see a particular listing and respond to it can only be estimated. The traditional "hard copy" phone book does not include a mechanism for transmitting information back to phone book publishers and their advertisers. The inability to directly measure the effectiveness and utility of listings impedes advertisers in transmitting their message in a phone book, and limits the ability of publishers to facilitate such communications. The inability to directly measure effectiveness results in inefficiencies that are detrimental to publishers, advertisers, and customers. In many circumstances, it would be desirable for an information distribution system to definitively track the access and usage of advertisement information. If such a system were established, it would facilitate the implementation of a pricing mechanism based on one or more objective pricing formulas, including for example, charging advertisers on a "per-hit" or per transaction basis or for automatic placement within a well-defined geographic region in accordance with a robust multi-hierarchical category system.

The implementation of alternative delivery and pricing mechanisms that are precluded by limitations intrinsic to paper phone books prevent phone book publishers from more effectively tailoring listings for the mutual benefit of customers, providers, and publishers alike. For example, providing any form of preferential placement to providers who pay for placement based on objective criteria that help demonstrate effectiveness can be an effective way to encourage advertising spending by providers.

Some of the present-day limitations of paper-bound phone books are addressed by various information technology tools such as search engines and other mechanisms that utilize the World Wide Web, or similar networks (collectively "search engines"). For example, the ability to monitor Internet traffic (e.g. a "hits" from a link to a website), and the ability to frequently update information on a website can be accomplished by using various tools found in the existing art.

Unfortunately, in solving certain problems, search engines in the existing art actually exacerbate many existing limitations of paper-bound phone books while also creating entirely new problems. The marvels of information technology can literally provide a customer with information from a voluminous number of sources from across the globe. This makes tools such as search engines particularly powerful and useful for tracking down information that is hard to obtain, pertains to "niche" topics, or is otherwise related to obscure subjects. For example, search engines may be excellent tools to learn about collecting rare books, restoring $17^{th}$ century art, or finding a person who is fluent in the Klingon language (a language originating from a popular science fiction show that began in the 1960's). Internet search technologies can also "succeed" in obtaining information about more mundane or common matters.

The use of search engines, however, in more common contexts all too often results in "information overflow" for the user, as well as the providing of so-called "false positives." Unlike paper-bound phone books, search engines are not limited to organizations desiring to provide potential customers with particular goods and services. Search engines are not designed to easily provide users with the ability to identify nearby businesses involved in a particular category or sub-category of goods or services. For example, a search term of "restaurant" will return listings relating to restaurant sites, restaurant reviews, and a voluminous number of "restaurant" references having nothing to do with actual restaurants that are open for business and seeking customers. For example, screenplays, poems, novels, short stories, song lyrics, and variety of other literary mediums may include the word "restaurant" because restaurants are a common part of everyday life, and often make good context for literary works. Search engines do not provide an efficient mechanism for potential customers to obtain information from providers interested in providing a particular good or service to the customer. Search engine users are effectively prevented from finding the proverbial "needle" they are looking for due to a "haystack" of irrelevant data between the user, and the result they are looking for.

A. Geography Attributes

Although it is true that search terms relating to geographical regions can be submitted to search engines, that functionality is not the same thing as retrieving information that is specifically organized and stored into various hierarchies of geography, categories, and potentially other relevant attributes. A search consisting of "New York" and "barbershops" will still result in a voluminous number of listings having nothing to with a barbershop open for business in New York City. This limitation is intrinsic to the nature of the Internet and the types of searches performed by conventional search engines.

B. Category Attributes

Nor do search engines provide guidance to both advertisers and customers through a normalized hierarchical category structure, designed to minimize the likelihood of returning less than the desired universe of goods and services. Individuals, depending on their cultural and geographic background, may use non-similar nomenclature for the same desired good or service. For example, it is possible to use the word "lounge", "club", "tavern" or "pub", as synonyms for a "bar." In many contexts, it would be desirable for an information system to normalize user terminology into the hierarchical category structure to facilitate the true desires of the user.

Unlike phone books that are created and organized by a publisher, the Internet is not managed by any single organization. The unmanaged evolution and growth of the Internet has resulted in such a large volume of ever increasing information that precludes attempts to organize every potential search listing into a hierarchy of categories and geographical areas. It would be desirable for an online system to provide customers with the ability to locate desired goods and services using distinguishable attributes such as geographic or category based limitations, and permitting extremely refined focus in each of these areas simultaneously depending on the needs and desires of the customer.

C. Search Term Limitations

Search engines also hamper the ability of providers to better focus their marketing and advertising efforts to potential customers. For example, some search engines prioritize listings within a search engine result the basis of a per-hit advertising fee paid for by the advertiser in accordance with a "key" term, which is mapped to the search term used by a searcher. Advertisers in such systems cannot target their audience based on geography or the category of the good or service, and the use of "key" terms based solely on word matching greatly reduces the total universe of potentially relevant hits to the detriment of all involved. It would be desirable to provide advertisers with such capabilities that do not suffer from the limitations of a "key" term search approach.

D. Reviews and Ratings

Many web sites, including search engine sites, provide users with the ability to provide reviews and/or ratings of businesses, products, web sites, etc. Some web sites, including search engine sites, even provide users with the ability to sort search results based on these ratings and/or reviews. However, no site has used these ratings and/or reviews in concert with geographic attributes, category attributes, and/or the per-hit fee paid in order to determine advertiser positioning in a display of search results. A system that made such use of ratings and/or reviews would provide users with the benefit of having the most attractive and/or interesting advertisers favorably positioned in a display of search results.

E. Group-Based Processing

Under the existing search engine art, all providers compete against each other, regardless of differences in geographic scope or the scope of the goods and services. In bid-based approaches, local providers are bidding against national providers. Providers within a specialized sub-category such as high speed digital video cameras are bidding against more general providers of photography equipment or even consumer electronics retailers. Thus, it would typically be desirable to facilitate the organization of various provider listings into "groups" based on geography, category, fee type (such as fixed fee approaches or bid-based approaches), and other distinctions. One kind of fixed fee approach is known as a per-hit fee, discussed further in Section II below, in which the advertiser pays an agreed on fee every time the advertiser's listing is included in a display of search results. It may sometimes be desirable to group advertisers according to whether they have agreed to pay a per-hit fee and/or according to the amount of the per-hit fee that the advertiser has agreed to pay. In general it may also be desirable for administrators to create different administrative rules for different groups. For example, it might be desirable for local advertisers to compete in different auctions or to have a different minimum bid requirement and even a different minimum bid increment requirement, than a national advertiser.

Both online search tools and the more traditional printed phone books lack useful mechanisms to enhance the ability to potential customers to find the information they are looking for, and the ability of providers to focus their marketing and advertising efforts to those potential customers most interested in their goods and services. In many respects, the advantages of online search engines affirmatively teach away from the functionality of conventional printed phone books and the functionality of conventional paper-bound phone books affirmatively teach away from the functionality of search engines. Although there are some online phone books in the existing prior art, up until now they have typically mimicked their traditional counterparts with only a few basic advantages such as the providing of a map or driving directions to the provider. The known prior art does not disclose, much less affirmatively suggest, the existence of a system or method that can surpass the functionality of both traditional printed phone books and online search tools with respect to the focusing of the search.

II. Relationship-Based Processing Rules

The information system can facilitate the ability of providers of goods and/or services (collectively "providers" or "advertisers") and distributors of information relating to the goods and/or services of providers (collectively "distributors" or "administrators") to develop meaningful and mutually beneficial relationships.

Phone books, search engines, and other information distribution mechanisms prioritize and sort information listings in a variety of different ways using a variety of different placement practices. For example, some search tools may display provider listings in accordance with a per-hit fee associated with the particular listing, as mentioned above. The greater the per-hit fee, the closer to the front of the line the particular listing is displayed. Other search tools may prioritize listings based on a relevance metric related to the particular search criteria submitted by a user, a date/time stamp associated with the listing, or some other attribute related to the listing.

Such approaches emphasize attributes relating the particular listing to the exclusion of other attributes, such as attributes relating to the relationship between the provider and the distributor. Listing-based approaches fail to give proper weight to loyalty and to business relationships "as a whole." For example, listings based on per-hit fees alone ignore the relevance of other attributes that are important to both the user and the advertiser such as category attributes, geographic attributes, and ratings information. It would also be desirable for publishers or administrators of online tools to create various administrative rules that would facilitate mutually rewarding approaches by which advertisers are appropriately charged for advertising online.

For example, in a system involving advertisers competing for favorable placement on the basis of their per-hit bid amount ("bid-based approaches"), it might be desirable to take into account the overall relationship between the administrator and the advertiser. For example, if a particular advertiser has purchased numerous search listings, it might be desirable to adjust or enhance the impact of the bid amount by the particular advertiser for a particular search term. Adjustments can also be made on seniority to reward long-term sustained relationships.

The existing art does not appear to teach or even merely suggest the influence of relationship-based attributes in the treatment of listing-based attribute. Moreover, the growing emphasis on listing-based attributes affirmatively teaches away from relationship-based attributes being used as position adjustment factors.

III. Enhanced Display Formats

The information system can make it easier for providers of goods and/or services distinguish the ways in which relevant information is organized and displayed to potentially interested customers.

Existing information distribution mechanisms typically fail to take full advantage of the different ways in which different listings can be differentiated from one another. For example, the cost of conventional phone book listings and other advertisements are typically determined by the location of the listing within the phone book, and the size of the listing in terms of the space taken up by the listing. The cost of listings are not typically differentiated with respect to font types, font sizes, color, the inclusion of graphics, the inclusion of animation, the inclusion of sound, the number of characters, the number or words, the number of sentences, potential opportunities of interactivity, the organizational structure or format of the information, and various other potentially useful display characteristics (collectively "enhanced display formats").

Listings distributed in an online format provide even greater opportunities for differentiating the display formats of various listings. However, the search engines in the existing art apparently fail to encourage the differentiation of listings through the use of different enhanced display format characteristics. Even highly market driven search engines that are premised upon competitive bidding between various providers currently fail to factor the use of enhanced display formats into the fees charged to advertisers and other providers. This failure results in a lack of incentive on the part of search engines to offer various enhanced display format options to providers and other advertisers.

The existing art does not appear to teach or even merely suggest the offering of various enhanced display format options in exchange for various fees to be paid by the provider. Moreover, recent developments and trends in the existing art teach away from listing differentiation on the basis of enhanced display formats because of the growing popularity of the "auction" paradigm for search engines where advertisers compete with each other through the per-transaction fees they agree to pay for better placement. The increasing focus on the placement of listings corresponds to a de-emphasis with respect to the contents of the various listings. The use of competitive auctions for better listing placement affirmatively exaggerates a trend of commoditization with respect to the display formats of the various listings.

For example, advertisers may desire that a portion of the bid amount go to purchasing a larger listing, flashy sound or animation effects, larger font, or some other enhancing display-related attribute. Limiting the impact of a bid amounts to the order of listings thus fails to accommodate the desires of advertisers.

The existing art does not appear to teach or even merely suggest the influence of customizing or enhancing the display of listings. Moreover, the growing emphasis on the location and placement of listings affirmatively teaches away from allowing advertisers to pay monies not related to "moving up" the ranking of listings.

IV. Tiered Listings

The information system can organizes information listings into tiers.

Existing information distribution mechanisms such as Internet search engines and traditional "hard copy" distribution mechanisms implement a variety of different placement practices. For example, some search tools may display provider listings in accordance with a per-hit fee associated with the particular listing. The greater the per-hit fee, the closer to the front of the line the particular listing is displayed. Other search tools may prioritize listings based on a relevance metric related to the particular search criteria submitted by a user, a date/time stamp associated with the listing, or some other attribute related to the listing.

Regardless of the placement/positioning rules implemented by such systems, "competition" between listings is not necessarily enhanced by such rules. For example, in the context of system that orders listings in accordance with a per-hit fee associated with each listing (a "strict bid order environment"), there may be an incentive for the top two or three competitors to increase their bids so as to obtain the number one position ("pole position") within a particular response. However, not all of the advertisers are necessarily in a position to try and compete for the pole position. Moreover, many advertisers may genuinely not be interested in attempted to out bid all other advertisers. Under a strict bid order environment, there is often little of no incentive for a $7^{th}$ ranked bidder to raise their bid to achieve the $6^{th}$ spot. The incremental differences between finishing for example $3^{rd}$ instead of $4^{th}$, $6^{th}$ instead of $7^{th}$, $9^{th}$ instead of $10^{th}$, etc. are often not particularly significant. Thus, a strict bid order environment may result in maximizing the competitive bidding for the pole position, while failing to maximize the aggregate competitive bidding for the listings within a response as a whole.

It would be desirable for competitive listing approaches to incorporate the concept of tiers. Within a tier, listings can be ordered in a variety of different ways instead of being strictly ordered in accordance with some particular metric, such as a per-hit fee amount. For example, in a per-hit fee environment, listings could be organized into tiers of three listings each on the basis of the per-hit fee associated with each of the listings. For example, within each tier, listings could be ordered in a purely random fashion. This would provide intense competition for the $3^{rd}$, $6^{th}$, $9^{th}$, etc. spots. For example, a listing finishing $7^{th}$ in a competitive bid would be listed $7^{th}$ one third of the time, $8^{th}$ one third of the time, and $9^{th}$ one third of the time. In contrast, a listing finishing $6^{th}$ in a competitive bid would be listed $4^{th}$ one third of the time, $5^{th}$ one third of the time, and $6^{th}$ one third of the time. While only one or two bidders may fancy themselves to be potential winners of the "pole position," there may be a substantial number of bidders interested in a $3^{rd}$ place ranking over a $4^{th}$ place a ranking, a $6^{th}$ place ranking over a $7^{th}$ place ranking, etc.

The prior art does not appear to suggest much less teach such a tier-based approach because thoughts of competition focus on the "pole position" competition to the exclusion of the aggregate competition of the particular response. From the perspective of one of average skill in the art, it is nonsensical to attempt to increase aggregate competition by implementing practices that may decrease the highest bids within the auction, i.e. the incentive to win the "pole position."

SUMMARY OF THE INVENTION

The invention is a system and method for distributing information (collectively "information system" or simply the "system").

I. Focused Distribution of Information

The information system can make it easier and more efficient for potential customers to identify potentially desirable providers of goods and services (collectively "providers") with respect to particular transactions, while at the same time, making it easier for providers to more effectively "focus" advertising to potential customers.

A. Geography Attributes

In certain disclosed embodiments, information requests and responses distinguish between various geography attributes that are associated with some or all of the various listings. Hierarchies of geographical regions can be stored and processed by the system.

B. Category Attributes

In some embodiments, information requests and responses distinguish between various category attributes that are associated with some or all of the various listings. Hierarchies of categories can be stored and processed by the system. In certain preferred embodiments the category hierarchy is fully "normalized," allowing the system to make finely tuned distinctions based on subtle attribute differences. The use of predefined data hierarchies can provide the best possible universe of results and minimizing the loss of relevant results based merely on differences in nomenclature. Mechanisms may be provided to relate like "terms"so that the correct category is easily located within the overall structure when a non-normalized term is used.

C. Fee Types

In some embodiments, there is more than one type of fee that can be associated with the listings included in a response to an information request. For example, a response may include some listings paid for on a fixed fee basis, while also including listings paid for on a fixed or variable per-hit basis. Hierarchies of fee types can be stored and processed by the system.

D. Reviews and Ratings

In some embodiments, user reviews and/or ratings for advertisers'businesses, products, and/or web sites, etc. are collected. For example, ratings could include an aggregate rating based on a user's general rating for a business, product, and/or web site, or ratings could include an aggregate rating based on a combination of rating attributes such as price, quality of customer support, timeliness of delivery, or quality of product. As discussed below, such rating attributes may also be used individually in certain embodiments. These reviews and/or ratings, including rating attributes may be stored by the system, and used in the formulation of a response to a search request either alone or in combination with other attributes such as category and/or geography attributes.

E. Groups

In many embodiments of the present invention, a single response can include more than one group of listings. Listing groups can be dynamically defined by the interactions between listing attributes set forth by the provider, the request attributes set forth by the customer, and/or the administrative rules implemented by the administrator for the system. Each group in a response can have its own methodology for ordering the listings within the group. The listings need not be displayed in a manner that is determined in a sort by group. For example, three listings prioritized on the basis of bid amounts can be followed by two listings prioritized on a fixed fee basis, with those two fixed fee listings then being followed by the next three listings prioritized on the basis of bid amounts.

II. Relationship-Based Processing Rules

Some embodiments of the information system can allow the processing rules of the system to be influenced by relationship-based as well as listing-based attributes. A position adjustment factor can be used by the system to allow attributes relating to the relationship between a provider and a distributor (relationship-based attributes) to influence what would otherwise be a listing-based process of prioritizing, placing, and/or displacing information listings.

For example, in certain embodiments of the information system that prioritize listing placements based in part on bid amounts associated with the various listings, bid amounts can be merely one factor used to calculate the priority metric for prioritizing listing placements ("bid-influenced approaches"). Position modifiers based on loyalty, other relationship attributes and/or fixed fees can cause a particular listing to possess a higher priority metric even though other listings are associated with a larger per-hit or "click through" fee.

Various position adjustment factors can be used to influence the priority metric used to prioritize the placements of listings within a particular group. In some embodiments position adjustment factors influencing the priority metric may include some or all of the following: the amount of a per-hit fee, geography attributes, category attributes, and review and/or rating information.

In some embodiments, the relationship between users and advertisers can also be associated with a position adjustment factor that impacts the priority metrics associated with various listings. For example, the popularity of a particular listing can enhance the priority metric for that particular listing so that the priority metric for that particularly listing surpasses the priority metrics associated with listings involving higher per-hit fees. In order to facilitate the ability of users to better "focus" their efforts on using the system, the system can also provide additional flexibility with respect to the submission of requests. For example, a user request can be augmented in accordance with the particular user's history with the system, a user profile, or other forms of "intelligence" utilized by the system.

III. Enhanced Display Formats

The information system can charge providers of goods and services a fee associated with enhancing the display characteristics of a particular listing. In an auction embodiment of the system, the enhanced display format fee charged with respect to a particular listing can be part of a per-transaction fee that is paid by the provider.

For example, if part of the bid amount is attributable to a display fee for non-priority related factors such as listing length, font size, colors, graphics, or other factors, then the priority metric no longer correlates to the per-hit fee amount.

IV. Tiered Listings

The information system can use tier-based processing to encourage "competition" between listings throughout the continuum of listings, and not just at the very top echelon of listings.

Whatever the basis for "competition" between listings (e.g. per-hit fees, relevancy metric, etc.), the impact of the competition in a system utilizing tiers-based processing is to place listings within various tiers. The size of the tiers can vary widely from embodiment to embodiment. The ordering of the listings within their identified tiers is performed in accordance with the predefined rules of the system. In some embodiments, ordering listings within the tiers is a purely random function. In other embodiments, the probability can be modified or weighted by some other metric, such as the metric used to organize the listings into tiers in the first place, or some other metric.

A tiered-based approach can incorporate a minimum entry value to qualify for a particular tier. For example, in a competition based on a per-hit fee for tiers of three listings each, entry into the first tier would require that a particular listing out compete all but the top two listings. In certain instances, the $3^{rd}$ ranked listing could be significantly behind the first two listings. Thus, it can be desirable to place additional requirements such as minimum per-hit fee amounts (a "minimum bid amount") to be eligible to achieve membership in a particular tier.

In some bid-influenced approaches, different groups will be associated with different minimum bid values necessary to join the particular group. Different groups may also be associated with different minimum bid increments for increasing those bid amounts.

V. Other Potential Features

The system can be implemented in such a way as to maximize the ability of the system to distinguish between different types of user and advertiser activities. Different user activities can result in different advertising fees being charged to the advertiser. Dissimilar user activities can be classified as different types of "hits" for the purpose of charging advertisers. Dissimilar types of "hits" can involve different "per hit" fees. As one example within the scope of the present invention, the fact that a particular listing appears within a result can trigger a particular charge to the advertiser. As another example, invoking of the web site through the listing can result in a different charge. In yet a further example, the sending of an e-mail to the advertiser through the system can result in a charge that is distinct from the previous two charges. In some embodiments of the system, the per-hit fee associated with a particular listing can be increased or decreased in accordance with the popularity of the listing. For example, in a step function approach, the system can be configured so that after 500 hits during a particular period of time, the per-hit fee associated with the particular listing is increased or decreased in accordance with some value, ratio, or factor. At the same time that the per-hit fee is adjusted, however, it does not necessarily mean that its location within the listing is altered.

The present invention will be more fully understood upon reading the following detailed description in conjunction with the accompanying drawings.

BRIEF DESCRIPTION OF THE DRAWINGS

FIG. 4*c* is a partial hierarchy diagram illustrating various service areas that can be associated with a national level geographic region.

FIG. 4*d* is a partial hierarchy diagram illustrating various service areas that can be associated with a regional/state geographic region.

FIG. 4*e* is a partial hierarchy diagram illustrating various service areas that can be associated with a local geographic region.

FIG. 10 is a flow chart diagram illustrating one example of a process that can be performed by an administrator and the system.

FIG. 11 is a flow chart diagram illustrating one example of a process that can be performed by an advertiser that submits a listing to the system.

FIG. 20 is a screen print illustrating an example of a request submission web page that includes various high-level categories.

FIG. 21 is a screen print illustrating an example of a request submission web page with a text string corresponding to a category selection entered by a user.

FIG. 22 is a screen print illustrating an example of a request submission web page with text strings corresponding to a category selection and a geography selection entered by a user.

FIG. 23 is a screen print illustrating an example of a request submission web page displaying more detailed sub-categories associated with the higher furniture category.

FIG. 24 is a screen print illustrating an example of a web page displaying listings associated with the sub-category of "room accessories."

FIG. 25a is a top portion of a screen print illustrating an example of a web page displaying listings associated with the antiques sub-category.

FIG. 25b is a bottom portion of a screen print illustrating an example of a web page displaying listings associated with the antiques sub-category.

FIG. 26a is a top portion of a screen print illustrating an example of a web page displaying listings associated with the furniture category and a local geography.

FIG. 26b is a bottom portion of a screen print illustrating an example of a web page displaying listings associated with the furniture category and a local geography.

FIG. 27a is a top portion of a screen print illustrating an example of a web page displaying listings associated with the furniture category and a local geography.

FIG. 27b is a bottom portion of a screen print illustrating an example of a web page displaying listings associated with the furniture category and a local geography.

FIG. 28a is a top portion of a screen print illustrating an example of a web page displaying listings associated with the furniture category and a local geography, including two listings that have selected for the purposes of a "compare" function.

FIG. 28b is a bottom portion of a screen print illustrating an example of a web page displaying listings associated with the furniture category and a local geography, including two listings that have selected for the purposes of a "compare" function.

FIG. 29a is a top portion of a screen print illustrating an example of a web page displaying listings associated with the furniture category and a local geography.

FIG. 29b is a bottom portion of a screen print illustrating an example of a web page displaying listings associated with the furniture category and a local geography.

FIG. 30a is a top portion of a screen print illustrating an example of a web page displaying listings associated with the furniture category and a local geography.

FIG. 30b is a bottom portion of a screen print illustrating an example of a web page displaying listings associated with the furniture category and a local geography.

FIG. 31a is a top portion of a screen print illustrating an example of a web page displaying listings associated with the "living room" sub-category and a local geography.

FIG. 31b is a bottom portion of a screen print illustrating an example of a web page displaying listings associated with the "living room" sub-category and a local geography.

FIG. 33 is a screen print illustrating an example of a bid entry web page for use by advertisers.

FIG. 34 is a screen print illustrating an example of a monthly report web page accessible by advertisers.

FIG. 35a is a top portion of a screen print illustrating an example of a detailed view of a listing.

FIG. 35b is a bottom portion of a screen print illustrating an example of a detailed view of a listing.

FIG. 36 is a screen print illustrating an example of a "compare" feature.

DETAILED DESCRIPTION

I. Overview

Figure 1:
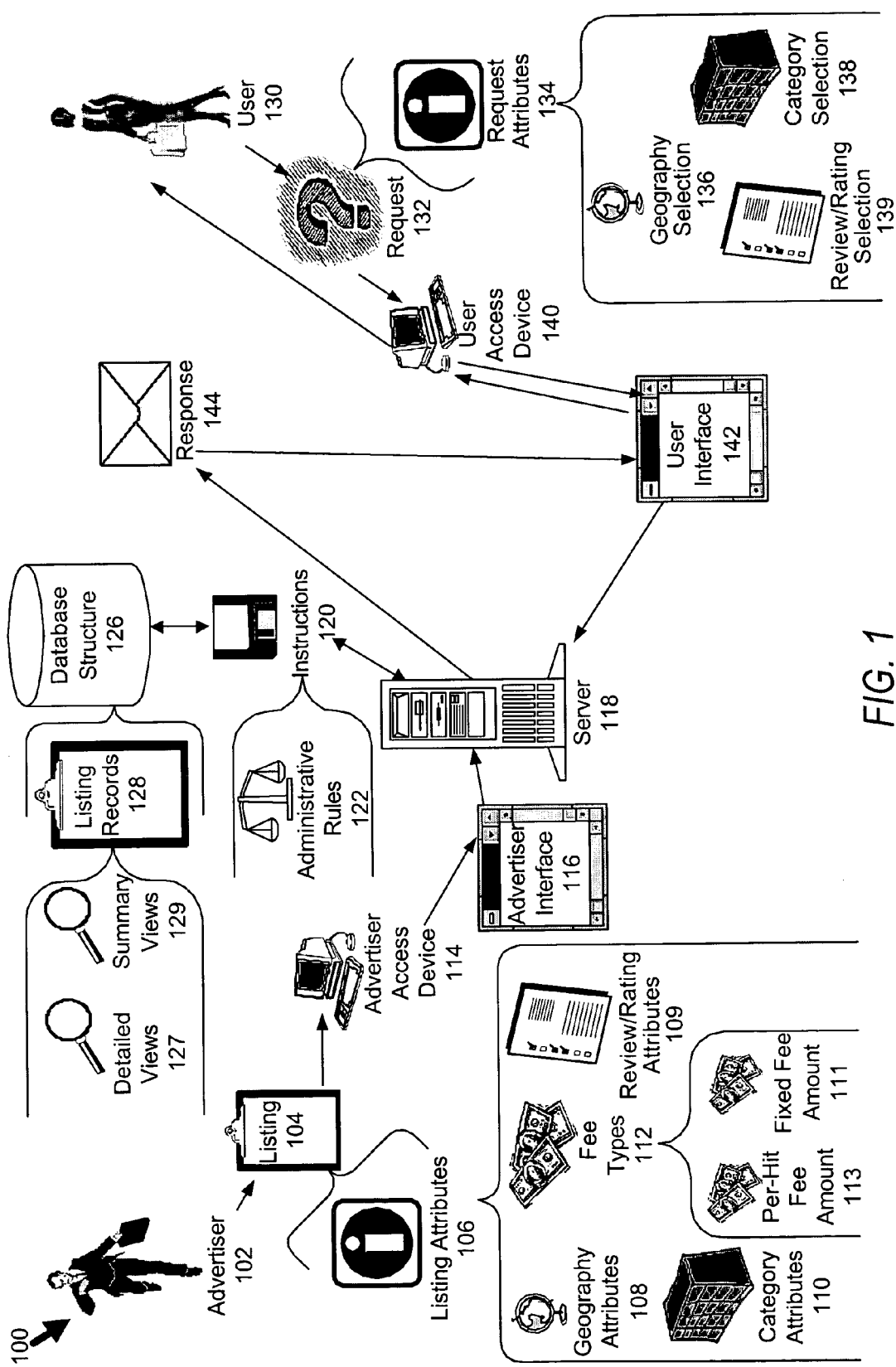
FIG. 1 is a block diagram illustrating one example of an information distribution system, including the components used to support the performance of the system, the types of information processed by the system, and some of the ways in which users and advertisers interact with the system.

The invention is a system or method for distributing or disbursing information (collectively an "information system" or simply the "system").

A. Focused Distribution of Information

The system can "focus" the information exchanged between potential buyers and sellers.

In contrast to paper-bound phone books or even online search engines, the system achieves highly focused exchanges between buyers and sellers by adapting itself more deeply to the specific goals of both buyers and sellers.

Buyers can use the system to identify potential sources for goods and services that are of particular interest to the potential buyer. Buyers can focus their access to listings of seller information by using the system to distinguish, order, and potentially exclude listings that are not associated with the desired attributes, such as a particular geography selection of the seller, a category selection relating to the goods and services offered by the seller, and/or reviews and/or ratings that the seller has received from other buyers. In contrast to conventional search engines and other online search tools, the use of such attributes is not limited to their inclusion as part of generally applicable search terms used to perform text-based searching. Instead, seller listings can be organized into hierarchies of geography, category, and other listing attributes in a highly normalized fashion to enhance the ability of a buyer make highly targeted or focused requests. The highly focused nature on the request allows the system to provide the potential buyer with a similarly focused response. The system can be configured to limit, order, or otherwise prioritize the information viewed by the buyer on the basis of the desired attributes identified by the buyer.

Sellers benefit from focusing their advertising to potential buyers who are in fact, interested in the goods, services, and other offerings that can be provided by the seller. The benefits to sellers allow an administrator of the system to charge more money for advertisements because the system is a more effective and uses a less scattered approach than other advertisement mechanisms.

Administrators configure the processing performed by the system by the creation and updating of administrative rules that determine which listings are selected by the system in response to a particular request, and how those listings are ordered and otherwise displayed in the response sent back the originator of the request. The administrative rules can determine the fees of certain advertisements, and such fees can include fixed-fees as well as various per-hit fees. The order in which listings are displayed in a particular response to a particular request can be influenced by numerous variables or combinations thereof, including a group affiliation, a geography attribute, a category attribute, a priority metric, a fixed-fee, a per-hit fee, a position adjustment factor, and an enhanced display fee. In many embodiments, the ordering and positioning of lists are not dependent on any single input variable. In such embodiments, no variable can be said to be independent of any other component and such independence would work against the flexibility and "focused" processing of the system.

In order to maximize the ability of the system to "focus" information requests and responses, advertiser "listings" can be organized into various hierarchies, such as a geography hierarchy, a category hierarchy, a fee-type hierarchy, or other attribute hierarchies. The requests for information submitted by users can then invoke the system to dynamically create one or more "groups" of listings using the various hierarchical distinctions, user selections, and/or information related to the user.

B. Relationship-Based Processing Rules

In some embodiments, the information system can incorporate relationship-based attributes into processing that would otherwise focus almost exclusively on listing-based attributes.

Such processing can facilitate beneficial and "holistic" relationships in the context of an information distribution system. With many different electronic and more traditional information search tools, the order and placement of the displayed information can mean the difference between a valuable opportunity to market the goods and services of a provider, and yet another message in a cacophony of messages that is never even read by the desired audience. The disclosed system can allow relationship-based attributes (e.g. attributes relating to the relationship between the provider and the information distributor) as well as listing-based attributes to influence the order, placement, and/or display characteristics (collectively "placement") of a particular listing. Examples of position adjustment factors include aggregate advertising buys, seniority of the relationship, the number of listings associated with a particular advertiser, per-hit fees, or any other attribute that the distributor wishes to encourage C. Enhanced Display Formats In some embodiments of the information system, the system can incorporate the functionality of enhanced display formats. The information system can provide advertisers with the ability to distinguish their information records from the information records of other advertisers through the use of various enhanced display formats. Examples of enhanced display format characteristics include but are not limited to font size, font type, color, graphics, number of characters, number of words, number of sentences, sound, opportunities for interactivity, information organization, and potentially any other characteristic relating to the display of information. In an embodiment of the system where the advertiser is charged with a per transaction fee, that per transaction fee can include a monetary value relating to the enhanced display characteristics of the information record.

D. Tiered Listings

In some embodiments of the system, listings are first organized into tiers before the position of a particular listing within a particular tier is determined. The position of listings within a particular tier can be determined by different placement heuristics than used for other tiers within a single response to a single request.

In an embodiment of the system using a bid-influenced approach, it is possible that maximizing the competition for the "pole position" will not maximize the aggregate monies received by the information distributor running the system. A tiered-based approach can facilitate greater competition for locations throughout a response transmitted to a searcher, and not just at the very top of the response sent to the searcher.

Whatever the basis for "competition" between listings (e.g. per-hit fees, relevancy metric, etc.), the impact of the competition can be used to place listings within various tiers. The size of the tiers can vary widely from embodiment to embodiment. The ordering of the listings within the tiers is performed in accordance with the predefined rules of the system. In some embodiments, ordering listings within the tiers is a purely random function. In other embodiments, the probability can be modified or weighted by some other metric, such as the metric used to organize the listings into tiers in the first place, or some other metric.

II. Introduction of Elements

FIG. 1 is a block diagram illustrating one example of an information distribution system 100, including the components used to support the performance of the system 100, the types of information processed by the system 100, and some of the ways in which users 130 and advertisers 102 interact with the system 100. Different embodiments of the system 100 can involve a wide variety of different components, information types, and interactions.

A. Advertiser

An advertiser 102 is any individual or organization that provides a listing 104 of information for inclusion in the system 100. Advertisers 102 can interact with the system 100 through various individuals affiliated with the advertiser 102, such as employees, contractors, or agents. In some embodiments of the system 100, a third party is responsible for interfacing with the system 100 on behalf of the advertiser 102. For example, a marketing agent could submit information for inclusion in the system 100 on behalf of the advertiser 102. Such a submission could even be made without the knowledge of the advertiser 102 if the marketing agent is authorized to do so. Sources of advertiser information can include the local Telephone Company, data warehouse companies, activities of the provider's sales force and from the advertiser 102 directly. Advertisers 102 can also interact with the system 100 through various information technology mechanisms, such as software applications that are configured or adapted to interface with the system 100. Such interfacing advertiser applications can interact with the system 100 in both an automated and manual manner, engaging in batch, real-time, schedule, and ad-hoc interactions.

In many embodiments of the system 100, the advertiser 102 can also be referred to as a seller, supplier, provider, or sponsor because advertisers 102 are typically sellers of various goods, services and/or other offerings (collectively "products"). However, advertisers 102 can also include individuals or organizations desiring to communicate with users to initiate future interactions where no good or service is involved. For example, churches, political parties, employers, community action groups, and other organizations seeking new members, volunteers, or employers could be "advertisers" 102 using the system 100. An advertiser 102 can be any entity seeking to make its existence known to a variety of potential customers, users, or other potentially interested persons or organizations (collectively "users" 130) through one or more listings 104 residing on the system 100.

As indicated by the arrow originating from the advertiser 102 and pointing toward the listing 104, advertisers 102 are responsible for providing information that comprises the content of the listings 104 to the system 100. In some embodiments of the system, advertisers 102 may invoke the assistance of other entities, such as marketing consultants or the administrators of the system 100, to physically create the listing. However, the advertiser 102 should ultimately be responsible for the contents of their listings 104.

Although only one advertiser 102 is displayed in the Figure, it is anticipated that millions of listings 104 could be submitted by millions of advertisers 102 for inclusion in the system 100. The capacity of the system 100 is only limited by the information technology architecture that supports the functionality of the system 100.

1. Listings and Listing Attributes

A listing 104 is the mechanism by which a user 130 learns about advertisers 102. Even within a single embodiment of the system 100, listings 104 can include a wide variety of different types of information in a wide variety of different formats. Listings 104 can include a wide variety of text, fonts, colors, graphics, animation, and sounds to communicate information about the advertiser 102 and the products of the advertiser 102. Listings 104 could even incorporate different smell, touch, and taste sensations as those technologies are developed and made commercially available through computer networks. Below is one example of a listing 104 that can be incorporated into the system 100:

Verizon Online DSL

UltraFast Internet Access. The Power is Yours.

(877) 270-2375 (toll-free) Res.

(888) 649-9500 (toll-free) Bus.

As indicated by the bracket extending from the listing 104, each listing 104 can possesses certain characteristics or attributes which are referred to as listing attributes 106. Listing attributes 106 can be set by the advertiser 102, and they provide the advertiser 102 with the flexibility to target or focus their listing 104 towards users 130 with particular interests. Although listing attributes 106 can vary widely from listing 104 to listing 104 (even within the context of a single sequence of listings 104 within a single embodiment of the system 100), in many embodiments of the system 100, there are similarities with respect to the particular types of information used by the system 100 as listing attributes 106 to describe listings 104. In many embodiments, one or more of the listing attributes 106 can be associated with "blank" or "null" values.

a. Geography Attributes

As indicated by the bracket extending from the listing attributes 106 and encompassing a geography attribute 108, one type of characteristic or listing attribute 106 that can be helpful to associate with various listings 104 is the characteristic of geography. One or more geography attributes 108 can be used by the system 100 to associate a particular listing 104 with a particular geographic region or a particular geographic scope. Geography attributes 108 can refer to a particular geographic region (such as New York City, the state of Illinois, the nation of Ireland, etc.), as well as a geographical "level" within a geographic hierarchy (such as a city, state, country, etc.). Any information relating to the location of the advertiser 102 can be a geography attribute 108. Examples of geography attributes 108 can include, but are not limited to, a: street address, city, county, state, zip code, country, continent, longitude, latitude, elevation, phone number, fax number, terrain (such as mountainous, forest, jungle, etc.) or any other indicia of geographical information that could be of interest to a user 130 in focusing a request 132. Different embodiments of the system 100 can involve different combinations of required and optional geography attributes 108. For example, in one embodiment of the system 100, each listing 104 could be required to be associated with some type of latitude and longitude values for distance determinations, point of interest data, and other mapping purposes. In other embodiments, the system 100 may refrain from requiring any particular type of geography attribute 108.

Geography attributes 108 and their impact on the processing performed by the system 100, are described in greater detail below.

b. Category Attributes

As indicated by the bracket extending from the listing attributes 106 and encompassing a category attribute 110, one type of characteristic or listing attribute 106 that can be helpful to associate with various listings 104 is a category description of the subject matter offered by the advertisers 102. Such a category description can be referred to as a category attribute 110. One or more category attributes 110 can be used by the system 100 to associate a particular listing 104 with a good, service, or other type of offering (collectively "offering"). In many embodiments of the system 100, category attributes 110 have a hierarchical relationship with each other. For example a digital video camera is a video camera, a camera, and a consumer electronics device all at the same time.

Category attributes 110 can include any attribute or information about the offering of an advertiser that would be potentially be of interest or use to the user 130 seeking to obtain information in a focused manner.

Category attributes 110 and their impact on the processing performed by the system 100, are described in greater detail below.

c. Fee Type Attributes

As indicated by the bracket extending from the listing attributes 106 and encompassing a fee type attribute 112, one type of characteristic or listing attribute 106 that can be helpful to associate with various listings is a "fee type" attribute 112, or simply a "type" attribute 112. The fee arrangement agreed to by the advertiser 102 determines the "type" of advertising product purchased by the advertiser 102.

Fee type attributes 112 relate to financial characteristics of the listing 104 with respect to processing performed by the system 100. For example, some listings 104 can involve charging the advertiser 102 each time a particular listing is presented in a response 144 to a request 132. Such an arrangement can be referred to as a per-hit fee amount 113 where a per-hit payment offered by the advertiser is deducted with each "hit" of the listing. A per-hit fee amount 113 can also involve a charge that is invoked only if the user 130 actually "clicks" on the listing to obtain more information about listing or activates a link on the listing to communicate with the advertiser 102 through the advertiser's 102 website, or some other means. The per-hit fee amount 113, sometimes referred to as a "per-click" fee amount, can also be referred to as a bid amount because the financial value of the per-hit fee amount 113 will be used by the system 100 (but never as the sole factor) in calculating a priority metric for the purposes of awarding better listing placement to advertisers 102 that are generally more valued by an administrator of the system 100. The role of "administrator" is discussed in detail below.

Another example of a type attribute 112 is a fixed-fee amount 111. In contrast to a per-hit fee amount 113, listings 104 of the fixed-fee type 111 do not result in advertisers 102 being charged on a per-hit basis. Instead, fixed-fee type listings 104 result in a set subscription charge for a period of time. Moreover, it is further possible to combine aspects of fee amounts 111 and 113 into a single listing 104. For example, a fixed fee amount 111 may include an enhanced display fee 163 based on a per-hit fee amount 113.

Just as geography attributes 108 and category attributes 110 can be organized into a hierarchy of attributes, fee types 112 can also be organized into a hierarchy of types. That hierarchy is discussed in greater detail below.

The system 100 can be flexibly configured to support a wide range of different "hit" based functionality. The system 100 can support many different kinds of "hits." In a first example, each time a listing 104 is included in a response 144 could be considered a "view hit." In a second example, each time a listing 104 results in a sending of an e-mail through the system 100 could be considered an "e-mail hit." In a third example, each time a user 130 invokes an automated calling feature could be referred to as a "call hit." In a further example, each time a user 130 invokes a web link to an advertiser's 102 web site through a listing 104 could be considered a "web hit." In another example, each time a user invokes an information request to a particular listing 104 could be considered an "information" hit. In a final illustrative example, each time a user 130 invokes a map relating to a particular listing 104 could be considered a "map hit."

In some embodiments of the system 100, phone number information can be hidden within a link identified as a "phone number." The system 100 can be configured to reveal the phone number when a certain user 130 activity occurs, such as moving the mouse over the link. In such a configuration, the movement of the mouse over the link can be considered a "mouse hit."

Thus, every potential interaction between the user 130 and the listing 104 can potentially constitute a particular type of "hit" that is distinguished by the system 100. A single embodiment of the system 100 can include a wide variety of different kinds of hits. Each type of hit can result in a different per-hit fee 113. For example, an advertiser 102 might be willing to pay more for a map hit than a view hit.

d. Review/Rating Attributes

As indicated by the bracket extending from the listing attributes 106 and encompassing a review/rating attribute 109, one type of characteristic or listing attribute 106 that can be helpful to associate with various listings 104 is a compilation of user reviews and/or ratings of the subject matter offered by the advertisers 102. Such a compilation of user reviews and/or ratings can be referred to as a review/rating attribute 109. One or more review/rating attributes 109 can be used by the system 100 to associate a particular listing 104 with an offering or offerings.

Review/rating attributes 109 can include any attribute or information about reviews and/or ratings of an advertiser that would be potentially be of interest or use to the user 130 seeking to obtain information in a focused manner. In some embodiments, ratings for an advertiser's offering or offerings are collected on a numerical scale, e.g., from 1 to 5, 1 to 10, 1 to 100, etc. In some embodiments, reviews of an advertiser's offering or offerings may be collected. Review/rating attributes 109 in many embodiments includes a general, or aggregate, rating for a listing 104. Such an aggregate rating may be based on overall ratings submitted by users 130, or it may consist of some combination of other review/rating attributes 109. Examples of other review/rating attributes 109 may include, but are by no means limited to price, quality of customer support, timeliness of delivery, quality of product, quality of customer service, product selection, etc. In general, review/rating attributes 109 can include a review and/or rating of any attribute that could be associated with a listing 104, including attributes associated with web sites, products, and/or businesses.

2. Advertiser Access Devices

An advertiser 102 interacts with the system 100 through one or more advertiser access devices 114. In some embodiments of the system 100, all of the advertiser's 102 interactions with the system 100 are performed without human intervention on the part of the administrator of the system 100. In such embodiments, listings 104 and all listing attributes 106 are provided to the system 100 through the advertiser access device 114. In other embodiments, certain activities, such as the updating of the listing 104 requires human intervention, while other activities such as increasing a per-hit fee amount 113 or viewing a utilization report, is performed online. The system 100 can also be implemented in such a way as to require that all advertiser 102 interactions occur through human intervention with administrator personnel, but such limitations can prove to be unnecessarily restrictive.

A single advertiser 102 can interact with the system 100 through a wide variety of different advertiser access devices 114. The capabilities and configurations of the particular advertiser access device 114 will depend on the particular function being performed. For example, a cell phone with Internet access may be an acceptable advertiser access device 114 to view a report, while being unsuitable for the creation and submission of a graphic to be included in an updated listing 104.

Any device capable of providing the advertiser 102 with access to the functionality of the system 100 can function as an advertiser access device 114. Advertiser access devices 114 are typically some type of client device capable of interacting with a computer network, such as the Internet. Examples of advertiser access devices 114 include: desktop computers, laptop computers, mainframe computers, mini-computers, cell phones, pagers, personal digital assistants ("PDAs"), or other devices (collectively "computer access devices"). In some circumstances, access devices can also be non-computer devices, such as fax machines, standard telephones with computerized answering options, paper copies of correspondence, and other communication mechanisms. Non-computerized access devices typically require additional human intervention for information to be loaded onto the system 100.

3. Advertiser Interfaces

As indicated by an arrow pointing from the advertiser access device 114 to an advertiser interface 116, and an arrow from the advertiser interface 116 to a server 118, the advertiser interface 116 is the mechanism by which the advertiser 102 (through the advertiser access device 114) interacts with the system 100.

In many embodiments of the system 100, the advertiser interface 116 is a web page accessed by an Internet browser residing within the advertiser access device 114. In other embodiments, the interface 116 may be a wide variety of user interfaces known in the art, such as graphical user interfaces ("GUI"), text-based interfaces, or any other interface capable of being utilized to transmit listing attributes 106 to the system 100, or for receiving reports from the system 100.

B. Information Technology Infrastructure

The system 100 can be implemented in wide variety of different ways. Any configuration of components capable of storing and then accessing information can be used by the system 100 to perform the functionality of the system 100. Listing attributes 106 provided by advertisers 102 must be stored in some way by the system 100, so that the system 100 can provide users 130 with the information that they desire.

1. Servers

As indicated by the arrow disposed between advertiser interface 116 and a server 118, the server 118 is used to receive listing attributes 106 from advertisers 102. The server 118 can be any device or configuration of devices capable of receiving information from one or more interfaces, and housing a set of instructions 120 needed to provide the functionality of the system 100.

In many embodiments, the server 118 is one or more web servers, with the system 100 being provided to users 130 without any charge, through the use of an Internet connection.

2. Instructions

As indicated by the two-way arrow disposed between the server 118 and a set of instructions 120, and from the instructions 120 to a database structure 126, the instructions 120 are the mechanism within the server 118 that interact with the storage of information by the system 100, Any mechanism capable of supporting the logic of the system 100 can be the instructions 120. In many embodiments, the instructions 120 are the various applications, computer programs, and associated files used to support the logic of the system 100 necessary for the functioning of the system 100.

In many embodiments, the instructions 120 will be written in an object-oriented language that is platform independent, such as the JAVA® programming language.

3. Administrative Rules

In supporting the functionality of the system 100, the instructions 120 incorporate various administrative rules 122 that are configured by an administrator of the system 100 (the role of the "administrator" is discussed below). The administrative rules 122, which are discussed in greater detail below, include the particular hierarchies incorporated into the system, and different ways for grouping various listings 104 to meet the needs of advertisers 102 and users 130. For example, the administrative rules 122 can define the particular sub-categories that are associated with the "restaurant" category.

4. Database Structures

As indicated by the two-way arrow disposed between the instructions 120 and a database structure 126 and the bracket originating from the database structure 126 and encompassing a variety of listing records 128, the database structure 126 is the mechanism by which the system 100 accesses the listing records 128.

In many embodiments, the database structure 126 is one or more relational databases. In some alternative embodiments, object-oriented or hierarchical databases can be used. Other methods for storing information, such as arrays, pointers, flat files, and other data storage techniques can be incorporated into the system 100 as the "database structure" 126.

5. Listing Records

The listings 104 and listing attributes 106 provided to the system 100 by the advertiser 102 are stored, updated, processed, and accessed in the form of a variety of listing records 128 that reside within the database structure 126. At discussed above, the contents of listing 104 can vary widely, and thus the contents of the listing records 128 can also vary widely.

As illustrated by the bracket originating from the listing records 128 and encompassing a variety of detailed views 127 and summary views 129, each listing record 128 may include both a detailed view 127 and a summary view 129. However, some listing records 128 may only be associated with a detailed view 127 while other listing records 128 may only be associated with a summary view 129. A properly configured database structure 126 should be able to incorporate the data fields necessary for both types of views. Alternative embodiments of the system 100 may include additional potential views that can be associated with the various listing records 128.

In a typical embodiment of the system 100, the summary view 129 of a listing record 128 is displayed when the listing record 128 is displayed in a list of listings 104, and the detailed view 127 of a listing record 128 is displayed when only one or two listings 104 is actively viewable by the user 130.

Detailed views 127 can include potentially all of the information in the listing record 126, while summary views 129 are typically configured to only present the type of information that would be most important to the user 130 in the initial viewing of the response 144 such as name and a geographical attribute. Detailed views 127 can include information such as: an operating hours attribute, a historical attribute (including an established date), a method of payment attribute, a brand attribute, an e-mail address attribute, a web site attribute, an address attribute, a phone number attribute, and a fax number attribute.

C. Users

A user 130 is any person, organization, or other entity that uses the system 100 to obtain information about advertiser 102. Users 130 can interact with the system 100 through various individuals affiliated with the user 120, such as employees, contractors, or agents. Users 130 can also interact with the system 100 through various information technology mechanisms, such as software applications that are configured or adapted to interface with the system 100. Such interfacing advertiser applications can interact with the system 100 in both an automated and manual manner, engaging in batch, real-time, schedule, and ad-hoc interactions.

In many embodiments of the system 100, the user 130 can also be referred to as a buyer, a purchaser, a requester, a searcher, or a consumer. Users 130 are typically potential purchasers of various goods, services, or other offerings (collectively "products"). However, users 130 can also include individuals or organizations desiring to communicate with "advertisers" 102 to pursue future interactions. For example, users 130 could be potentially new members for churches, political parties, community action groups, employers, and other organizations seeking new members and volunteers. A user 130 can be any entity seeking to obtain information about the existence of another entity (the advertiser 102) through one or more listings 104 residing on the system 100.

As indicated by the arrow originating from the advertiser 130 and pointing to a request 132, users 130 create requests 132 and submit them to the system 100.

Although only one user 130 is displayed in the Figure, it is anticipated that millions of different users 130 could submit requests 132 and receive responses 144 using the system 100. The capacity of the system 100 is only limited by the information technology architecture that supports the functionality of the system 100.

1. Requests and Request Attributes

Requests 132 are invocations by users 130 to obtain information. The purpose of the system 100 is to respond to requests 132. In some embodiments, requests 132 can be stored by the system 100 in building a profile for various users 130. The policy behind such a practice would be that users 130 are likely to have reoccurring interests that they would prefer the system 100 to maintain. In other embodiments, users 130 can save particular requests 132, but such activities require the affirmative decision of the user 130. Some embodiments of the system 100 may include both user profiles and the ability to save requests 132.

As indicated by the bracket extending from the request and encompassing a variety of request attributes 134, the requests 132 received by the system 100 can be said to possess or be associated with, various request attributes 134. Request attributes 134 can be set by the user 130 in accordance with the parameters set by the administrative rules 122 of the system 100. Request attributes 134 provide users 130 with the flexibility to target or focus their requests to listings 104 likely to be of interest to the user 130.

Although request attributes 134 can vary widely from request 132 to request 132 (even within the context of a single user 130 within a single embodiment of the system 100), in many embodiments of the system 100, there are similarities with respect to the particular types of information used by the system 100 as request attributes 134 to describe or define requests 132. Request attributes 134 can be described as various selections made by users 130. Two important types of request attributes 134 typically include a geography selection 136 and a category selection 138. In many embodiments, request attributes 134 can include one or more "blank" or "null" values.

a. Geography Selections

As indicated by the bracket extending from the request attributes 134 and encompassing the geography selection 136, one type of characteristic or request attribute 134 that can be helpful to focus requests 132 is the characteristic of geography.

Geography selections 136 related to specific geographic regions that are of interest to the user 130. Examples of geography selections can include, but are not limited to, a: street address, city, county, state, zip code, country, continent, longitude, latitude, elevation, phone number, fax number, terrain (such as mountainous, forest, jungle, etc.) or any other indicia of geographical information that could be of interest to a user 130 in focusing a request 132 for information. In some embodiments, a business name and/or phone number are types of geographic selections 136.

In a preferred embodiment, geography selections 136 selected by the user 130 correspond to a particular identification or location within a geography hierarchy defined by the administrative rules 122 that are described in greater detail below. In other embodiments, geography selections 136 correspond to geography attributes 108 associated with the various listings 104 stored within the system 100.

Geography selections 136 can be made by users 130 through the typing of text into an editable field, the checking of boxes or radio buttons on a screen, the use of a mouse to select the desired geography selection from a list box, pull-down screen or data window, using a light pen or other device to select the desired geographical region on a map, or through any other mechanism that is convenient for users 130, and capable of capturing the desired geography selections 136. A single request 132 can include multiple geography selections 136. For example, city and zip code information can be supplied as part of the same request 132.

Geography selections 136 and their impact on the processing performed by the system 100, are described in greater detail below.

b. Category Selections

In a preferred embodiment, category selections 138 by the user 130 correspond to a particular location within a category hierarchy defined by the administrative rules 122 that are described in greater detail below. In such embodiments, a directory structure embodying the category hierarchy can be used by users 130 to submit their request 132. In other embodiments, category selections 138 are captured through text fields or other forms of user input that is incorporated into the request 132. In some embodiment, the system 100 can use a dictionary of synonyms and various synonym heuristics and metrics to better match the entries made by the user and the category attributes 110 associated with the various listing records 128 stored within the system 100. In some embodiments, a business name and/or business phone number are types of category selections 138.

One or more category selections 138 can be used by the system 100 to select listing records 128 from the database structure 126. For example, after selecting the category of "consumer electronics" a user 130 may then decide that what they are interested in is really "personal computers." Category selections 138 can include any attribute or information about the offering of an advertiser 102 that would be potentially be of interest or use to the user 130 seeking to obtain information in a focused manner. In some embodiments, multiple category selections 138 can be joined in the same request 132. For example, a user 130 might want to investigate movie theaters and nearby restaurants in tandem. Another example of a multiple category selection 138 within the same request 132 would be the inclusion of both "bars" and "restaurants" in trying to pick a good meeting place for friendly gathering.

Category selections 138 and their impact on the processing performed by the system 100, are described in greater detail below.

c. Review/Rating Requests

In one embodiment, review and/or rating selections 139 are included in request 132, thus allowing user 130 greater control over which listings 104 are included in response 144. In one embodiment, review and/or rating selection 139 is a numerical threshold rating selected by user 130. For example, administrative rules 122 could provide a rating scale from 1 to 10, and allow user 130 to input a number between 1 and 10 indicative of a threshold rating that an advertiser 102 must surpass in order for its listing 104 to be included in a response 144. Those skilled in the art will recognize that many different numerical rating systems with many different scales and/or ranges would be within the spirit and scope of the present invention.

Review and/or rating selections 139 may include a general, or aggregate, rating to be associated with a listing 104. However, review and/or rating selections 139 may also include selections for any review/rating attributes 109 that are included within the system. Moreover review and/or rating selections 139 may include a selection for only one review/rating attribute 109 such as aggregate rating or some other review/rating attribute 109 such as price or quality of customer service, or review and/or rating selections 139 could include selections for multiple review/rating attributes 109. For example, multiple review and/or rating selections 139 could encompass selections for review/rating attributes 109 including price, quality, and timeliness of delivery.

Further, in some embodiments in which user 130 can make multiple review and/or rating selections 139, user 130 can also specify weights that attach to each review and/or rating selection 139. For example, user 130 could be provided with means for inputting weights on a scale of 0 to 1, and could choose to attach weights to review/rating attributes 109 such that price had a weight of 0.8, quality had a weight of 0.6, and timeliness of delivery had a weight of 1.

d. Enhanced Requests

In order to facilitate the needs and goals of users 130, the requests 132 submitted by users 130 can be enhanced in various respects.

i. Supplemental Requests

Some requests 132 are enhanced by follow-up activities by the user 130. These enhanced requests 132 can be referred to as supplemental requests. An example of a supplemental request 132 is a follow-up screen that asks the user 130 for additional information. For example, if a particular company provides a wide variety of vastly different products, at different geographic locations, entering in a business name as part of the request 132 may result in the system 100 prompting the user 130 for additional information about what product the user 130 is looking for or for the appropriate geographical location. In one preferred embodiment, the category attributes 110 associated with the particular company are displayed to facilitate refinement of the request.

In some embodiments of the system 100, the response 144 is provided to the user 130 while simultaneously providing the user 130 with the means to supplement their request 132.

ii. Augmented Requests

Requests 132 can also be enhanced in an automated fashion by the system 100.

In one exemplary approach, the request 132 is adjusted by system 100 because of potential undesirable consequences to accepting the request in an unaltered form. For instance, if the request 132 submitted by the user 130 is somehow incomplete, in error, or otherwise ambiguous, it can be augmented or clarified by the system 100 in accordance with pre-defined heuristics. One illustration of an augmented request 132 is a request containing spelling errors that is corrected by the system 100. Another illustration of an augmented request 132 is the accessing of a lexicon of synonyms by the system 100 so that a request 132 for "bars" catches listings 104 for "nightclubs" and "taverns." A further illustration of an augmented request adjusted by the system is a matching of a generic term with brand names applicable to the term.

Requests 132 can also be augmented with respect to geography selections 136. For example, the network location (such as an IP address) of the user access device 140 can be used to obtain geography information that is not provided by the user 130.

In another exemplary approach, the prior history of interactions ("user history") between the user 130 and the system 100, a user profile, or other forms of system "intelligence" about the desires of the user 130 can be used to augment the requests 132 made by the user 130. For example, as described below, a user profile might indicate a user's ranking of the importance of geography selections 136, category selections 138, and review and/or rating selections 139. In the example above relating to a business offering vastly different products, the system 100 might default to a particular product that has been of interest in the past to the user 130.

In many embodiments, the user 130 is asked to confirm the assumptions, presumptions, and defaults involved in augmented requests 132.

2. User Access Devices

A user access device 140 is the device through which the user 130 interacts with the system 100. As indicated by the arrows pointing to and away from the user access device 140, the user access device 140 is the means by which requests 132 are submitted to the system 100, and the means by which a response 144 is received by the submitting user 130.

Users 130 can interact with the system 100 through a wide variety of different user access devices 140. Any device capable of providing the user 130 with the ability to submit requests 132 to the system 100 and receive responses 144 from the system 100 can function as a user access device 140. User access devices 140 are typically some type of client device capable of interacting with a computer network, such as the Internet. Examples of user access devices 140 include: desktop computers, laptop computers, mainframe computers, mini-computers, cell phones, pagers, personal digital assistants ("PDAs"), or other devices (collectively "computer access devices"). In some circumstances, access devices can also be non-computer devices, such as fax machines, standard telephones, telephones with computerized answering options, and other communication mechanisms. Non-computerized access devices typically require additional human intervention for information to be loaded onto the system 100 or to receive responses 144 provided by the system 100.

3. User Interfaces

As indicated by an arrow pointing from the user access device 140 to and from a user interface 142, the arrow pointing from the user interface 142 to the server 118, and the arrow from the response 144 to the user interface 142, the user interface 142 is the interface by which the user 130 interacts with the system 100. Requests 132 are submitted to the system 100 through the user interface 142, and responses 144 are sent by the system 100 to the user 130 through the user interface 142.

In many embodiments of the system 100, the user interface 142 is a web page accessed by an Internet browser residing within the user access device 140. In other embodiments, the user interface 142 may be a wide variety of user interfaces known in the art, such as graphical user interfaces ("GUI"), text-based interfaces, or any other interface capable of being utilized to transmit requests 132 to the system 100 and receive responses 144 from the system 100.

4. Responses

A response 144 is transmitted by the system 100 from the server 118 to the user 130 through the user interface 142 and the user access device 140. Each request 132 received by the system 100 typically results in the transmission of one response 144. Responses can be sufficiently large as to require the user 130 to scroll through several pages of listings 104 in order to view the entire response 144.

In some alternative embodiments, a single request 132 could result in multiple responses 144, and multiple requests 132 could be aggregated into a single response 144.

Responses 144, and the one or more groups of listings that make up the response 144, are discussed in greater detail below.

D. Administrator

As discussed above, the functionality of advertisers 102 submitting listings 104, and the functionality of users 130 submitting requests 132 and receiving responses 144, can occur in a highly automated manner requiring little or no human interaction. However, discussed above, the system 100 is configured by various administrative rules 122. Those administrative rules 122 are the responsibility of an administrator 160.

Figure 2:
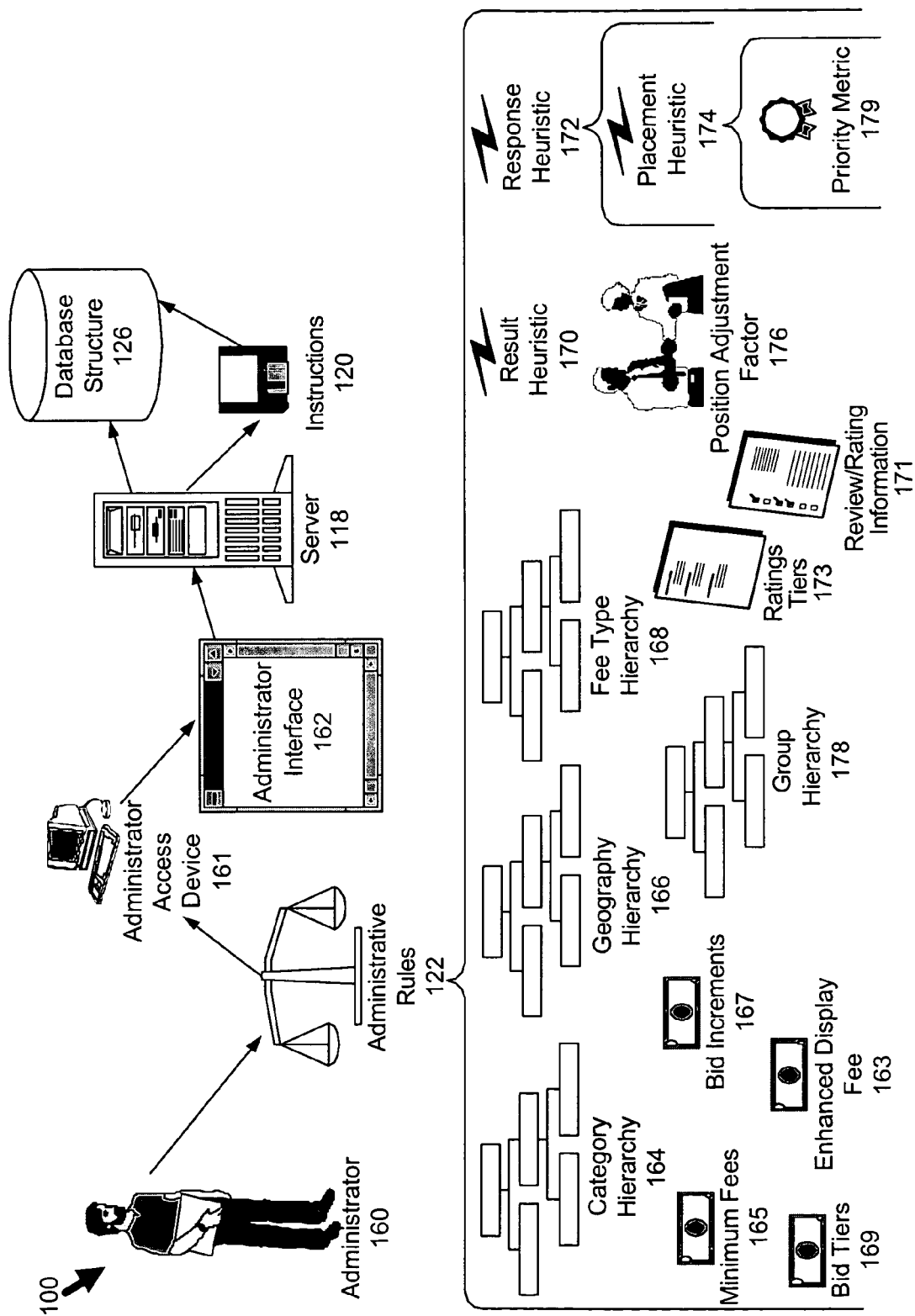
FIG. 2 is a block diagram illustrating one example of the administrative aspects of an information distribution system, including the components used by the administrator to support the performance of the system, the types of information processed by administrators of the system, and some of the ways in which administrator interacts with the system.

FIG. 2 is an environmental block diagram illustrating one example of the administrative aspects of an information distribution system 100, including the components used by the administrator 160 to support the performance of the system 100, the types of information processed by administrator 160 of the system 100, and some of the ways in which administrator 160 interacts with the system 100.

An administrator 160 is any person, organization, or other entity that provides the system 100 used by advertisers 102 to submit listings 104 and by users 130 to send requests 132 and receive responses 144. Administrators 160 can interact with the system 100 through various individuals affiliated with the administrator 160, such as employees, contractors, or agents. The administrator 160 can also interact with the system 100 through various information technology mechanisms, such as software applications that are configured or adapted to interface with the system 100. Such interfacing advertiser applications can interact with the system 100 in both an automated and manual manner, engaging in batch, real-time, schedule, and ad-hoc interactions. As the maintainer of the system 100, the administrator 160 can also modify the performance of the system 100 outside of the software applications or other instructions 120 that make up the system 100.

A particular individual can interact with the system 100 through more than one role. For example, the administrator 160 can also exist as advertisers 102 within the system 100 by providing listings 104 to the system 100. That same administrator 160 may access the system 100 as a user 130 to obtain information for personal or household use.

The most important function of the administrator 160 involves the administrative rules 122, which control how the system 100 works. For example, administrative rules 122 determine what listings 104 are included in a response 144, and how those listings 104 are ordered or placed in a response 144. Administrative rules 122 are submitted to the system 100 through an administrator access device 161.

1. Administrator Access Devices

Administrators 160 can interact with the system 100 through a wide variety of different administrator access devices 161. The capabilities and configurations of the particular administrator access device 161 will depend on the particular function being performed. For example, a cell phone with Internet access may be an acceptable administrator access device 161 to view a report, while being unsuitable for the creation or modification of the instructions 120 which implement the administrative rules 122.

An administrator 160 interacts with the system 100 through one or more administrator access devices 161. The administrator access device 161 can allow the administrator 160 to configure the system 100 by accessing the instructions 120 through an administrator interface 162. Certain modifications to the system 100 will require that the administrator 160 modify the instructions 120, the administrative rules 122 and/or the database structure 126 in ways that cannot be accomplished within the scope of the software application(s). Such interactions can also be performed using the administrator access device 161.

Any device capable of providing the administrator 160 with access to the functionality of the system 100 or access to the information technology architecture that underlies the system 100 can function as an administrator access device 161. Examples of administrator access devices 161 include: desktop computers, laptop computers, mainframe computers, mini-computers, cell phones, pagers, personal digital assistants ("PDAs"), work stations, or other devices (collectively "computer access devices").

3. Administrator Interfaces

As indicated by an arrow pointing from the administrator access device 161 to an administrator interface 162, and from the administrator interface 162 to the server 118, the administrator interface 162 is the mechanism by which the administrator access device 161 and the administrator 160 interact with the system 100 with respect to activities that occur through the use of the software application or instructions 120, and in contrast to those activities that are performed outside of the instructions 120 by more directly interacting with the information technology architecture.

The administrator interface 162 will typically be some type of graphical user interface for configuring the instructions 120, the database structure 126, the administrative rules 122 and/or the system 100. In some embodiments, certain functionality may be performed through a web page accessed by an Internet browser so long as the administrator 160 using the administrator interface 162 provides the appropriate login information and password. The administrator interface 162 and the advertiser interface 116 should operate through secure connections to prevent misuse. In contrast, user interfaces 142 need not function through secure connections. Even embodiments where users 130 can build profiles and save various responses 144 need not be secured, although it may be desirable to provide secure connections when practical.

4. Administrative Rules

The administrative rules 122 that make up the system 100 can take on a wide variety of forms. Each embodiment of the system 100 can involve different types and combinations of administrative rules 122. The system 100 need not include all of the different types of administrative rules identified in the Figure.

a. Category Hierarchy

A category hierarchy 164 can be used by the system 100 to take into consideration the relationships between different categories, sub-categories, and category attributes 110. The user interface 142 can provide the category hierarchy 164 to users 130 in the form of a directory so that the user 130 can make category selections 138 without needing to type in any text. The category hierarchy 164 can be pre-defined by the administrator 160. The administrator 160 may need to update the category hierarchy 164 from time to time as new offering categories develop. For example, product categories such as digital video cameras and DVD burners are relatively new, as compared to film cameras and tape recorders. Dissimilar systems 100 can incorporate different category hierarchies 164 of varying depths. Different categories may be associated with varying numbers of subcategories. Processing involving the category hierarchy 164 is discussed in greater detail below.

b. Geography Hierarchy

A geography hierarchy 166 can be used by the system 100 to take into consideration the relationships between different geographical regions and geography attributes 108. The user interface 142 can provide the geography hierarchy 166 to users 130 in the form of a directory so that the user 130 can make geography selections 136 without needing to type in any text. However, in many embodiments, information such as street addresses, cities, and zip codes, will typically be typed in by users 130. The geography hierarchy 166 can include information relating to a general classification of geographical scope. For example, a particular geographic region can be associated with the label of being a nation, state/region, county, or city. Different systems 100 can incorporate different geography hierarchies 166 of varying depth. Different geographical regions may be associated with varying numbers of sub-regions. For example, a heavily populated urban area (e.g., New York City) may use additional geographic attributes to break down the region into yet smaller geographical regions, while a county in Alaska may not be associated with any cities. Processing involving the geography hierarchy 166 is discussed in greater detail below.

c. Fee Type Hierarchy

The system 100 can incorporate a wide variety of different fee types that can be used to charge advertisers 102 for their listings 104. The system 100 can be configured to prioritize and display listings 104 on the basis of distinctions relating to fee attributes associated with the listing 104, include fee type information. In some embodiments, different fee types 112 can possess a hierarchical relationship with other fee types 112, and those relationships can be represented in the form a fee type hierarchy 168. Dissimilar systems 100 can incorporate different fee type hierarchies 168 of varying depths. Different fee types 112 may be associated with varying numbers of sub-types. Processing involving the fee type hierarchy 168 is discussed in greater detail below.

d. Review/Rating Information

In some embodiments the system 100 uses a variety of different kinds of review and/or rating information 171 to account for feedback provided by users 130 regarding various advertisers 102 and their associated listings 104. Review and/or rating information 171 generally includes a rating on a numerical scale that has been assigned to an advertiser 102 and/or a listing, .e.g., seven out of ten, or four stars out of five, etc. Further, in some embodiments, review and/or rating information 171 can include a textual description or summary of feedback provided by users 130. Further, in many embodiments, review and/or rating information 171 includes multiple ratings associated with multiple review/rating attributes 109 associated with a listing 104. Examples of review/rating attributes 109 are provided above, and those skilled in the art will recognize that a wide variety of review/rating attributes 109 may be associated with review and/or rating information 171 for a listing 104. In some embodiments, review and/or rating information 171 includes ratings tiers 173. As described in more detail below with reference to FIG. 39, each review and/or rating information 171 for a listing 104 may be assigned a rating tier 173 that is essentially a weight indicating the importance of review and/or rating information 171 relative to review and/or rating information 171 assigned to other tiers.

Review and/or rating information 171 may be used in conjunction with information from category hierarchy 164, geography hierarchy 166 and/or fee type hierarchy 168. Processing involving review and/or rating information 171 is discussed in greater detail below.

e. Result Heuristic

A result heuristic 170 is the process by which the results of a request 132 are obtained. If the system 100 incorporates different hierarchies, then the relationships embodied in those hierarchies should be utilized by the result heuristic 170. In many embodiments, the result heuristic 170 and the process performed by a response heuristic 172 are identical. However, in some embodiments of the system 100, certain listings 104 contained in the "result" generated by the result heuristic 170 are not placed within the "response" 144 generated by a response heuristic 172. That is because in some embodiments, certain listings 104 are deemed to be of less interest to the user 130, and are thus not included in the response 144. In other words, in certain embodiments, the response heuristic 172 is configured to be more selective than the result heuristic 170 if the result heuristic 170 identifies a sufficient number of listings 104 to be included in the response 144 to the user 130. The administrator 160 may have additional reasons to exclude a listing 104 that would otherwise be displayed to the user 130. For example, if the advertiser 102 had not yet paid the per-hit fees for the past month or other specified period, the listing 104 could be excluded by the response heuristic 172 even though it was included in the results produced by the results heuristic 170.

Processing to identify and populate the response 144 with relevant listings 104 is described in greater detail below.

f. Response Heuristic

The response heuristic 172 is the process performed by the system 100 to populate the response 144. In many embodiments, there is no difference between the response 144 and the result, and thus there is no result heuristic 170 that is distinct from the response heuristic 172. However, the system 100 is flexible enough to incorporate a different heuristic to generate an initial tentative pool of listings 104, and then to follow-up by potentially removing certain listings 104 from the pool of listings 104 that are ultimately provided to the user 104 in the form of a response 144. The response heuristic 172 also formats the response 144, and formats the display and otherwise organizes the contents of the response 144. The response heuristic 172 includes the functionality of a placement heuristic 174, the process by which the system 100 makes placement decisions regarding the listings 104 in the response 144.

The response heuristic 172 should include as inputs, any of the data hierarchies (such as the category hierarchy 164 or geography hierarchy 166) supported by the system 100. Information within the detailed view 127 of listings can be acted upon by the system 100 to re-sort, re-position, or otherwise alter the display of the various listings 104 disclosed to the user 130 within the response 144.

Processing to identify and populate the response 144 with relevant listings 104 is described in greater detail below.

g. Placement Heuristic

As identified by the bracket originating from the response heuristic 172 and encompassing the placement heuristic 174, the placement heuristic 174 is a sub-process that is part of the response heuristic 172. The placement heuristic 174 determines the placement and order of various listings 104. Any of the different attributes processed by the system 100 can be used by the placement heuristic 174 to arrange the display of the response 144. For example, in response to a national request, the placement heuristic 174 may be configured to give the best three spots to listings associated with the three highest fixed fee amounts 111, while providing spots four and five to the listings 104 associated with the top two per-hit fee amounts 113. In many embodiments, the placement heuristics 174 performed by the system 100 can be influenced by a priority metric 179 (discussed below). Alternative influences on the placement heuristic 174 can include but are not limited to affiliation with a particular group 232, fee types 112, per-hit fee amounts 113, fixed fee amounts 111, geography attributes 108, category attributes 110, review/rating attributes 109, the number of reviews and/or ratings in review and/or rating information 171, a date/time stamp, and/or a variety of different listing attributes 106 pertaining to a particular listing 104. The placement heuristic 174 can also be influenced by the administrative rules 122 and request attributes 134.

A tier placement heuristic is a placement heuristic 174 that is specific to one or more tiers 169. Tier placement heuristics 174 can vary as widely as any other placement heuristic 174.

Many different examples of placement processing are discussed in greater detail below.

h. Priority Metric

A priority metric 179 can be used by the placement heuristic 174 to identify the desired order of various listings 104. The inputs for the calculation of the priority metric 179 can include virtually any of the listing attributes 106 and request attributes 134 relating to the listing 104.

In some embodiments, the priority metric 179 is calculated from the type fees 112 paid by the particular advertiser 102 and a position adjustment factor 176 to incorporate the broader relationship between the administrator 160 and the advertiser 102. In those embodiments, listings 104 are organized into various groups on the basis of category attributes 110, geography attributes 108, review/rating attributes 109, per-hit fee amounts 113, fixed fee amounts 111, and/or fee type attributes 112. The priority metric 179 is typically used within those group boundaries to determine the order of intra-group listings 104. Inter-group prioritization is typically determined by the relative desirability of the groups themselves, and not the individual priority metric 179 associated with the individual listings 104.

In other embodiments, the categorical and geographical scope of the listings 104 directly impact the priority metric 179 and all prioritization occurs on an inter-group basis.

The priority metric 179 can influenced by a popularity metric that takes into consideration the number of "hits" associated with a particular listing 104 over a particular period of time. The priority metric 179 can also be influenced by a relevance metric that takes into consideration the estimated relevance of a particular listing 104 with respect to the particular request 132 submitted the user 130. In some embodiments the relevance metric may consider, among other things, a review/rating selection 139. The relevance metric may also be based on a user profile that ranks the relative importance to the user 130 of geography selections 136, category selections 138, and/or review and/or ratings selections 139.

Group-based processing and the use of the priority metric 179 are described in greater detail below.

i. Position Adjustment Factor

A position adjustment factor 176 is the mechanism by which relationship-based attributes between the administrator organization 160 and the advertiser 102 can be used to impact the processing of listing-based attributes. In some embodiments of the system 100, a profile is maintained for each advertiser 102. The advertiser profile can be used by the system 100 to calculate or otherwise generate the position adjustment factor 176 in an automated manner without any human intervention. In other embodiments, the position adjustment factor 176 may be less dynamic, or may be entirely absent from the system 100.

The position adjustment factor 176 can be used to impact the calculation of the priority metric 179 for a particular listing 104. The purpose of the position adjustment factor 176 is to take into consideration the broader relationship between the advertiser 102 and the administrator 160. For example, a loyalty factor that includes the length of time that the advertiser 102 has paid for listings on the system 100 can be used to adjust the priority metric 179 in an upward direction. The position adjustment factor 176 can also include an analysis of activities outside or independent of the system 100. For example, the size of an advertiser's advertising budget, the status of the advertiser 102 as a purchaser of other products, services or offerings sold by the administrator 160, and any other consideration relevant to the goals of the administrator 160 can be incorporated into the priority metric 179 for a particular listing 104. Considerations relating to the system 100 can also be incorporated as position adjustment factors 176. Examples of position adjustment factors 176 include but are not limited to: the total number of listings 104 paid for by the advertiser 102; the total number of categories in which the advertiser 102 has paid for listings; the geographic scope of the aggregate listings 104 paid for by the advertiser 102; the total monies paid by the advertiser 102 to the administrator 160 over a pre-defined period of time; the number of ratings and/or reviews that a listing 104 has received from users 130; and any other potentially relevant business factor relating to the administrator 160.

The process for using position adjustment factors 176 to calculate the result heuristic 170 is discussed in greater detail below. Listings 104 that are affiliated with position adjustment factors 176 of a non-zero value can be referred to as "affiliated listings." In some embodiments, position adjustment factors can be negative as well as positive values.

j. Group Hierarchy

To maximize the ability of the system 100 to focus on the desired goals of the user 130, a fully normalized group hierarchy 178 can be used to support system 100 distinctions on the basis of each of the other data hierarchies supported by the system 100. Whatever the relevant selections made in the request 132 submitted by the user 130, the relevant groups to be included in the resulting response 144 can be identified. Only listings 104 affiliated with the appropriate groups are then used to populate the response 144. For example, if the selections made by the user 130 include a geography selection of national advertisers with a service area in the city of Detroit, and the category selection of hair salons, one of the groups in the response will be made solely of national hair salons with service areas in the city of Detroit.

The utility and variations of group-based processing are discussed in greater detail below.

k. Minimum Fees/Minimum Metric Values

The ways in which fees are charged to advertisers 102 and the ways in which listings 104 are prioritized by the system 100 are subject to considerable configuration by the administrator 160 of the system 100. One limitation that can be imposed on the system 100 is a minimum payment necessary to obtain a fixed-fee listing 104 or a per-hit listing 104. The administrator 160 may determine that the overall profitability and utility of the system 100 is enhanced by encouraging advertisers 102 to pay a per-hit fee amount 113 above a predetermined threshold, as through a bidding process. A per-hit fee amount 113 need not be related to bidding, however. Offers to pay a per-hit fee amount 113 below the predetermined threshold may not be worth the time and effort by the administrator 160. Minimum fees 165 can distinguish between different listing attributes 106. For example, local advertisers 102 for categories such as restaurants might be required to pay a larger minimum fee 165 because local listings 104 are more likely to result in a follow-up restaurant transaction by the user 104 than a national listing 104 for a bookstore without a service area in local geographical area.

Examples of minimum fees 165 being implemented by the system 100 are discussed in greater detail below. In embodiments of the system 100 where competition between listings 104 is not based on competitive bidding (bid-based approaches) the phrase "minimum bid amount" or "minimum metric value" may refer to a minimum value of whatever competitive metric is used by the system 100. For example, if listings 104 compete on the basis of a relevancy metric, then a minimum metric value can be used in place of minimum bid amount 165.

l. Minimum Bid Increments/Minimum Metric Increments

Just as the system 100 can place limitations on the minimum fee 165 needed for a per-hit fee amount 113, the system 100 can also be configured to require certain incremental bids when incorporated into a per-hit fee amount 113 to achieve priority over listings 104 associated with a minimum fee 165. For example, if the minimum per hit fee amount 113 is $0.40, the system 100 can be configured to require that a higher per hit fee amount 113 be at least $0.45.

Just as administrators 160 may set different minimum fees 165 for different groups on the group hierarchy 178, administrators may also set different minimum bid increments 167.

Examples of minimum bid increments 167 being incorporated into the system 100 are discussed in greater detail below.

In embodiments of the system 100 where competition between listings 104 is not based on competitive bidding (bid-based approaches) the phrase "minimum bid increments" or "minimum metric increments" may refer to a minimum value of whatever competitive metric is used by the system 100. For example, if listings 104 compete on the basis of a relevancy metric, then a minimum metric increment can be used in place of minimum bid increment 167.

m. Bid Tiers/Listing Tiers

As part of an effort to increase the per-hit fee amounts 113 associated with listings 104, the administrative rules 122 can define a wide variety of different bid tiers 169. All bids within the range of the bid tier 169 are ordered in accordance with a placement heuristic 174 that is particular to that tier, a tier placement heuristic. In many embodiments, the tier placement heuristic 174 orders listings 104 in a random fashion with respect to intra-tier positioning (a "random heuristic"). In other embodiments, a weighted random heuristic is used to order listings 104 within a particular tier 169. With a weighted random heuristic. The per hit fee 113 (or whatever other metric such as a priority metric 179 is used to classify a particular listing 104 as belonging to a particular tier 169) modifies what would otherwise be a purely random heuristic. For example, in a tier 169 consisting of two listings 104 that is defined by a per-hit fee 113, the listing with twice the per-hit fee would have twice the likelihood of taking the "pole position" within the tier 169, than the other listing 104 within the tier. Just as tier placement heuristics 174 can vary widely, a wide variety of different tier placement heuristics 174 can implemented within the same response 144.

Some tiers 169 can be based on fixed value ranges, and involve a variable number of listings 104. Bid tiers 169 can be based on bid ranges that are as small as fractions of a cent (using US monetary nomenclature) or as large as deemed desirable by the administrator 160. For example, in a particular response, there may be anywhere between 0 and X (the number of listing 104 within the response) associated with a particular per-hit fee 113.

In other embodiments, the number of tiers 169, and the number of listings 104 within those tiers 169 are predefined in accordance with the administrative rules 122. For example, a response 144 could be configured to include six tiers 169 of three listings 104 each. In such an environment, the ranges of values of per-hit fees 113 or any other competitive metric such as a priority metric 179 can be highly variable.

Listings 104 within the system 100 can be selectively identified by the system 100 as belonging to a particular tier 169 on the basis of a per hit fee 113 associated with the listing, a priority metric 179 associated with the listing, or any other listing-based attribute 106. In a preferred embodiment, tiers 169 are defined with respect to rankings relating to priority metrics 179 associated with the various listings 104.

n. Enhanced Display Fee

An enhanced display fee 163 can be charged for listings 104 in conjunction with various pre-defined "prominence products" offered by the administrator 160. Prominence products relate to listing attributes that impact how a listing is perceived by users 130. The following listing attributes 106 are examples of potential bases for charging some type of enhanced display fee of the listing: (a) length of text (as measured in characters, words, sentences, or any other metric); (b) font size; (c) font type; (d) incorporation of graphics; (e) incorporation of color; (f) incorporation of animation; (g) an interactivity opportunity; (h) a detailed view; or (i) any other mechanism that calls more attention to the listing 104. Some forms of enhanced display formats are mutually exclusive. For example, if text is written in the Arial 12 font, then that same text cannot be written in Times New Roman 14 font. An enhanced listing 104 can be enhanced with respect to more than one display-related attribute.

In some embodiments, the enhanced display fee 163 lowers the impact of the overall per-hit fee amount 113 on the priority metric 179. For example, if the per-hit fee amount is $0.50, and the enhanced display fee is $0.30 per-hit, then the portion of the per-hit fee amount 113 that is used to calculate the priority metric 179 is $0.20.

Listings 104 that are associated with enhanced display fees 163 and the corresponding enhanced display format can be referred to as "enhanced listings." The system 100 can be configured in such a way as to transform a particular listing 104 into an enhanced listing in selective circumstances, typically depending on the type of request 132. For example, the system 100 could be configured to enhance a listing 104 in the case of a nationwide search for consumer electronics stores, but not to enhance the listing 104 in the context of a search for local repair shop for electronic items. The various uses of the enhanced display fee 163 are discussed in greater detail below.

o. Reviews and/or Ratings

The ways in which review and/or rating information 171 impacts the ways in which listings 104 are prioritized by the system 100 are subject to considerable configuration by the administrator 160 of the system 100. One limitation that can be imposed on the system 100 is a minimum number of reviews and/or ratings necessary to be included in a tier 169. For example, the administrator 160 may determine that only listings 104 that have received a certain number of ratings should be included in a tier 169 because the number of reviews and/or ratings in review and/or rating information 171 may be an indicia of the quality of a listing 104.

III. Category-Based Processing

A. Description of Category Hierarchy Diagrams

1. Abstract Diagram of Category Levels

Figure 3A:
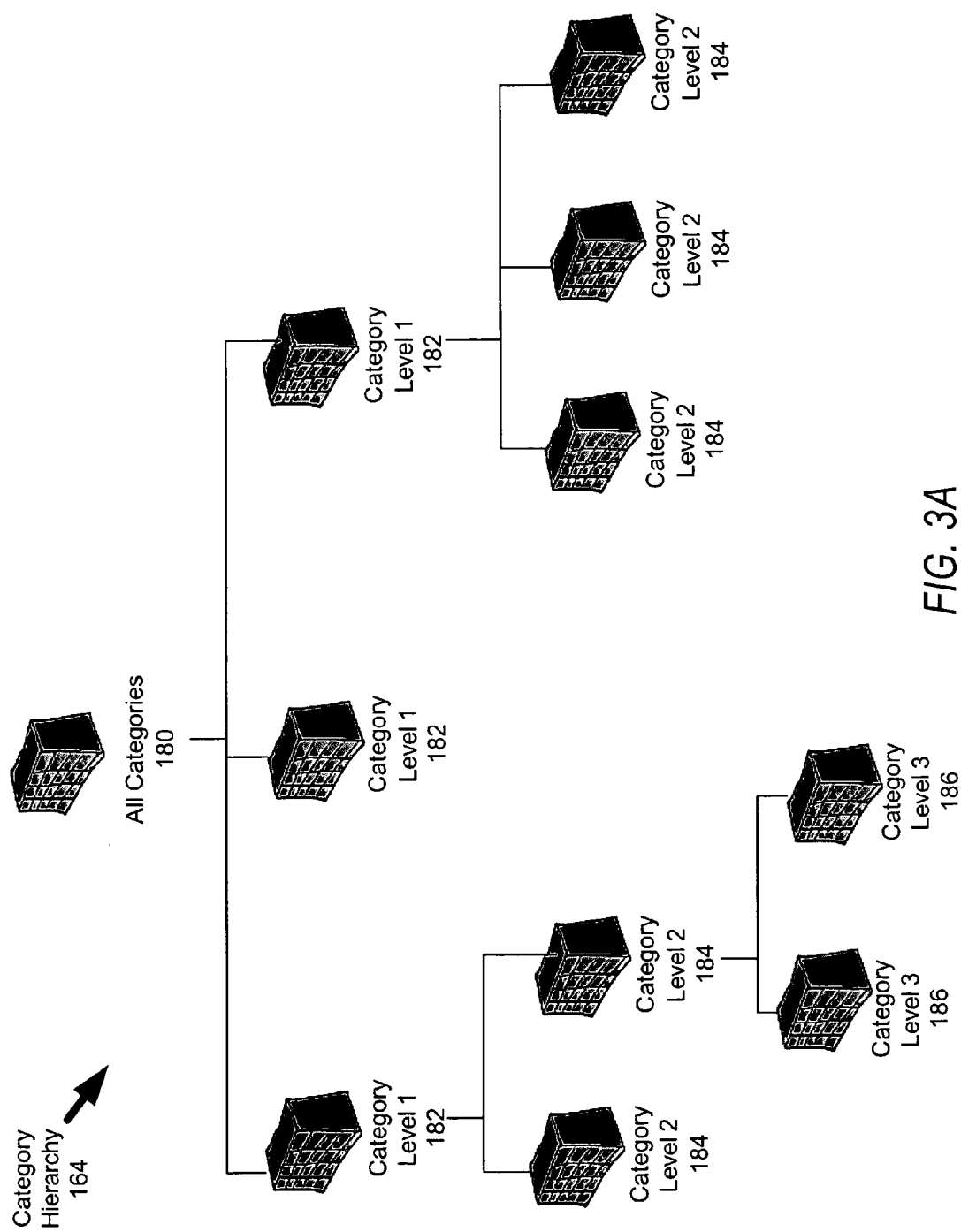
FIG. 3*a* is a hierarchy diagram illustrating one example of a category hierarchy that is three-levels deep.

FIG. 3a is a hierarchy diagram illustrating one example of a category hierarchy 164 that is three-levels deep. Different embodiments of the system 100 can incorporate widely different category hierarchies 164 with different levels of depth. Some embodiments will include hierarchies that are only one level deep, while others may include hierarchies that are much deeper than three-levels deep. The proper design of the category hierarchy 164 is dependent upon the scope of the goods, services, and other offerings to be advertised on the system 100.

At the top of the diagram is the aggregation of all categories 180. At this level of abstraction, all products are part of the same meta-category and category attributes 110 do not possess any special status with respect to the processing of the system 100. In such an embodiment, category attributes 110 are processed like any other "search term" functioning as a key word by a search engine. For example, the term "restaurant" would exist as a potential search term, but there would not be a subset of listings 104 categorized in terms of subject matter.

Below the meta-category 180 are the level 1 categories 182. On a directory structure, level 1 categories 182 are the large categories. For example, "restaurants" might be an appropriate level 1 category 182. Some embodiments of the system 100 may involve category "hierarchies" 164 that are only one level deep. Such "hierarchies" do not truly incorporate category hierarchical relationships, because no category is a sub-category of another. However, unlike the meta-category embodiment described above, a category hierarchy 182 that is one level deep does allow listings 104 to be organized into categories in a way that is superior to the use of search engine search terms. Category attributes 110 are more useful than a search term submitted to a search engine as a "key word" because the listings 104 are organized into categories 182 in a holistic manner, in contrast to the more superficial text searching invoked by a search engine.

Below level 1 categories 182 are two or more level 2 categories 184. In some embodiments, a particular category may have only one sub-category. Each level 2 category is a sub-category of a level 1 category 182, but each level 1 category 182 need not be associated with level 2 categories 184. One example of a level 2 category 184 in relation to a level 1 category is the relationship between "Italian Restaurants" and "Restaurants" generally. Every Italian Restaurant is a Restaurant, but not all Restaurants are Italian Restaurants.

Below level 2 categories 184 are two or more level 3 categories. Each level 3 category 186 is a sub-category of a level 2 category 184, but each level 2 category 184 need not be associated with level 3 categories 186. One example of a level 3 category 186 in relation to a level 2 category is the relationship between "Italian Restaurants that offer pizza delivery" and "Italian Restaurants" generally. Every Italian Restaurant that offers pizza delivery is an Italian Restaurant, but not all Italian Restaurants offer pizza delivery.

The illustration in FIG. 3a is provided solely for the purpose of illustrating the concept of hierarchical relationships in the context of category attributes 110. In many embodiments of the system 100, the actual category hierarchy 164 would be too large to fit on even many different sheets of paper.

2. Category Hierarchy Populated with Examples

Figure 3B:
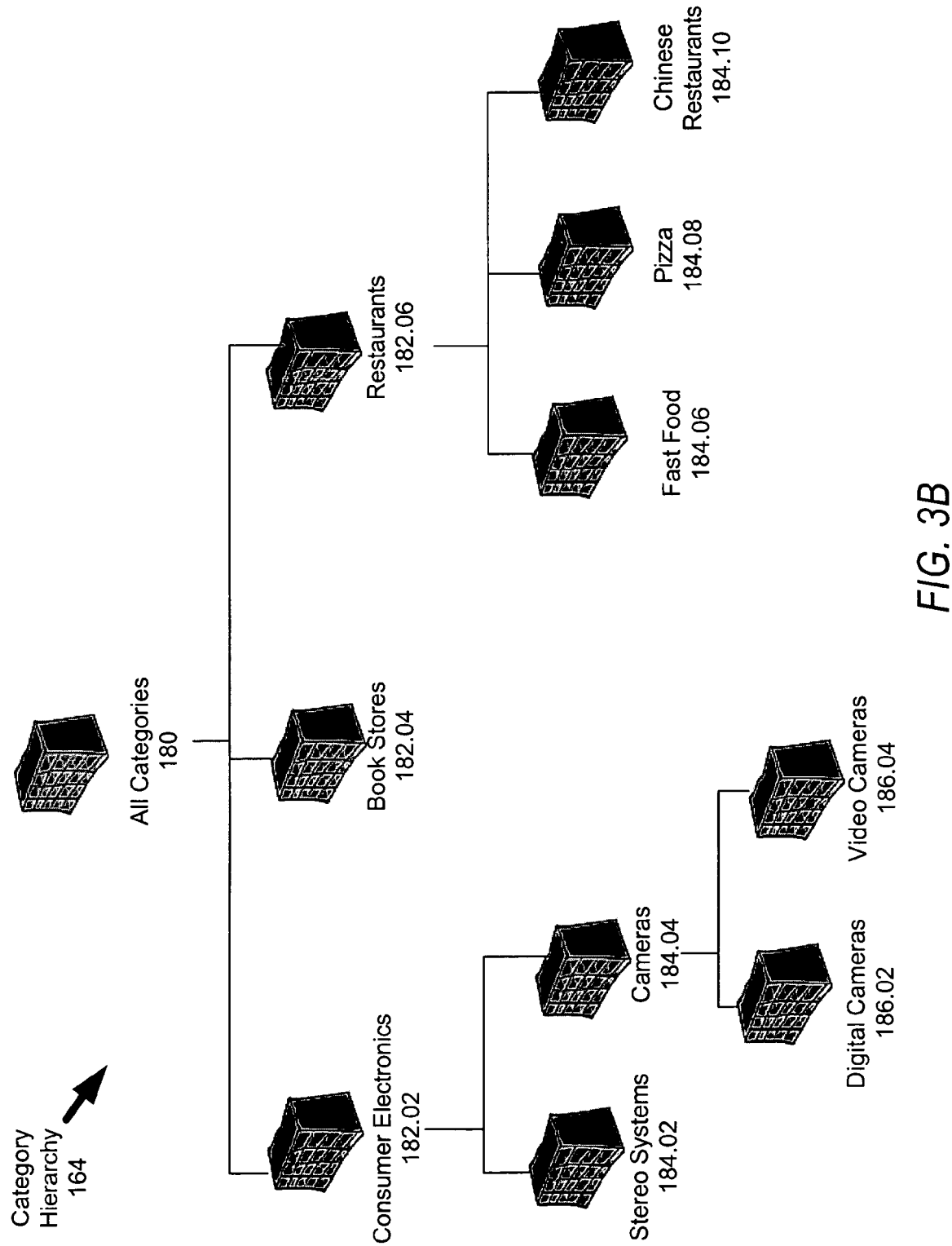
FIG. 3*b* is a hierarchy diagram illustrating a specific example of the types of categories that can be incorporated into the system.

FIG. 3b is a category hierarchy diagram 164 illustrating a specific example of the types of categories that can be incorporated into the system 100. Beneath the meta-category of all categories 180 are three level 1 categories 182, including a Consumer Electronics category 182.02, a Book Store category 182.04, and a Restaurant category 182.06.

The Consumer Electronics category 182.02 is made up of two sub-categories, a Stereo System category 184.02 and a Cameras category 184.04. The Stereo System category 184.02 is not made up of any sub-categories, while the Cameras category 184.04 is made up of the sub-categories of Digital Cameras 186.02 and Video Cameras 186.04. The Book Stores category 182.04 is an example of a level 1 category 182 that is not made up of any sub-categories. In a real world implementation of the system 100, such an outcome may be indicative of a category hierarchy 164 in need of change in design. For example, a real world implementation of a level 1 category 182 without level 2 categories 184 may indicate that the level 1 category is to narrow, or conversely, that the level 1 category 182 should be associated with various sub-categories (e.g. level 2 categories 184). However, for the purposes of illustration, it is important to note that different branches of the category hierarchy 164 are of different lengths, and themselves result in a different number of sub-branches. That diversity of structure can include level 1 categories 182 that are not associated with any sub-categories.

The level 1 category of Restaurants 182.06 is made up of three sub-categories in the Figure, a Fast Food category 184.06, a Pizza category 184.08, and a Chinese Restaurants category 184.10.

B. How can the Category Hierarchy Impact Requests?

In many embodiments of the system 100, a category selection 138 is part of the request 132 submitted by the user 130. In a subset of those embodiments, the category selection 138 is made by the user 130 using a directory structure that represents the category hierarchy 164. In such embodiments, the category selection 138 can be made without the typing in of any text by the user 130. In other embodiments, the category selection 138 is entered as text that is then translated into the appropriate category in the category hierarchy 164.

C. How can the Category Hierarchy Impact Results?

Listings 104 can be either included or excluded from the results on the basis of similarities between the category selection 138 and the category attributes 110 associated with the various listings 104. The degree to which those two variables overlap can be evaluated using the category hierarchy 164. In many embodiments, the category hierarchy 164 has a substantial impact on how groups are defined by the system 100 with respect to the particular request 132.

Distinctions within the category hierarchy 164 can be used to distinguish between category attributes 110 within the result. The more complex and developed the category hierarchy 164, the finer the possible distinctions that can be made. For example, if the hierarchy 164 distinguishes between digital cameras and more traditional analog cameras, then requests 132 by users 130 can take advantage of the fact that the administrator 160 has organized the various camera listings 104 into listings for digital cameras and more traditional cameras. If a particular advertiser 102 has a surplus of one type of camera but not the other, that advertiser 102 has the opportunity to pay a greater fee relating to the applicable category in order to reduce the surplus inventory. If the system 100 possesses a less detailed category hierarchy 164, or lacks a category hierarchy 164 altogether, the ability of the system 100 to focus the efforts of users 130 is impeded.

D. How can Category Hierarchy Impact the Response?

In many embodiments, there is no distinction between the results and the responses 144. However, in certain embodiments, the response 144 is generated by modifying the result with the response heuristic 172. In such embodiments, the response heuristic 172 performs the function of further filtering out listings 104 on the basis of the various listing attributes 106 associated with the listings 104. In embodiments where there is a distinction between the result and the response 144, the category hierarchy 164 can be utilized to generate the result as well as the response 144.

In the same way that the category hierarchy 164 can impact which listings 104 result from the application of the request 132 to the database structure 126, the category hierarchy can also play a part of "winnowing out" certain listings 104 from the response 144 that were tentatively included in the results. As discussed both above and below, distinctions in the category hierarchy 164 can be an important input for the dynamic identification of relevant groups from the group hierarchy 178 to be included in the response 144.

Distinctions within the category hierarchy 164 can impact what groups from the group hierarchy 178 are included in the response 144, which listings 104 are included in the response 144, and how the various listings 104 are organized within the response 144.

IV. Geography-Based Processing

A. Description of Geography Hierarchy Diagrams

1. Abstract Diagram of Geography Levels

Figure 4A:
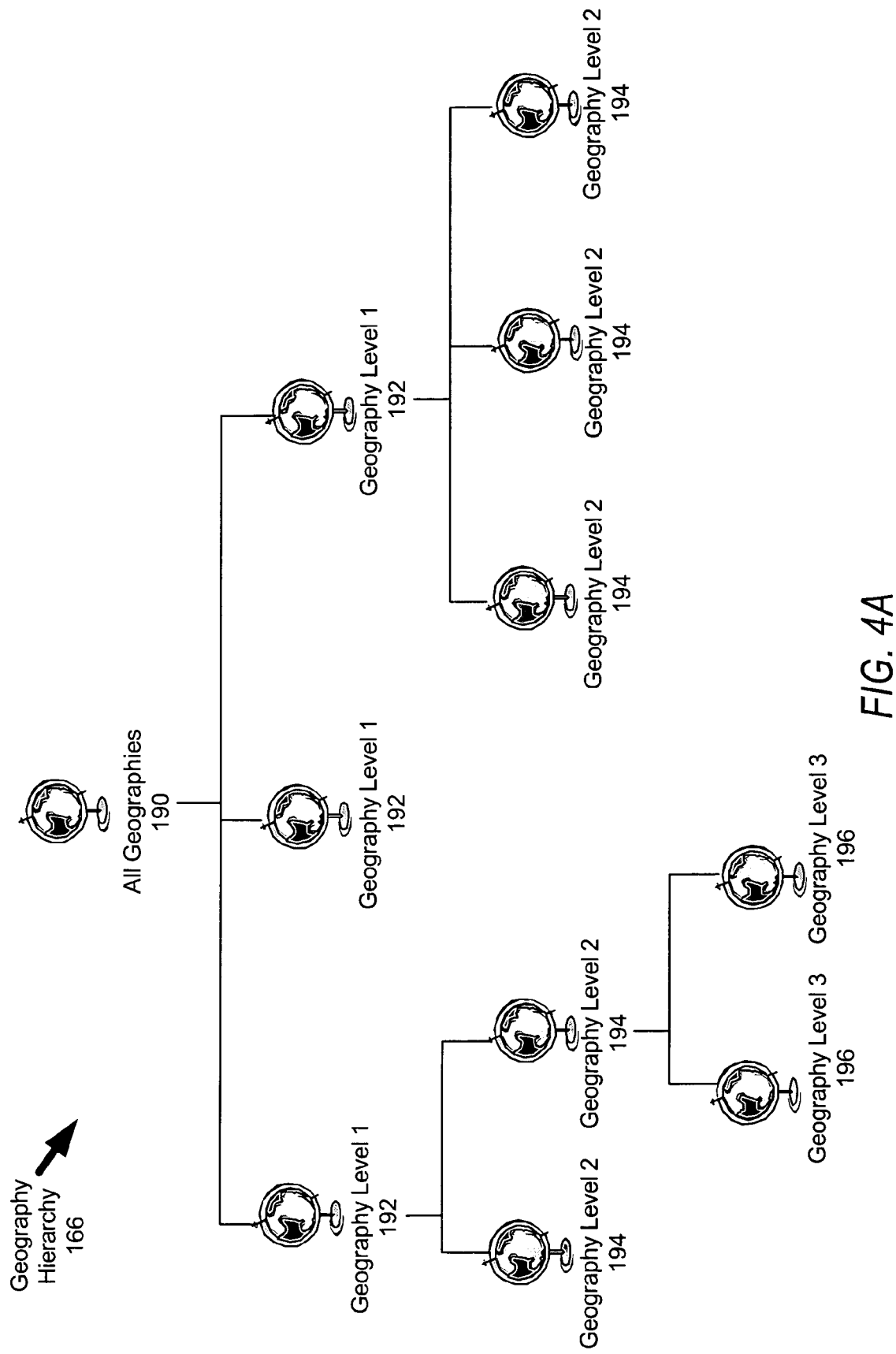
FIG. 4*a* is a hierarchy diagram illustrating one example of a geography hierarchy that is three levels deep.

FIG. 4a is a hierarchy diagram illustrating one example of a geography hierarchy 166 that is three levels deep. Different embodiments of the system 100 can incorporate different geography hierarchies 166. For example, the system 100 could be implemented on a world-wide basis that would include many different countries, or could be implemented with a more regional approach. Moreover, some embodiments will include hierarchies that are only one level deep, while others may include hierarchies that are much deeper than three-levels deep. The proper design of the geography hierarchy 166 is dependent upon the geographic scope the advertisers 102.

At the top of the diagram is the aggregation of all geographies 190. At this level of abstraction, all geographical regions are part of the same meta-geography region and geographical attributes 108 do possess any special status with respect to the processing of the system 100. In such an embodiment, geographical attributes 110 are processed like any other search term functioning as a key word in a search engine.

Below the meta-geography 190 are the level 1 geographies 192. In a geography directory embodiment, level 1 geographies 192 are the largest geographical regions. In embodiments involving worldwide communications over the Internet, level 1 geographies 192 may represent national boundaries.

Below level 1 geographies 192 are level 2 geographies 194. Each level 2 geography is a sub-geography of a level 1 geography 194, but each level 1 geography 192 need not be associated with level 2 geographies 194. Below level 2 geographies 194 are level 3 geographies 196. Each level 3 geography 196 is a sub-region of a level 2 geography 194, but each level 2 geography 194 need not be associated with level 3 categories 196.

In many embodiments of the system 100, level 1 geographies 192 are associated with national boundaries, level 2 geographies 194 are associated with state or intra-national regional boundaries, and level 3 geographies 196 are associated with cities.

The illustration in FIG. 4a is provided solely for the purpose of illustrating the concept of hierarchical relationships in the context of geography attributes 108. In many embodiments of the system 100, the actual geography hierarchy 166 would be too wide to fit on even numerous different sheets of paper line up side by side.

In many embodiments of the system 100, the geography hierarchy 166 is pre-defined by the administrator 160 and subject to modification or enhancement from time to time by the administrator 160. In some embodiments, users 130 can make certain geography selections 136 from a directory or menu of predefined option.

In some embodiments of the system 100, different geographic regions within the geographic hierarchy 166 can overlap. Moreover, a second level geography 194 can be associated with more than one first level geography 192. For example, some cities span across more than one county or even more than one state.

2. Diagram of Specific Region Types

Figure 4B:
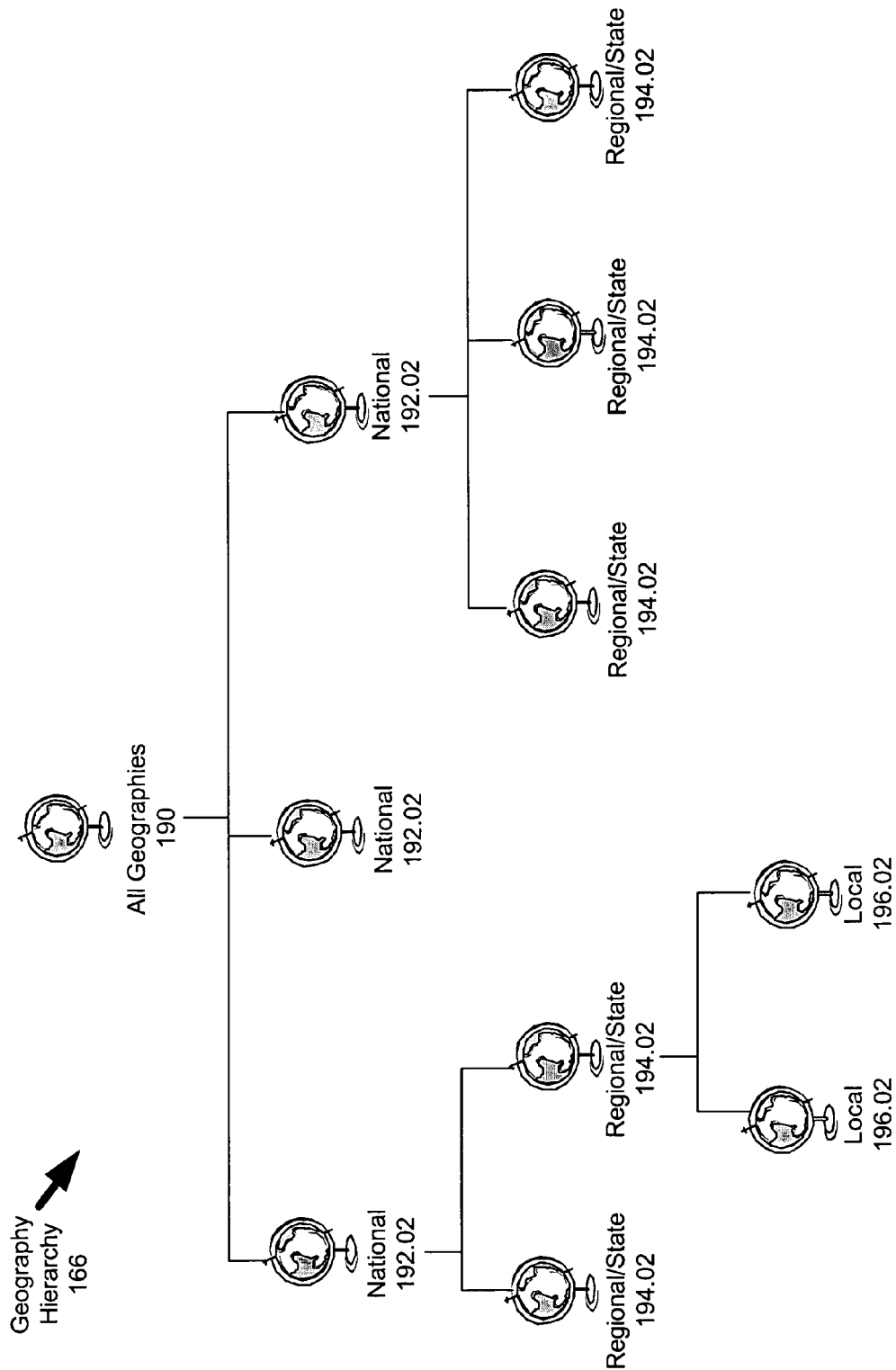
FIG. 4*b* is a hierarchy diagram illustrating a geography hierarchy that includes national, regional/state, and local levels.

FIG. 4b is a geography hierarchy 166 diagram illustrating a geography hierarchy that includes national regions 192.02 as level 1 geography regions 192, regional/state regions 194.02 as level 2 geography regions 194, and local regions 196.02 as level 3 geography regions 196. In some embodiments, local regions 196.02 are divided further by attributes such as 9 digit zip codes or some other geography attribute 108. Such smaller regions can be referred to as zones.

3. Service Areas

In addition to associating listings 104 with geographic regions indicating the scope of an advertiser's 102 activities, the system 100 can also include additional information as to various service areas within the broader geographic activities of advertisers 102. Service area attributes can transform a two-dimensional geography hierarchy 166 into a three-dimensional geography hierarchy 166. Service areas indicate that an advertiser 102 has a specific presence in one or more sub-regions of the geographic region associated with the advertiser 102. For example, a national book store chain can be said to have service area in each location where there is a book store. In contrast, a nationwide book store that relies exclusively on Internet sales would not possess any service areas within the geographic regions of the advertiser 102. A nationwide book store could also be considered to possess a "nationwide" service area that does not single out any smaller geographic regions.

FIG. 4c is a partial geography hierarchy 166 diagram illustrating various service areas that can be associated with a national level geographic region 192.02. In some embodiments, a listing 104 associated with a national geography 192.02 can also be associated with specific metropolitan area service areas (NMetro) 200 or a state-wide service area (NState) 202. For some listings 104, there will be no desire on the part of the advertiser 102 to identify a subset of the geographic region as a service area, and such listings 104 can treat the entire national region as a national service area (N) 204. Advertisers 102 that exist exclusively or substantially through an online presence are more likely to pursue a national service area (N) 204 approach than more traditional brick-and-mortar businesses that augment their businesses through online sales. Service areas are an additional input to be taken into consideration by the response heuristic 172 and the placement heuristic 174.

FIG. 4d is a partial geography hierarchy 166 diagram illustrating various service areas that can be associated with a regional/state geographic region 194.02. A regional/state level geography 194.02 can include a city service area (RCity or SCity) 205, a county service area (RCounty or SCounty) 206, or state-wide service area (R or S) 206a.

FIG. 4e is a partial geography hierarchy 166 diagram illustrating various service areas that can be associated with a local geographic region 196.02. A local geography 196.02 can include a city service level (LCity) 207 or a county service level (LCounty) 208.

B. How can the Geography Hierarchy Impact Requests?

In many embodiments of the system 100, a geography selection 136 is part of the request 132 submitted by the user 130. In a subset of those embodiments, the geography selection 136 is made by the user 130 using a directory structure that represents the geography hierarchy 166. In such embodiments, a portion of the geography selection 136 can be made without the typing in of any text by the user 130. In other embodiments, the geography selection 136 is entered as text.

C. How can the Geography Hierarchy Impact Results?

Listings 104 can be either included or excluded from the results on the basis of similarities between the geography selection 136 and the geography attributes 110 associated with the various listings 104. The degree to which those two variables overlap can be evaluated using the geography hierarchy 166. In many embodiments, the geography hierarchy 166 has a substantial impact on how groups are defined by the system 100 with respect to the particular request 132.

Distinctions within the geography hierarchy 166 can be used to distinguish between geography attributes 108 within the result. The more complex and developed the geography hierarchy 166, the finer the possible distinctions that can be made.

D. How can Geography Hierarchy Impact the Response?

In many embodiments, there is no distinction between the results and the responses 144. However, in certain embodiments, the response 144 is generated by modifying the result with the response heuristic 172. In such embodiments, the response heuristic 172 performs the function of further filtering out listings 104 on the basis of the various listing attributes 106 associated with the listings 104. In embodiments where there is a distinction between the result and the response 144, the geography hierarchy 166 can be utilized to generate the result as well as the response 144.

In the same way that the geography hierarchy 166 can impact which listings 104 result from the application of the request 132 to the database structure 126, the geography hierarchy 166 can also play a part of "winnowing out" certain listings 104 from the response that were tentatively included in the results. As discussed both above and below, distinctions in the geography hierarchy 166 can be an important input for the dynamic identification of relevant groups from the group hierarchy 178 to be included in the response 144.

Distinctions within the geography hierarchy 166 can impact what groups from the group hierarchy 178 are included in the response 144, which listings 104 are included in the response 144, and how the various listings 104 are organized within the response 144.

V. Fee Type-Based Processing

A. Description of Fee Type Hierarchy

Figure 5:
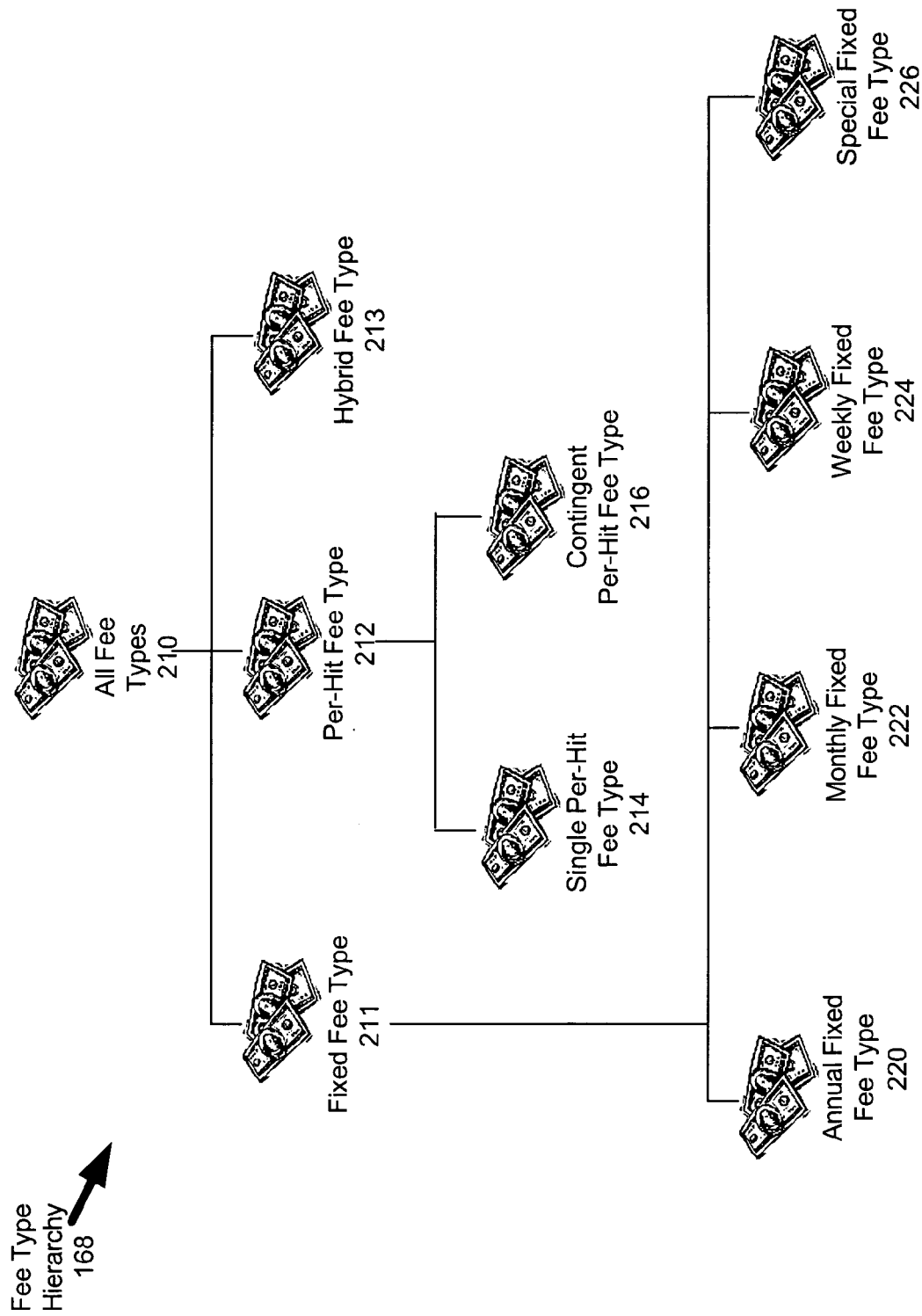
FIG. 5 is a hierarchy diagram illustrating one example of a fee type hierarchy (or simply "fee hierarchy").

FIG. 5 is a hierarchy diagram illustrating one example of a fee type hierarchy (or simply "fee hierarchy" or "type hierarchy") 168. Different listings 104 within the same response 144 can be associated with a wide variety of different compensation arrangements or fee types.

Two high level fee types are fixed fee types 211 and per-hit fee types 212. Fixed fee listings 104 do not involve a per transaction charge of the advertiser 102. In contrast, a per-hit fee listing 212 does involve a transaction-based compensation approach. A hybrid fee type 213 includes listings 104 that include both a fixed fee amount 111 and a per-hit fee amount 113 that exceeds $0.00. The per-hit fee type 212 includes listings 104 that include a per-hit fee amount 113 that exceeds $0.00 and a fixed fee amount 111 of $0.00. The fixed-fee type 211 includes listings 104 that include a per-hit fee amount 113 of $0.00 and a fixed fee amount 111 that exceeds $0.00. In some embodiments, a no charge listing 104 does not include a fixed fee amount 111 or a per-hit fee amount 113, while in other embodiments, a no charge listing 104 is associated with a per-hit fee amount 113 of $0.00 and/or a fixed fee amount 111 of $0.00.

1. Per-Hit Fee Types

There are different potential derivations of per-hit fee types 212. In many embodiments, the per-hit fee amount 113 that is charged by the administrator 160 is constant, regardless of the time of day, date, or other contextual information. Such a per-hit fee type 212 can be referred to as a single per-hit fee type 214. In contrast, a contingent per-hit fee type 216 provides for automated adjustments to the per-hit fee 113 charged by the administrator. For example, a florist might be willing to pay more for a "hit" in the morning than they would during the evening hours. Special consideration can be given to holidays, special sales, and other potentially industry-specific or even business-specific practices.

2. Fixed Fee Types

There are also several different variations of fixed fee types 211. Fixed fees amounts 111 can be "fixed" on an annual basis (an annual fixed fee type 220), a monthly basis (a monthly fixed fee type 222), a weekly basis (a weekly fixed fee type 224), or on a less regular basis (a special fixed fee type 226). The special fixed fee type 226 can be limited to particular holidays or shopping periods, such as the Christmas holiday shopping season, the week before days such as Valentines Day, Mothers Day, Fathers Day, etc.

B. How does a Fee Type Impact a Request?

None of the fee types 112 in the fee hierarchy 168 impacts the requests 132 sent by users 130 to the system 100. In many embodiments, the fee types 112 associated with the various listings 104 are not viewable by the user 130 or other advertisers 102. In alternative embodiments, other advertisers 102 can obtain information about fee types 112, and in some alternative embodiments, even users 130 can access compensation information relating to the listings 104 in the response 144.

As a general matter, the fee charged by the administrator 160 is a matter between the administrator 160 and the advertiser 102 and is thus of questionable importance or even interest to users 130. However, fee types 112 and fee type hierarchy 168 do impact the groups contained in the response 144, and thus fee types 112 can be as important to the result heuristic 170, the response heuristic 172, and the placement heuristic 174 as geography attributes 108, category attributes 110, or any other type of attribute.

C. How Does a Fee Type Impact the Result?

Fee types 112 associated with the various listings 104 in the database structure 126 impact the groups that are included in the result generated from the request 132 submitted by users 130. Unlike attributes such as category attributes 110 and geography attributes 108, the impact of fee type 112 is set primarily by the administrator 160. Users have little cognizance, much less influence, over the impact of fee types 112.

D. How Does a Fee Type Impact the Response?

By influencing the groups of listings 104 that are included in the response 144, the fee type 112 associated with the various listings 104 in the database structure 126 can determine which groups of listings will be included in the response 144 generated from the request 132 submitted by users 130. As already noted with respect to Section C, users have little cognizance, much less influence, over the impact of fee types 112, as contrasted with attributes such as category attributes 110 and geography attributes 108.

VI. Processing Based on Review/Rating Information

A. Description of Review/Rating Information

As noted above, in some embodiments review and/or rating information 171 comprises a number on a numerical scale indicative of feedback that users 130 have provided with respect to an advertiser 102 and/or listing 104. Generally, review and/or rating information 171 is an average "score" or rating that users 130 have provided with respect to an advertiser 102 and/or listing 104. However, review and/or rating information could be calculated in other ways known to those skilled in the art and would not depart from the scope of the present invention so long as it represented feedback of users 130 with respect to an advertiser 102 and/or listing 104. Further, in some embodiments, review and/or rating information 171 could comprise textual descriptions or summaries of an advertiser 102 and/or listing 104. These embodiments would enable textual information to be included in review and/or rating selection 139, such as "good", "excellent", "inexpensive", etc.

As noted above, in some embodiments, review and/or rating information 171 may include rating tiers 173. Rating tiers 173 compensate for the differences in quality found between review and/or rating information 171 that comes from difference sources by assigning weights to review and/or rating information 171 based on its source. For example, an embodiment might use review and/or rating information 171 whose source was an independent industry recognized ratings service, as well as review and/or ratings information 171 whose source was ratings published in a consumer magazine. In this embodiment, the industry recognized rating service might be deemed more reliable than the consumer magazine. Therefore, it would be desirable to give more weight to review and/or ratings information 171 from the independent industry recognized ratings service than to review and/or ratings information 171 from the consumer magazine. Accordingly, in this embodiment, review and/or ratings information 171 from these two sources would be assigned to different rating tiers 173 such that the review and/or ratings information 171 from the independent industry recognized ratings service would be given greater weight than the review and/or ratings information 171 from the consumer magazine.

Figure 39:
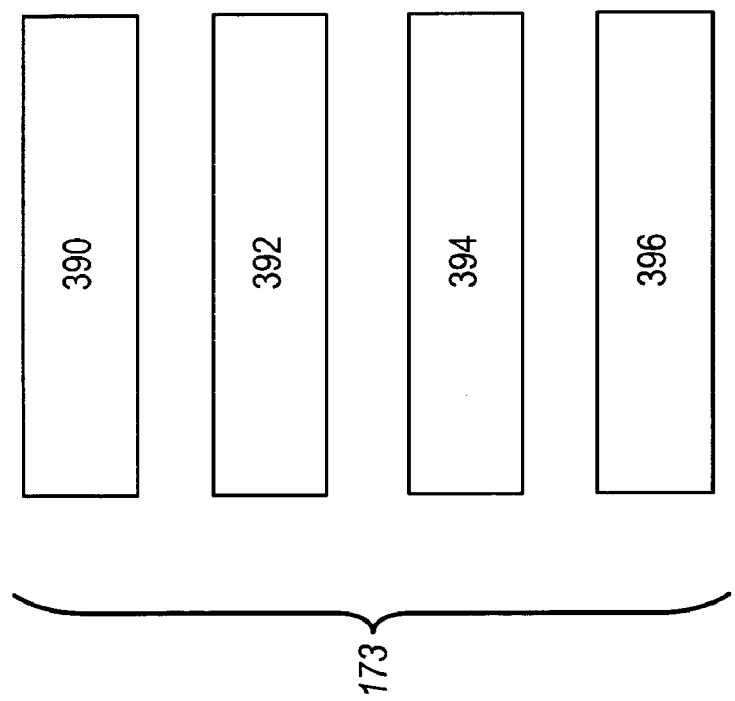
FIG. 39 depicts ratings tiers in an embodiment utilizing four tiers.

FIG. 39 depicts ratings tiers 173 in an embodiment utilizing four tiers 390, 392, 394, and 396. FIG. 39 is exemplary, and not restrictive. It should be understood that some embodiments do not use rating tiers 173, and further that different embodiments will use different numbers of ratings tiers 173. Referring to FIG. 39, tier 390 is the top tier, and assigned the highest weight. Tiers 392, 394, and 396 follow in descending order. The next two paragraphs describe exemplary embodiments utilizing ratings tiers 173.

In one embodiment, review and/or rating information 171 from an independent industry recognized ratings service is assigned to tier 390, which is given a weight of 1.25. Review and/or rating information 171 from a consumer magazine is assigned to tier 392, and given a weight of 1. Review and/or rating information 171 from online user communities is assigned to tier 394, and given a weight of 0.75. Review and/or rating information 171 from individual users is assigned to tier 396 and given a weight of 0.5.

In other embodiments, ratings tiers 173 are based on the number and consistency of the ratings included in review and/or ratings information 171. For example, in one such embodiment, tier 390 represents listings 104 for which review and/or ratings information 171 includes a number of ratings above a certain threshold (for example, tier 390 might require review and/or ratings information 171 to include one-hundred ratings), where there is a standard deviation of no more than one rating increment. Tier 392 might then require a slightly lower threshold number of ratings to be included in review and/or ratings information 171, and might permit a standard deviation of up to two ratings increments. Tier 394 would require an even lower threshold number of ratings to be included in review and/or ratings information 171, and would permit a standard deviation of up to two ratings increments, and so on.

Means by which feedback such as review and/or rating information 171 is collected are well known in the art. For example, in some embodiments, feedback including review and/or rating information 171 is collected via an HTML form, although other means of collecting review and/or rating information 171 will be known to those skilled in the art.

B. How can the Review/Rating Information Impact Requests?

In many embodiments of the system 100, a review and/or rating selection 139 is part of the request 132 submitted by the user 130. As noted above, a review and/or rating selection 139 is in many embodiments a number representing a numerical rating or in some embodiments may be a textual search term indicating the interest of a user 130 in seeing listings 104 associated with reviews containing the search term. Further, in many cases a request includes multiple review and/or rating selections 139, allowing a user 130 to tailor a request according to the specific review and/or rating attributes 109 that user 130 is interested in. Further, as noted above, in some embodiments, user 130 can attach weights to different review and/or rating selections 139 associated with various review and/or rating attributes 109.

C. How can the Review/Rating Information Impact Results?

Listings 104 can be either included or excluded from the results depending on whether review and/or rating information 171 associated with a listing 104 meets criteria specified in administrative rules 122. For example, result heuristic 170 may specify that a listing 104 be included in the results only if review and/or rating information 171 indicates that a rating above a certain threshold is associated with the listing 104. Further, result heuristic 170 may specify that review and/or rating information 171 be used only if based on a certain number of ratings and/or reviews supplied by users 130. Those skilled in the art will recognize that review and/or rating information 171 supplied by a minimal number of users 130 is likely to have less value as a rating of a review and/or rating attribute 109 associated with a listing 104. Time may also be a factor, with older reviews and/or rating information 171 being given less weight than newer ones. In some embodiments, reviews and/or rating information 171 can expire at some point.

As suggested above, result heuristic 170 may be based on review and/or ratings information 171 associated with multiple review and/or ratings attributes 109, where different review and/or ratings information 171 associated for different review and/or ratings attributes 109 may or may not be accorded different weights. As noted above, user 130 may make review and/or ratings selections 139 that are associated with different review and/or ratings attributes 109, and moreover these different review and/or ratings attributes 109 may be given weights provided by user 130. Moreover, in some embodiments, weights associated with review and/or ratings attributes 109 may or may not be provided by input from users 130, but are included in results heuristic 170. For example, as discussed above, ratings tiers 173 include weights not provided by input from users 130 that are included in results heuristic 170 in some embodiments.

D. How can Review/Rating Information Impact the Response?

In many embodiments, as noted above, there is no distinction between the results and the responses 144. However, as noted above, in certain embodiments the response 144 is generated by modifying the result with the response heuristic 172. In such embodiments, the response heuristic 172 performs the function of further filtering out listings 104 on the basis of the various listing attributes 106 associated with the listings 104. In embodiments where there is a distinction between the result and the response 144, the review and/or rating information 171 can be utilized to generate the result as well as the response 144.

In the same way that review and/or rating information 171 can impact which listings 104 result from the application of the request 132 to the database structure 126, review and/or rating information 171 can also play a part of "winnowing out" certain listings 104 from the response that were tentatively included in the results. One way in which this "winnowing out" can be accomplished is by excluding listings 104 from the response 144 that are associated with ratings and/or review information 171 containing a rating or ratings falling below a certain threshold. Another way in which this "winnowing out" can be accomplished is by excluding listings 104 from the response 144 that are associated with ratings and/or review information 171 assigned to a certain ratings tiers or tiers 173. As discussed both above and below, review and/or rating information 171 can be an important input for the dynamic identification of relevant groups from the group hierarchy 178 to be included in the response 144.

Review and/or rating information 171 can impact what groups from the group hierarchy 178 are included in the response 144, which listings 104 are included in the response 144, and how the various listings 104 are organized within the response 144.

VII. Group-Based Processing

A. Inputs for Group Determinations

Figure 6A:
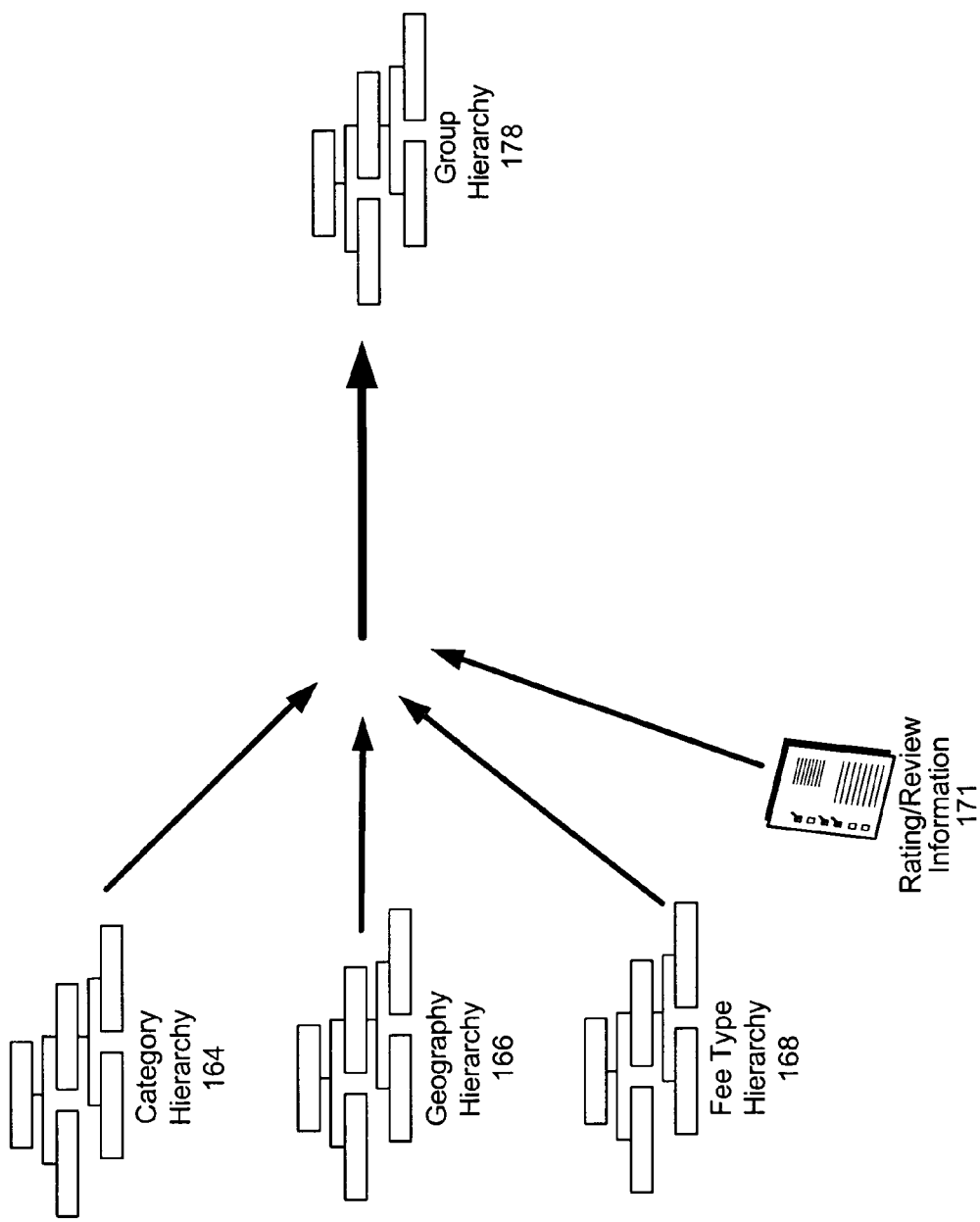
FIG. 6*a* is a relationship diagram illustrating one example of how attributes associated with a group hierarchy are a function of attributes associated with category, geography, and fee hierarchies.

FIG. 6a is a relationship diagram illustrating one example of how attributes associated with a group hierarchy 178 are a function of attributes associated with the category hierarchy 164, the geography hierarchy 166, the fee hierarchy 168, review and/or rating information 171 and any other hierarchy or collection of attributes used by the system 100 to focus on the desires and interests of users 130, advertisers 102, and administrators 160.

In a fully normalized embodiment of the group hierarchy 178, each distinction within one of the input data hierarchies or collections results in a corresponding distinction within the group hierarchy 178. For example, one group of listings 104 could be limited to listings 104 for antique furniture (a category-based distinction) within the city of Topeka, Kans. (a geography-based distinction) with a special fixed fee arrangement (a fee-based distinction) for the week before the $4^{th}$ of July, where the listing 104 had received a rating of at least four stars out of five (a review/rating distinction). In alternative embodiments, the group hierarchy 178 can be configured to be less "sensitive" to distinctions within the other data hierarchies. Further, in embodiments supporting multiple review and/or rating attributes 109, the group hierarchy 178 can be configured to be sensitive only to review and/or ratings information 171 based on particular review and/or rating attributes 109 or to weights assigned to various review and/or rating attributes 109.

B. Group Hierarchy Diagram

Figure 6B:
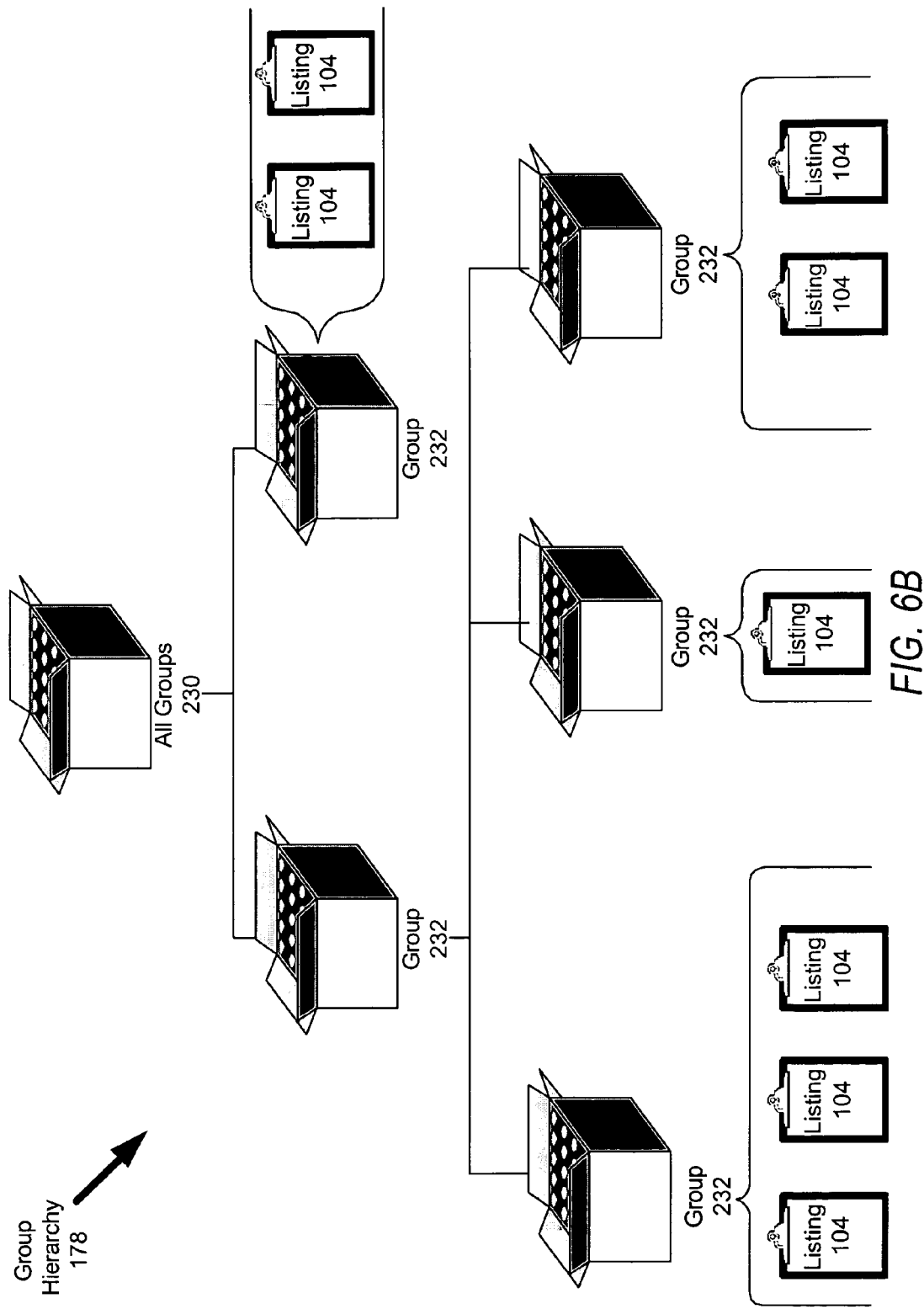
FIG. 6*b* is a hierarchy diagram illustrating one example of a group hierarchy.

FIG. 6b is a hierarchy diagram illustrating one example of a group hierarchy 178. As discussed above, the group hierarchy 178 can incorporate all of the branches and distinctions included in the other data hierarchies. Thus, the illustration in FIG. 6b is highly simplified At the top of the group hierarchy 178 is a meta-group that includes all groups 230. Below the meta-group are more specific groups 230 that are made up of various sub-groups. The hierarchical structure of the group hierarchy 178 will mirror the distinctions of the other data hierarchies in a fully normalized embodiment of the system 100. The particular "level" of group 232 included in a response will be impacted by the administrative rules 122, the request 132 provided by the user 130, and the listing attributes 106 associated with the listing records 128 in the database structure 126.

As illustrated in the diagram, different groups 232 will have a different number of listings 104 that are associated with the particular group 232.

C. Detailed Input Diagram for Group Processing

Figure 6C:
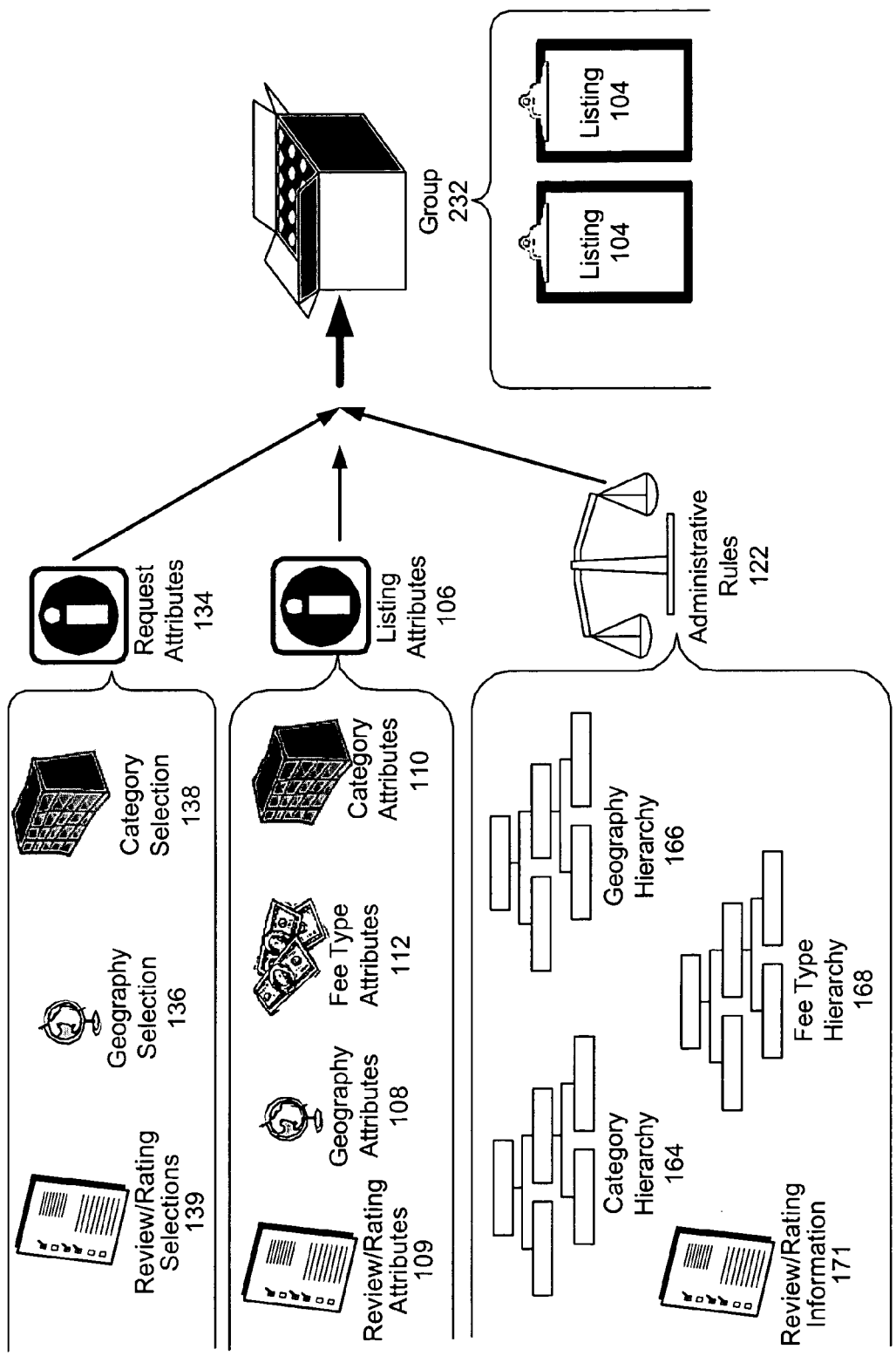
FIG. 6*c* is an input/output diagram illustrating an example of request attributes, listing attributes, and administrative rules being used to define the groups to be included in the response.

FIG. 6c is an input/output diagram illustrating an example of request attributes 134, listing attributes 106, and administrative rules 122 being used to define the groups 232 to identify the listings included in the response 144.

The request attributes 134 inputted to the group determination process can include one or more geography selections 136, one or more category selections 138, one or more review/rating selections 139, and any other attribute types relating to the request 132.

The listing attributes 106 inputted to the group determination process can include one or more geography attributes 108, fee type attributes 112, category attributes 110, review/rating attributes 109, and any other attributes relating to listings 104 or the advertiser 102.

The administrative rules 122 define the possible branches and distinctions defined in the group hierarchy 178. Although a single listing 104 can potentially belong to several groups 232, that same single listing 104 should not be associated with more than one group 232 within a particular response 144. The administrative rules 122 can be configured to prevent such an occurrence in order to prevent a response 144 from including duplicative listings 104 (e.g. the same listing 104 appearing more than once).

All of those inputs influence the determination of what groups 232 are included in a response 144, and what listings 104 are included in those groups 232.

D. Specific Example of a Group Determination

Figure 6D:
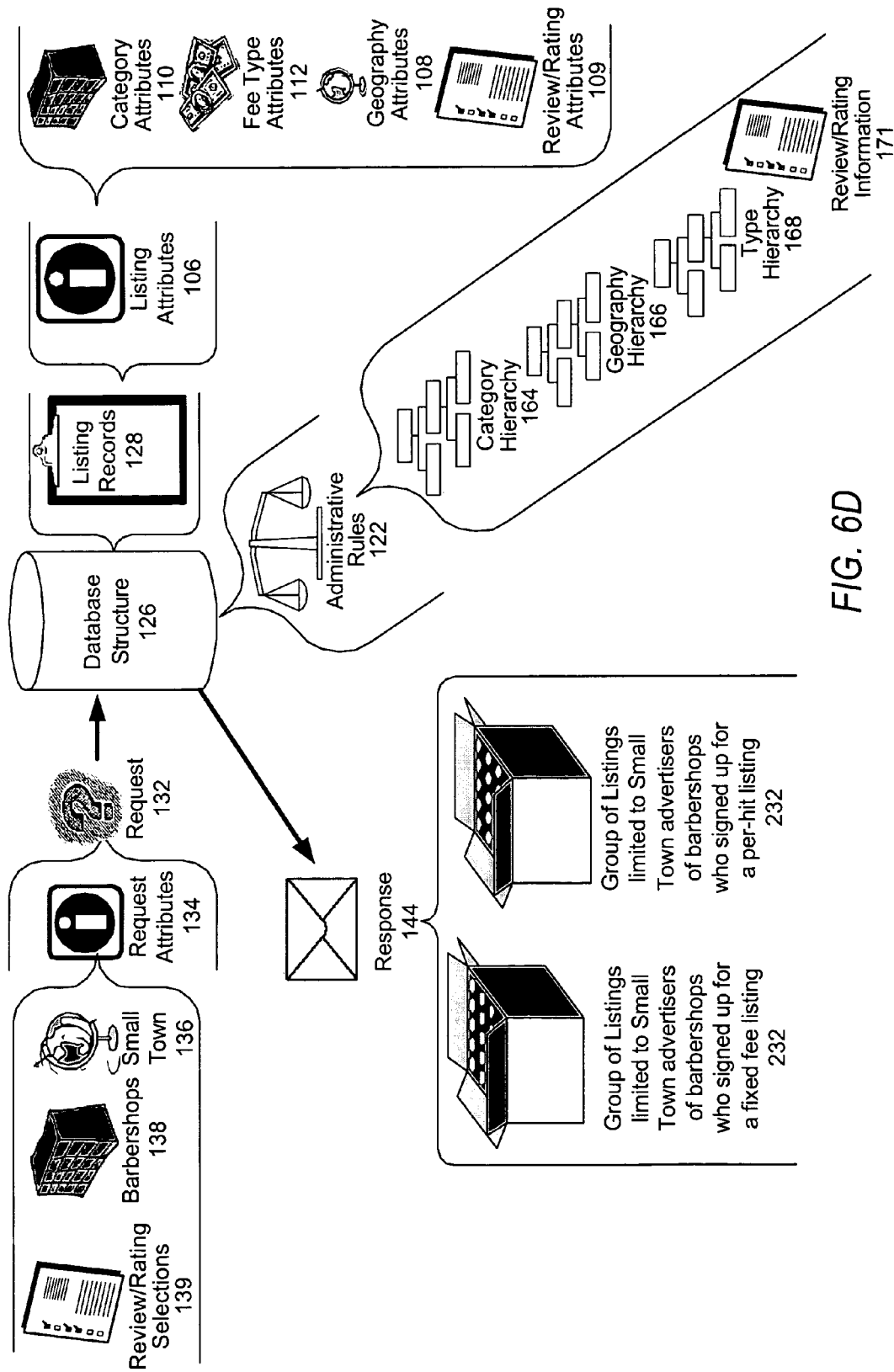
FIG. 6*d* is a process flow diagram illustrating the submission of a request to a database structure, and inclusion of various listings in the response.

FIG. 6d is a process flow diagram illustrating the submission of a request 132 to a database structure 126, and inclusion of various listings in the response 144.

The specific request attributes 134 of a barbershop category selection 138, a small town USA geography selection 136, and a review/rating selection 139 for listings 104 rated higher than seven on a ten point scale are presented to the system 100 in order to provide a meaningful response 144 to the submitting user 130.

The database structure 126 includes various listing records 128 associated with listing attributes 106 that include various category attributes 110, fee type attributes 112, geography attributes 108, and review/rating attributes 109. Some of the listing records 128 in the database structure 126 relate to barbershops and some of the listing records 128 relate to the geography of Small Town U.S.A. A smaller group of listing records 128 will relate to both barbershops and Small Town U.S.A. Further, some of the listing records 128 in database structure 126 will relate to reviews and/or ratings that are based on feedback received from users 130. The administrative rules 122 define what constitute matches of the request attributes 134 and the listing attributes 106. For example, the administrative rules 122 may provide that a request for a more specific category or geography will include a broader category of geography if a narrower match does not exist. Similarly, the administrative rules 122 can determine whether a more general category or geography automatically includes a narrower category or geography. Further, the administrative rules 122 can determine whether a rating is higher or lower than a threshold rating specified by a review/rating selection 139. In some embodiments, even if request attributes 134 does not include a review/rating selection 139, administrative rules 122 may specify a threshold rating supplied by an administrator 160.

The configuration of the group hierarchy 178 by the category hierarchy 164, geography hierarchy 166, fee type hierarchy 168, and review and/or rating information 171 is discussed above. Thus, the administrative rules 122 define the realm of potential groups 232, while the request attributes 134 and listing attributes 106 determine which listings 104 are to be included in the response 144.

The end result is the response 144 on the bottom left portion of FIG. 6d. In this example, there are two groups 232 of listings 104, one group 232 made up of fixed fee listings 104 for Small Town, USA barbershops and a second group 232 made up of per-hit listings 104 for Small Town, USA barbershops. It is also possible, for instance, to have a third group 232 made up of a hybrid fee type 213. Different examples of group selection in accordance with the administrative rules 122 are illustrated in FIGS. 13-19 and are discussed below.

VII. Subsystem-Level Views

A. Function-Based Subsystem Components

Figure 7A:
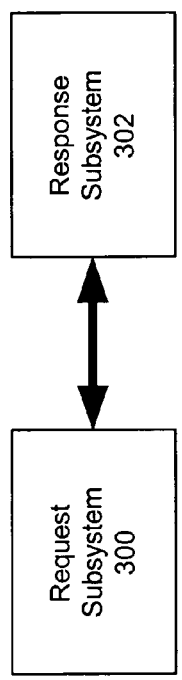
FIG. 7*a* is a block diagram illustrating one example of a subsystem-level view of the system that includes a request subsystem and a response subsystem.

FIG. 7a is a block diagram illustrating one example of a subsystem-level view of the system 100 that includes a request subsystem 300 and a response subsystem 302.

1. Request Subsystem

A request subsystem 300 is utilized by users 130 to create requests 132 and to submit requests 132 to the system 100. Requests 132 can include a variety of different request attributes 134, including various geography selections 136, category selections 138, and/or review/rating selections 139. The number and types of attributes included as request attributes 134 with respect to a particular request 134, can vary widely from embodiment to embodiment, or even from request 132 to request 132 within a particular embodiment.

In some embodiments, one or more of the request attributes 134 can be "blank" or "null" values. In other embodiments, request attributes 134 can include multiple geography selections 136 and multiple category selections 138. Requests 132 and request-related processing by the system 100 is described both above and below.

2. Response Subsystem

A response subsystem 302 is used to generate responses 144 to the requests 132 from the request subsystem 300. The response subsystem 302 populates the response 144 with selectively identified listings 104 from the database structure 126 that includes the listings 104 stored by the system 100. A variety of heuristics can be used to identify the appropriate listings 104, and to format, order, or otherwise organize the listings 104 within the response 144.

The response subsystem 302 can generate responses 144 from requests 132 using a variety of different response heuristics 172. Response heuristics 172 can determine the content and format of the response 144. To order or place the various listings 104 within the response 144, the response heuristic 172 can invoke the placement heuristic 174. In many embodiments of the system 100, each listing 104 is associated with a fee type 112. Even unpaid listings (e.g. free listings) 104 can be associated with a per-hit fee 113 of $0.00 per-hit. In a typical embodiment, the various listings 104 are associated with one of two fee types 112, a per-hit fee type 212 and a fixed fee type 211. Listings associated with either fee type 112 can still be associated with both a per-hit fee amount 113 and a fixed fee amount 111, although one of those fee amounts will typically be $0.00. The number and types of attributes associated with the various listings 104 can vary widely from embodiment to embodiment, and even from listing 104 to listing 104 with a particular embodiment.

To promote highly "focused" responses, the response subsystem 100 can utilize various types of group-based processing, such as the group hierarchy 178 discussed above. In many embodiments, a single response 144 will typically include multiple groups 232 of listings 104. The groups 232 included in the response 144 are determined by the combination of request attributes 134, listing attributes 106, and administrative rules 122. In a highly focused embodiment, the system 100 can eliminate all listings 104 from the response 144 that do not fully match with the request attributes 134 included in the request 132.

Different embodiments of the system 100 can utilize different combinations of inputs for group-based processing. For example, some embodiments of the system 100 will not include the category hierarchy 164, geography hierarchy 166, review and/or rating information 171, and/or fee type hierarchy 168. However, a fully normalized embodiment of the system 100 maximizes the "sensitivity" of the system 100 to the needs and desires of users 130. In a fully normalized embodiment, all of the listings 104 associated with the group 232 share category, geography, review/rating, and fee type attributes to a highly focused degree.

As discussed above, groups 232 are defined by listing attributes 106 shared in common by the various listings 104. For example, the group 232 consisting of national advertisers regardless of category, rating, or fee type is likely to be very large, while the group 232 of antique dealers purchasing per-hit listings and specializing exclusively in $16^{th}$ century antiques in Small Town, U.S.A. with the highest possible rating is likely to be quite small. The system 100 performs a "focusing" function by defining the appropriate group 232 identities for the particular request 132. The "focusing" function is configured by the administrative rules 122. The administrative rules 122 can be configured to be more or less "sensitive" in particular contexts. For example, if there are only a few medical specialists within the state that can perform a particular type of procedure, the administrative rules might be configured to include a broader geography than the geography selection 136 specified within the request 132. Similarly, a request 132 that included a highly specific sub-category selection 138 could be generalized to a broader category if no listings 104 qualified for the more narrow scope. Expansion of scope can also work in the other direction, with a more general attribute at a higher level in the data hierarchy capturing more specialized attributes that are lower in the data hierarchy. These different nuances can be customized by the administrator on an attribute by attribute basis if desirable.

In some embodiments, the priority metric 179 is only used for intra-group comparisons, and thus values in common with other group listings 104 can be ignored in calculating the priority metric 179. For example, a group 232 sharing a specific category attribute 110, a specific geography attribute 108, and a specific review/rating attribute 109 will not be distinguished from each other on the basis of those attributes. In such an embodiment, different groups 232 can have predefined "spots" within the response 144 that the listings 104 within those applicable groups 232 compete for in accordance with the administrative rules 122. Embodiments where the priority metric 179 is limited to intra-group competition can be referred to as intra-group competitive embodiments.

In other embodiments, the groups 232 are not allocated predefined spots, and the priority metric 179 is used to compare listings 104 belong to different groups 232. Such embodiments can be referred to as inter-group competitive embodiments.

Although listings 104 are typically selected for inclusion within a particular response 144 on the basis of group affiliation, listings 104 need not be displayed in a manner that is sorted by group 232. To the contrary, it can be beneficial to purposely "break up" listing sequences that would otherwise include solely one group of listings 104. Thus, a listing 104 associated with one group 232 could be adjacent to two or more listings 104 not associated with the same group 232. For example, it may be desirable to include a single fixed fee listing 104 between two or more per-hit fee listings 104. Responses 144 and response-related processing is discussed both above and below. Detailed examples of various potential arrangements are discussed below.

3. Result Subsystem

Figure 7C:
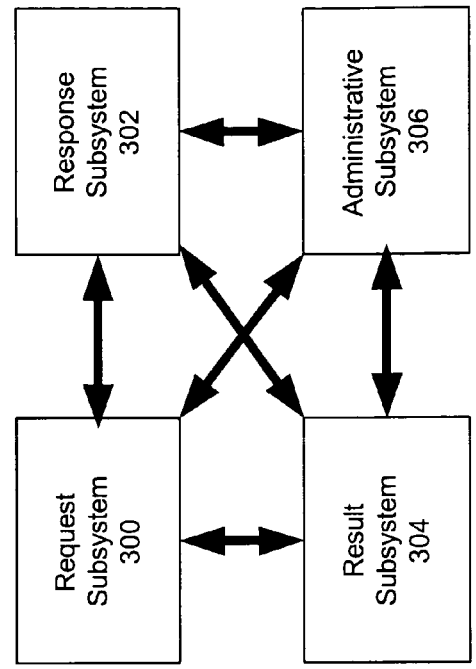
FIG. 7*c* is a block diagram illustrating one example of a subsystem-level view of the system that includes a request subsystem, a result subsystem, a response subsystem, and an administrative subsystem.
Figure 7B:
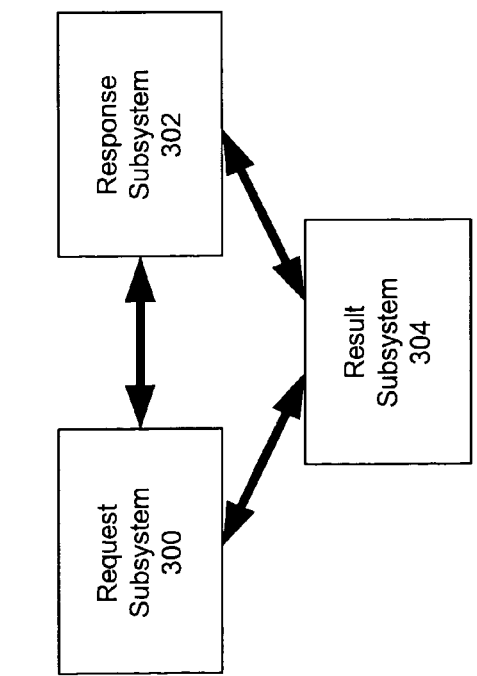
FIG. 7*b* is a block diagram illustrating one example of a subsystem-level view of the system that includes a request subsystem, a result subsystem, and a response subsystem.

FIG. 7b is a block diagram illustrating one example of a subsystem-level view of the system 100 that includes a request subsystem 300, a result subsystem 304, and a response subsystem 302. In embodiments of the system 100 that include the result subsystem 304, the result subsystem 304 generates a result from the request 132 captured by the request subsystem 300, and the response subsystem 302 generates the response 144 from the result provided by the result subsystem 304.

As discussed above, the system 100 can be configured to distinguish between the result generated from the request 132 and the response 144 provided to the user 130 in light of the result. The response 144 can be subject to additional "winnowing out" of listings 104 that are included in the result generated by the result subsystem 304. In other words, listings 104 included in the result may not necessarily end up in the response 144 if the response heuristic 172 determines that the "match" is not focused enough, or for any other reason, as configured by the administrative rules 122.

In another embodiment where the result subsystem 304 generates the result from the request 132, and the response subsystem 302 generates the response 144 from the result, the result heuristic 170 can include potentially any process for selectively identifying relevant matches and the result heuristic 170 is discussed above.

4. Administrative Subsystem

FIG. 7c is a block diagram illustrating one example of a subsystem-level view of the system 100 that includes a request subsystem 300, a result subsystem 302, a response subsystem 304, and an administrative subsystem 306.

The administrative subsystem 306 is the means by which administrative rules 122 are created, configured, updated, and deleted within the system 100. Thus, the administrative subsystem 306 impacts the functioning of the other subsystems because the administrative rules 122 define how the request subsystem 300 captures requests 132, how the result subsystem 304 generates results from requests 132, and how the response subsystem 302 generates responses 144 from results.

The administrative rules 122 are discussed both above and below.

B. Entity-Based Subsystem Components

Figure 8A:
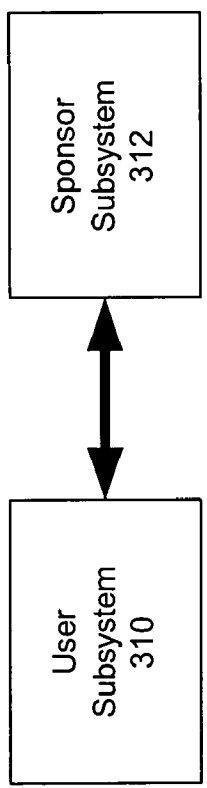
FIG. 8*a* is a block diagram illustrating one example of a subsystem-level view of the system that includes a user subsystem and a sponsor subsystem.

FIG. 8a is a block diagram illustrating one example of a subsystem-level view of the system 100 that includes a user subsystem 310 and a sponsor subsystem 312. The user subsystem 310 interacts with the sponsor subsystem 312 in the way that the system 100 allows users 130 to interact with advertisers 102 and their corresponding listings 104.

1. User Subsystem

A user subsystem 310 can be used by users 130 to submit requests 132 and receive responses 144. The user subsystem 310 includes the user interface 142. The user subsystem 310 is the means by which users 130 interact with the system 100 and the listings 104 submitted by the advertisers 102. The user subsystem 310 can configure the ways in which request attributes 134 are captured and transmitted to the system 100. The user subsystem 310 can include functionality such as user profiles, user history, and the ability to save requests 132. The user subsystem 310 allows the user 130 to focus their efforts at information retrieval.

In some embodiments, as mentioned above, user profiles are created based on the requests 132 that the user 130 has previously submitted. In other embodiments, a user 130 is given the option of creating, or at least supplying some of the information for, a user profile. In certain of these embodiments, users 130 can indicate a sort order for listings 104 in responses 144. In particular, users 130 may be allowed to specify an order of importance to be given to category hierarchy 164, geography hierarchy 166, and review and/or ratings information 171. As mentioned above criteria related to each of category hierarchy 164, geography hierarchy 166, and review and/or ratings information 171 can cause a listing 104 to be excluded from a response 144. In some embodiments, a user 130 can further refine the weight given to each of category hierarchy 164, geography hierarchy 166, and review and/or ratings information 171 in formulating a response 144 by creating a user profile. In these embodiments, listings 104 might be sorted according to weights given in a user profile to each of category hierarchy 164, geography hierarchy 166, and review and/or ratings information 171. For example, a user might rank review/and/or ratings information 171 as the most important criteria, in which case a listing 104 with a high rating, but geographically far from a user 130 might be listed ahead of a listing 104 with a very low rating but in the same zip code as the user 130.

The ability of users 130 to create, submit, and supplement requests 132, as well as the ability of users 130 to interact with responses 144 to requests, is discussed both above and below.

2. Sponsor Subsystem

A sponsor subsystem 312 can be used by advertisers 102 to submit listings 104 to the system 100, to modify those listings 104, and to access various reports provided by the system 100. The sponsor subsystem 312 includes the advertiser interface 116. The sponsor subsystem 312 is the means by which advertisers 102 interact with the system 100 and the requests 132 submitted by the users 130. The sponsor subsystem 312 can configure the ways in which listing attributes 106 are captured and transmitted to the system 100. The sponsor subsystem 312 can include any type of input that can impact the priority metric 179 for a particular listing 179. The sponsor subsystem 312 allows the advertiser 102 to focus their efforts at disseminating information to users 130 who are most likely to be interested in doing business with the advertiser 102.

3. Administrator Subsystem

Figure 8B:
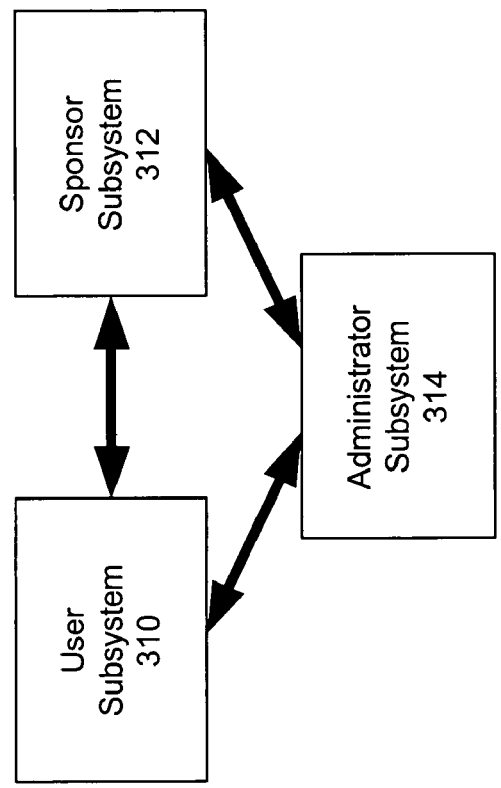
FIG. 8b is a block diagram illustrating one example of a subsystem-level view of the system that includes a user subsystem, a sponsor subsystem, and an administrator subsystem.

FIG. 8b is a block diagram illustrating one example of a subsystem-level view of the system 100 that includes a user subsystem 310, a sponsor subsystem 312, and an administrator subsystem 314.

The administrator subsystem 314 is the mechanism by which the administrator 160 interacts with the system 100, providing the mechanism for creating, updating, and deleting of administrative rules 122. The administrator subsystem 314 includes the administrator interface 162. The administrative subsystem 314 is the means by which administrative rules 122 are created, configured, updated, and deleted within the system 100. Thus, the administrative subsystem 314 impacts the functioning of the other subsystems because the administrative rules 122 define how the user subsystem 310 interacts with users 130 and how the sponsor subsystem 312 interacts with advertisers 102.

The types of administrative rules 122, and their impact upon the processing performed by the system 100 is discussed both above and below.

C. Component-Based Subsystem Components

Figure 9A:
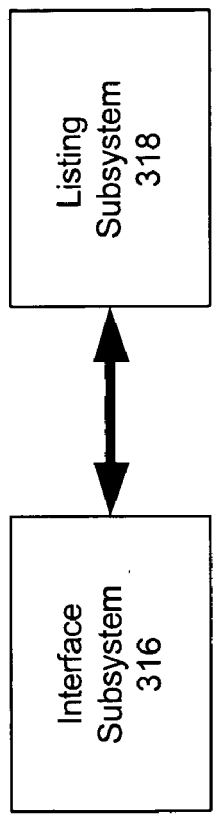
FIG. 9a is a block diagram illustrating one example of a subsystem-level view of the system that includes an interface subsystem and a listing subsystem.

FIG. 9a is a block diagram illustrating one example of a subsystem-level view of the system 100 that includes an interface subsystem 316 and a listing subsystem 318. The interface subsystem 316 interacts with the listing subsystem 318 through the activities of users 130, advertisers 102, and administrators 160.

1. Interface Subsystem

An interface subsystem 316 is what allows users 130, advertisers 102, and administrators 160 to interact with the system 100. The interface subsystem 316 includes the various interfaces, including the user interface 142, the advertiser interface 116, and the administrator interface 162. In many embodiments of the system 100, all interactions through the interface subsystem 316 are constrained by the limitations set forth in the administrative rules 122. The different interfaces of the interface subsystem 316 can transmit and receive information from the system 100 in a simultaneous or substantially simultaneous manner. The interface subsystem 316 can be configured to allow advertisers 102 to submit listings 104 to the listing subsystem 318, and users 130 to request listings 104 from the listing subsystem 318.

The different interfaces of the interface subsystem 316 are described above. Specific examples of various "screens" are discussed below with respect to various screen print diagrams.

2. Listing Subsystem

A listing subsystem 318 can be used to store and process the various listings 104 within the database structure 126 and accompanying information technology architecture. Any direct interaction with the listings 104 occurs through the listing subsystem 318. The listing subsystem 318 makes the various listings 104 stored in the database structure 126 accessible to the interface subsystem 316 in accordance with the administrative rules 122. In some embodiments, the administrative rules 122 can be accessed and modified through a focus subsystem 320 that controls how the various result heuristics 170, response heuristics 172, and placement heuristics 174 "focus" on various listings 104.

The listing subsystem 318 is configured by the administrative rules 122, which are discussed above and below. The listing subsystem 318 controls how listing records 128 are stored in the database structure 126, and which listing attributes 106 are associated with the various listings 104. The detailed views 127 and summary views 129 associated with the various listings 104 are part of the functionality of the listing subsystem 318.

3. Focus Subsystem

Figure 9B:
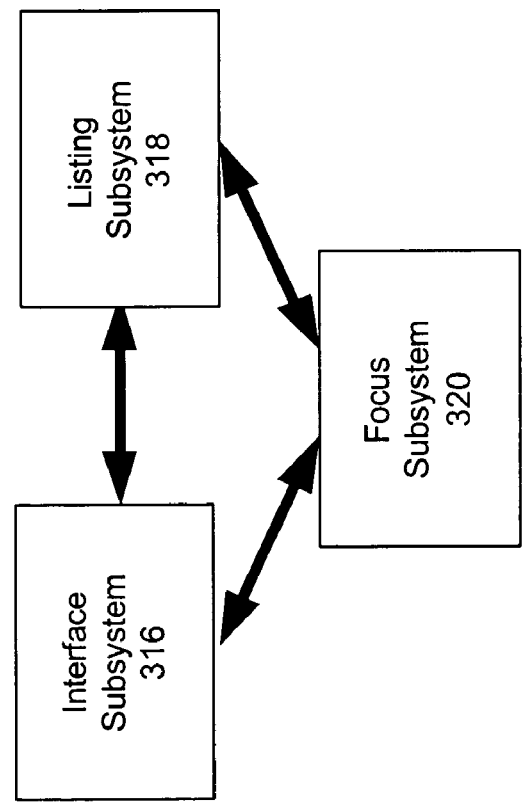
FIG. 9b is a block diagram illustrating one example of a subsystem-level view of the system that includes an interface subsystem, a listing subsystem, and a focus subsystem.

FIG. 9b is a block diagram illustrating one example of a subsystem-level view of the system 100 that includes an interface subsystem 316, a listing subsystem 318, and a focus subsystem 320. The focus subsystem 320 provides the means for "focusing" the listings 104 made accessible to the user 130 in responses 144 to requests 132. The focus subsystem 318 includes all of the administrative rules 122, including the various data hierarchies defined by the administrator 160.

The focus subsystem 320 can impact how listings 104 are created, transmitted to, stored, updated, or deleted by the listing subsystem 318. The focus subsystem 320 can also impact how information from the interface subsystem 316 is used to obtain responses 144 from the listing subsystem 318. The administrative rules 122 that make up the focus subsystem 320 are described above, and specific examples of those rules being implemented by the system 100 to focus various requests 132 are discussed below.

VIII. Process-Flow Views

A. System-Process Flow

FIG. 10 is a flow chart diagram illustrating one example of a process that can be performed by an administrator 160 using the system 100.

At 350, the administrative rules 122 are defined by the administrator 160.

At 352, a database structure 126 of listings 104 is maintained. As discussed above, listings 104 are typically stored as listing records 128 within the database structure 126.

At 354, a request 132 is received from a user 130.

At 356, two or more relevant groups 232 are identified to be included in the response 144. The groups 232 can also be populated with other appropriate listings 104 during this step.

At 358, the listings 104, including those within the groups 232, are ordered and positioned in accordance with the placement heuristic 174 (which can also be a referred to as a position heuristic).

At 360, the response 144 can then be transmitted back to the user 130. The user 130 can interact with the response 144 by activating links, calling the advertiser 102 on the phone, or any other type of follow-up activities. In some embodiments of the system 100, the user 130 may click a link within the listing 104 to have the user access device 140 automatically call the advertiser 102 over an Internet phone service. The user 130 may invoke a compare function to place two listings 104 adjacent to each other in order to better compare the merits to the two advertisers 102 and the two listings 104. In some embodiments, as described below, the user 130 may also toggle between detailed views 127 and summary views 129 of particular listing records 128.

B. Advertiser-Process Flow

FIG. 11 is a flow chart diagram illustrating one example of a process that can be performed by an advertiser 102 that submits a listing 104 to the system 100.

At 362, the advertiser 102 submits information for the listing 104. This can be done electronically through the system 100, or through more traditional hard-copy means.

At 364, listings 104 are associated with various listing attributes 106. This process can involve both the advertiser 102 and the administrator 160. The advertiser 102 can play a part in identifying the audience for the listing 104, but the administrator 160 can play an important role in placing the particular listing 104 into the context of various group hierarchies 178 that are discussed above.

At 366, advertisers 102 can interact with users 102 after those users 130 access the particular listing 104 as part of one or more responses 144.

At 368, advertisers 102 can view various reports relating to listing attributes 106 and various traffic metrics. Traffic metrics are any numerical measurements relating to the "traffic" experienced by one or more of the listings 104 associated with the particular advertiser 102. Different traffic metrics can relate to different periods of time, and different types of user 130 interactions.

At 370, advertisers 102 can choose to update their listings 104, including potentially changing the fee types 112 the advertiser 102 is willing to pay to the administrator 160 in light of the reports, described below, generated by the system 100.

C. User-Process Flow

Figure 12:
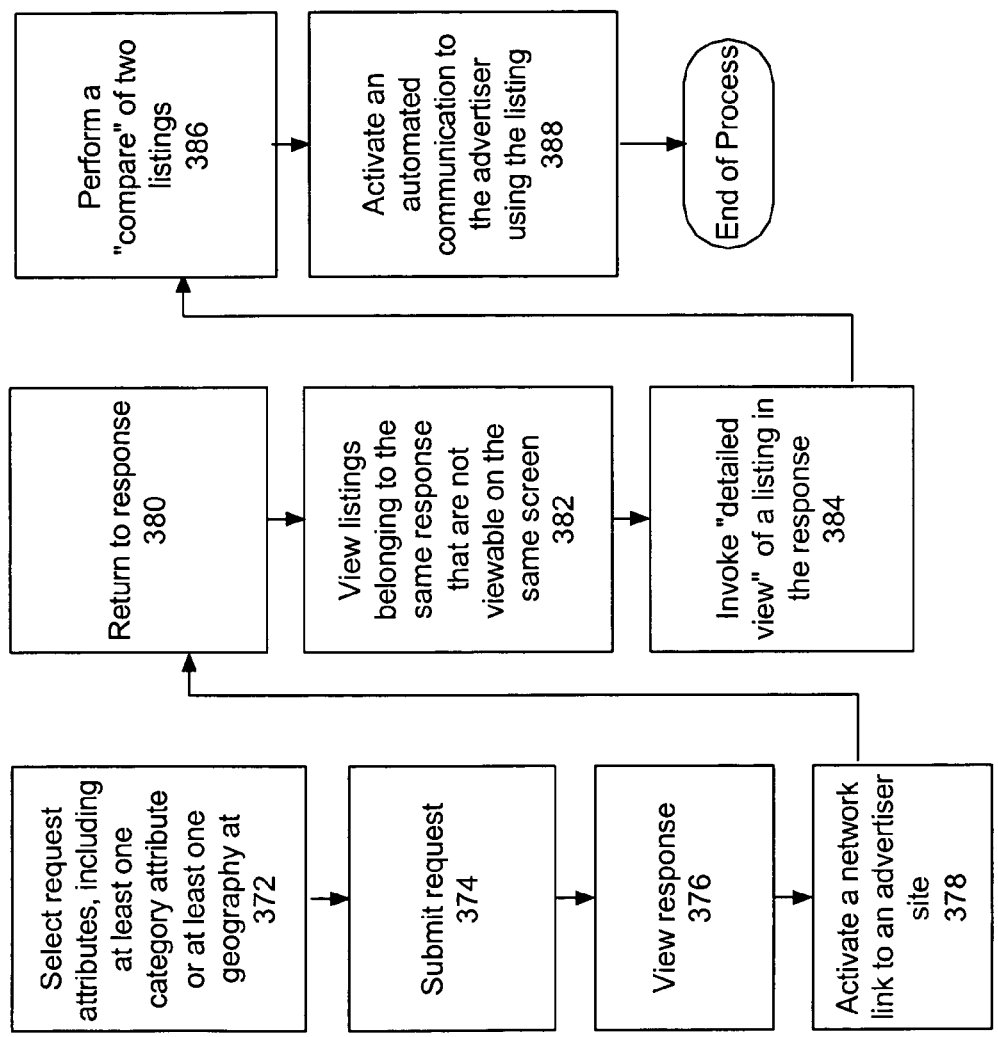
FIG. 12 is a flow chart diagram illustrating one example of a process that can be performed by a user of the system.

FIG. 12 is a flow chart diagram illustrating one example of a process that can be performed by a user 130 of the system 100.

At 372, the user 130 selects the request attributes 134 to be included in the request 132. This can involve making directory selections, as well as typing in text, or otherwise providing the input to better focus the desires of the user 130.

At 374, the user 130 submits the request 132.

At 376, the user 130 views the response 144.

At 378, the user 130 can use one of the listings 104 to activate a network link to an advertiser 102 website or other network location.

At 380, the user 130 can use the user interface 142 to return to the response 144.

At 382, the user 130 can view listings 104 belonging to the same response 144, but not displayed on the same screen. The user interface 142 can be used to scroll between different the pages on which the response 144 is displayed.

At 384, the user 130 can invoke a detailed view 127 of one or more listings 104 of interest.

At 386, the user 130 can invoke a "compare" function to place one selected listing 104 adjacent to another selected listing 104 in order to facilitate a comparison by the user 130.

At 388, the user 130 can invoke an automated communication to the advertiser 102 using the listing 104. This can involve sending an e-mail, a facsimile, a website posting, an Internet phone call, or any other type of communication known in the art.

IX. Result, Response, and Placement Heuristics

As discussed above, the system 100 can use a variety of heuristics to identify matches, and to organize the appropriate response 144 that is transmitted to users 130. The following examples are provided solely for illustration purposes, and should not be interpreted to be an exhaustive list of potential configurations.

A. Pre-Defined Group-Based Placements

As discussed above, some embodiments of the system 100 use the priority metric 179 associated with each listing 104 to perform intra-group sequencing but not inter-group sequencing. Such embodiments can be referred to as intra-group competition embodiments because the priorities between groups 232 are already predetermined. In intra-group embodiments, the placement heuristic 174 provides that certain groups 232 occupy certain locations in the response 144 given the particular request attributes 134 provided by the user 130. All of the examples below presume a match with respect to the category selection 138. The key distinguishing factors then become the geography selection 136, one or more review/rating selections 139, and the fee types 112 relating to the listings 104.

1. City and Zip Code Search

Figure 13:
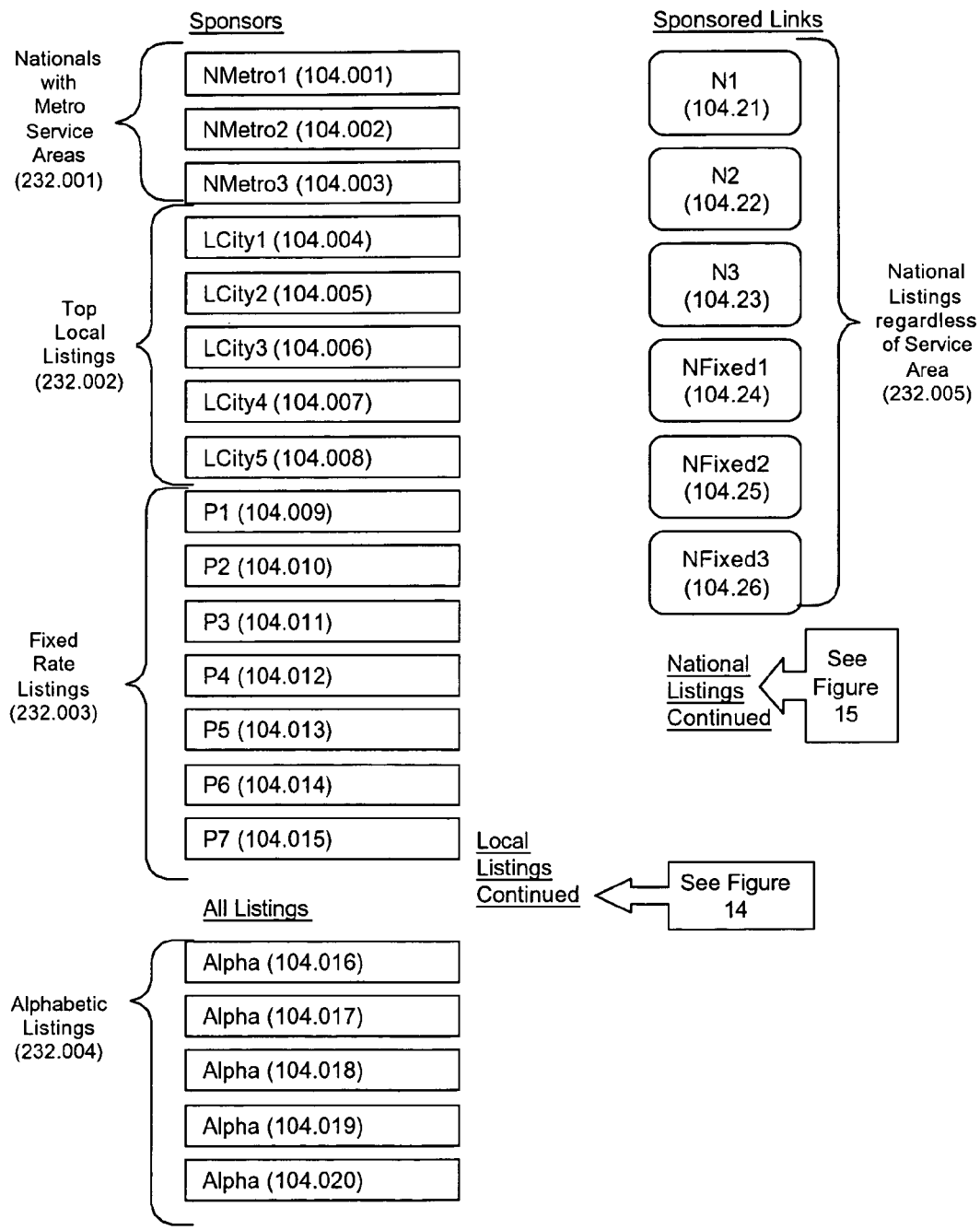
FIG. 13 is a block diagram illustrating one example of a response displayed on a screen in accordance with one embodiment of the placement heuristic after the submission of a request using city and zip code information.

FIG. 13 is a block diagram illustrating one example of a response 144 displayed on a screen in accordance with one embodiment of the placement heuristic 174 after the submission of a request 132 using city and/or zip code information. The request 132 submitted by the user 130 includes a local geography selection 136, and thus the response heuristic 172 in this particular example is configured to give priority to the smallest geographical regions (whether as a service area or the geographical scope of the advertiser 102).

On the left side of the screen are the various groups 232 with predetermined locations within the response 144. At the top left corner of the screen is a group of National Advertisers with Metro Service Areas (NMetro) 232.001 that match the geography selection 136 and possess per-hit fee amounts 113 that exceed $0.00/hit. The listings 104 associated with the applicable NMetro group 232.001 that possess the highest three priority metrics 179 are listed in order of their perspective priority metrics 179, NMetro1 (104.001), NMetro2 (104.002), and NMetro3 (104.003). As discussed above, the per-hit fee amount 113 associated with the various listings 104 can be one of many potential inputs to the priority metric 179 calculation.

The second group 232 displayed in the response 144 is the group 232 that includes local geography regions with local service areas (LCity) 232.002. This group 232.002 is also associated with per-hit fee amounts 113 that exceed $0.00/hit. The LCity listings 104 associated with the five highest priority metrics 179 within that group are displayed on the first screen, which is the screen displayed in the Figure.

The third group 232.003 displayed in the response 144 is made up of "premium advertisers" (P) (104.009-104.015), advertisers 102 associated with a monthly fixed fee 222. The priority metric 179 for this group 232.003 in this particular embodiment focuses on seniority, which is a particular example of a position adjustment factor 176 because all of the advertisers 102 in this group pay the same monthly fee.

The fourth group (alphabetic listings 232.004) at the bottom left hand portion of the screen are advertisers 102 sorted alphabetically. This group 232.004 can include both paid and unpaid listings 104. The priority metric 179 for this group provides "points" based solely on the relative position of the advertiser 102 name with respect to the sequence of the alphabet.

On the right side of the screen are sponsored links of national advertisers 102 regardless of the existence of a matching local service area (N) 232.005. N1 104.21, N2 104.22, and N3 104.23 are the top priority metric 179 listings associated with a per-hit fee amount 113. NFixed1 104.24, NFixed2 104.25, and NFixed3 104.26, are the three highest priority metrics 179 among the listings 104 associated with fixed fee amounts 111.

As disclosed in the Figure, the response 144 includes more than one web page of listings 104. National listings can be continued by activating the "National Listings Continued" link and local listings can be continued by activating the "Local Listings Continued" link.

a. Local Listings Continued

Figure 14:
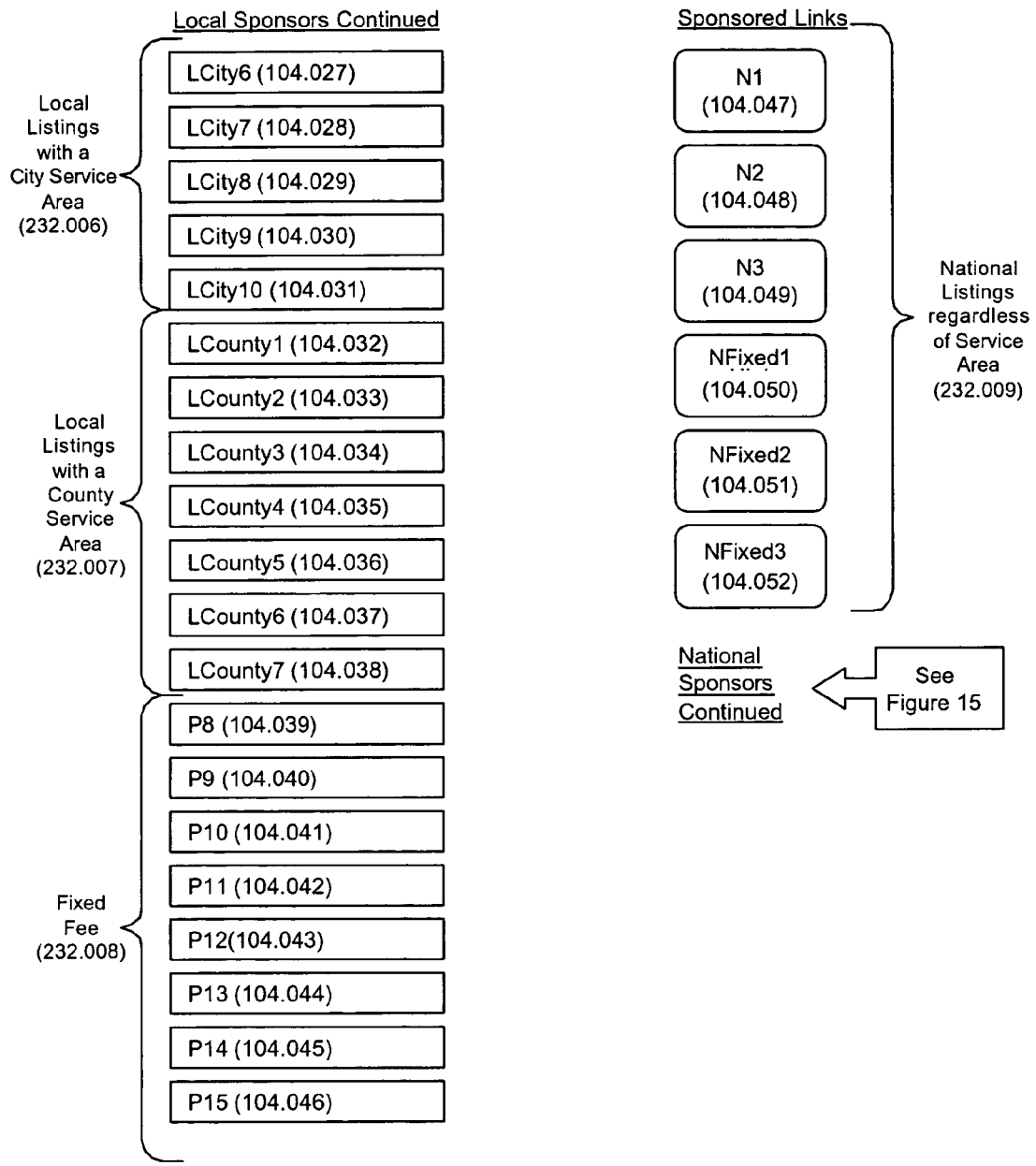
FIG. 14 is a block diagram illustrating one example of the response displayed on a continuation screen in accordance with one embodiment of the placement heuristic after the submission of a request using city and zip code information and subsequent scrolling by a user for more local listings.

FIG. 14 is a block diagram illustrating one example of the second screen of the response 144 in accordance with one embodiment of the placement heuristic 174 after the submission of a request using city and zip code information and subsequent scrolling by a user for more local listings.

The first group displayed on the screen is a continuation of the LCity group displayed in FIG. 13. This group includes LCity6 104.027 through LCity10 104.031.

The second group displayed on the screen is a group that does not appear in FIG. 13, it is the group of local listings with county-based service areas and non-zero per-hit amounts (LCounty) 232.007. LCounty1 104.032 through LCounty7 104.038 are sorted in order of the priority metric 179

The third group displayed on the screen is a continuation of the same premium advertiser group (P) 232.008 that appears on FIG. 13.

The national sponsored links NFixed1 104.047 through NFixed3 104.052 on the right side of the screen are preferably the same national sponsored links that were displayed on the initial response 144 screen; however, these national sponsored links can be different.

b. National Listings Continued

Figure 15:
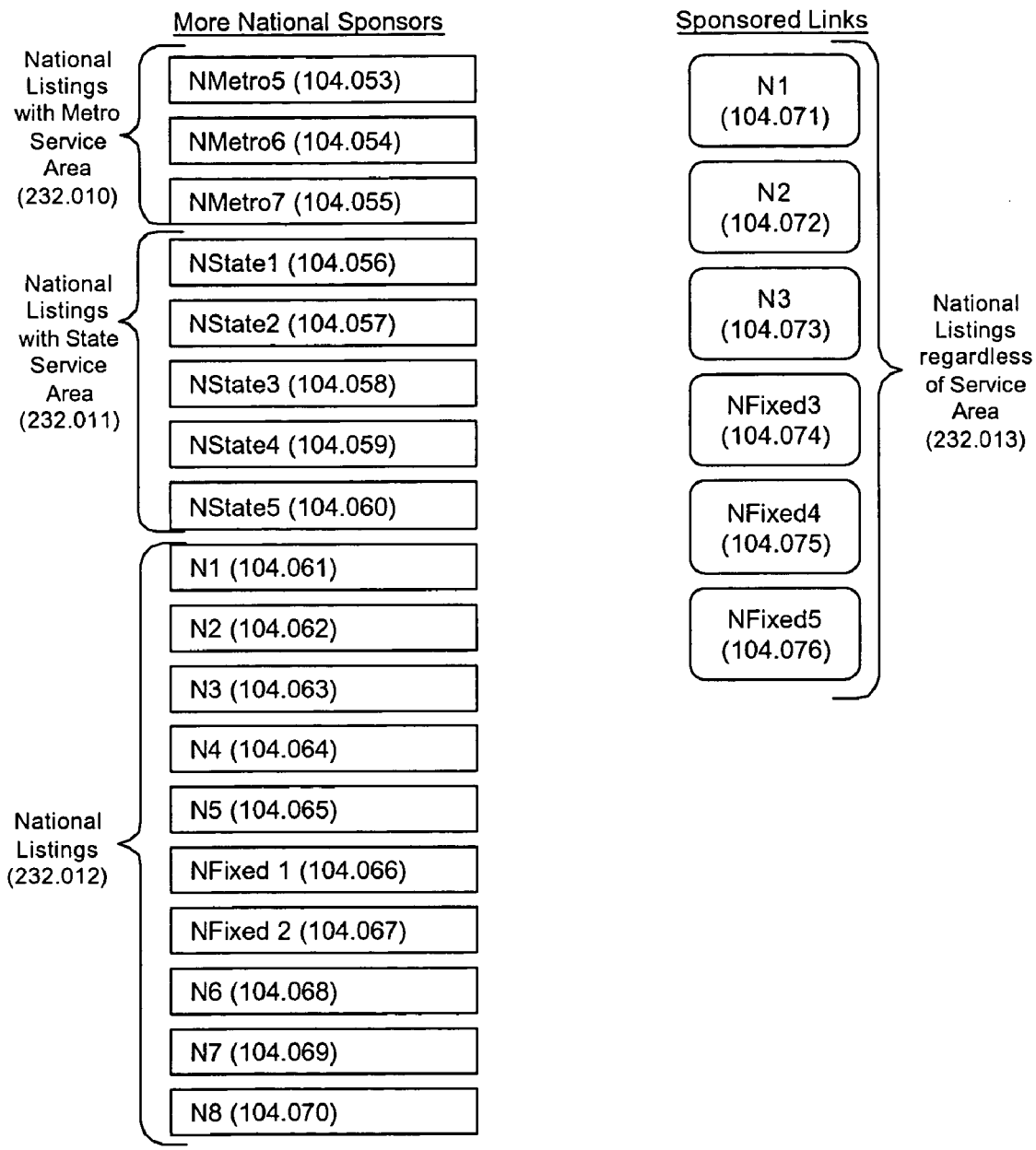
FIG. 15 is a block diagram illustrating one example of the second screen of response displayed on a continuation screen in accordance with one embodiments of the placement heuristic after the submission of a request using city and zip code information and subsequent scrolling by a user for more national listings.

FIG. 15 is a block diagram illustrating one example of the second screen of response 144 displayed on a continuation screen in accordance with one embodiments of the placement heuristic 174 after the submission of a request 132 using city and zip code information and subsequent scrolling by a user for more national listings.

The NMetro group 232.010 is a continuation of the NMetro group 232.001 on FIG. 13. The priority metric 179 determines which listings 104 in this group 232.010 are displayed.

The next group 232 displayed on the screen is a group of national advertisers with state-level service areas (NState) 232.011. NState1 104.056 through NState5 104.060 are selected on the basis of their respective priority metric 179, which includes the per-hit fee amount 113 as one of the inputs.

The third group on the bottom left portion of the screen is made up of national listings without local or state service areas (group 232.012). This group 232.012 includes both fixed fee listings (104.066 and 104.067) as well as per-hit fee amount listings 104. In this particular example, the placement heuristic 174 reserves locations 6 and 7 within this group for fixed fee amount listings. This group 232.012 is an example of group that includes both per-hit and fixed fee listings in the same group. Such a characteristic is predefined by the administrator 160 in the form of the administrative rules 122.

The national listings on the right side of the screen are the same as on the two previous figures. FIGS. 13, 14, and 15 are all part of the same response 144.

2. State Search

Figure 16:
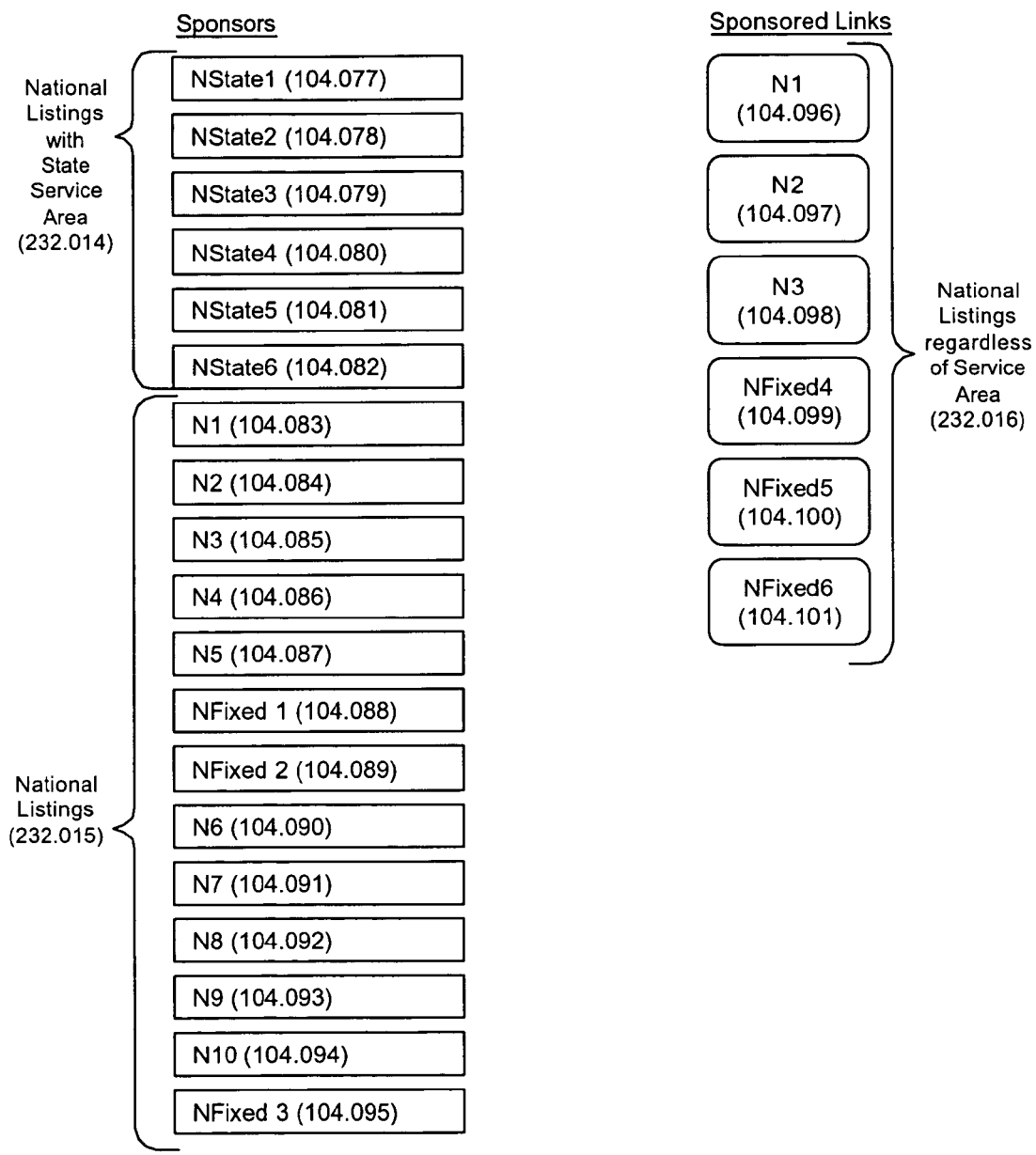
FIG. 16 is a block diagram illustrating one example of a response displayed on a screen in accordance with one embodiment of the placement heuristic after the submission of a request using state information.

FIG. 16 is a block diagram illustrating one example of a response 144 displayed on a screen in accordance with one embodiment of the placement heuristic 174 after the submission of a request using state geography information.

The group on the top left side of the screen is made up of national listings with state service areas that are associated with per-hit amounts (NState) 232.014. NState1 104.077 through NState2 104.082 are sequenced by the placement heuristic 174 on the basis of the priority metric 179 associated with each listing. The priority metric 179 includes the per-hit fee amount as one on many forms of input.

The second group on the left side of the screen is made up of national listings without applicable state or local service areas. This group includes both fixed fee amount listings, such as NFixed1 104.088 through NFixed3 104.095 (a distinct subgroup of group 232.015) as well as per-hit fee amount listings, such as N1 104.083 through N10 104.094 (another distinct subgroup of group 232.015). Group 232.015 is an example of the placement heuristic 174 purposely interspersing fixed fee listings 104 and per-hit listings 104.

The national sponsored links on the right side of the screen are the same as those displayed on FIGS. 13-15.

3. Business Name or Phone Number Search

Figure 17:
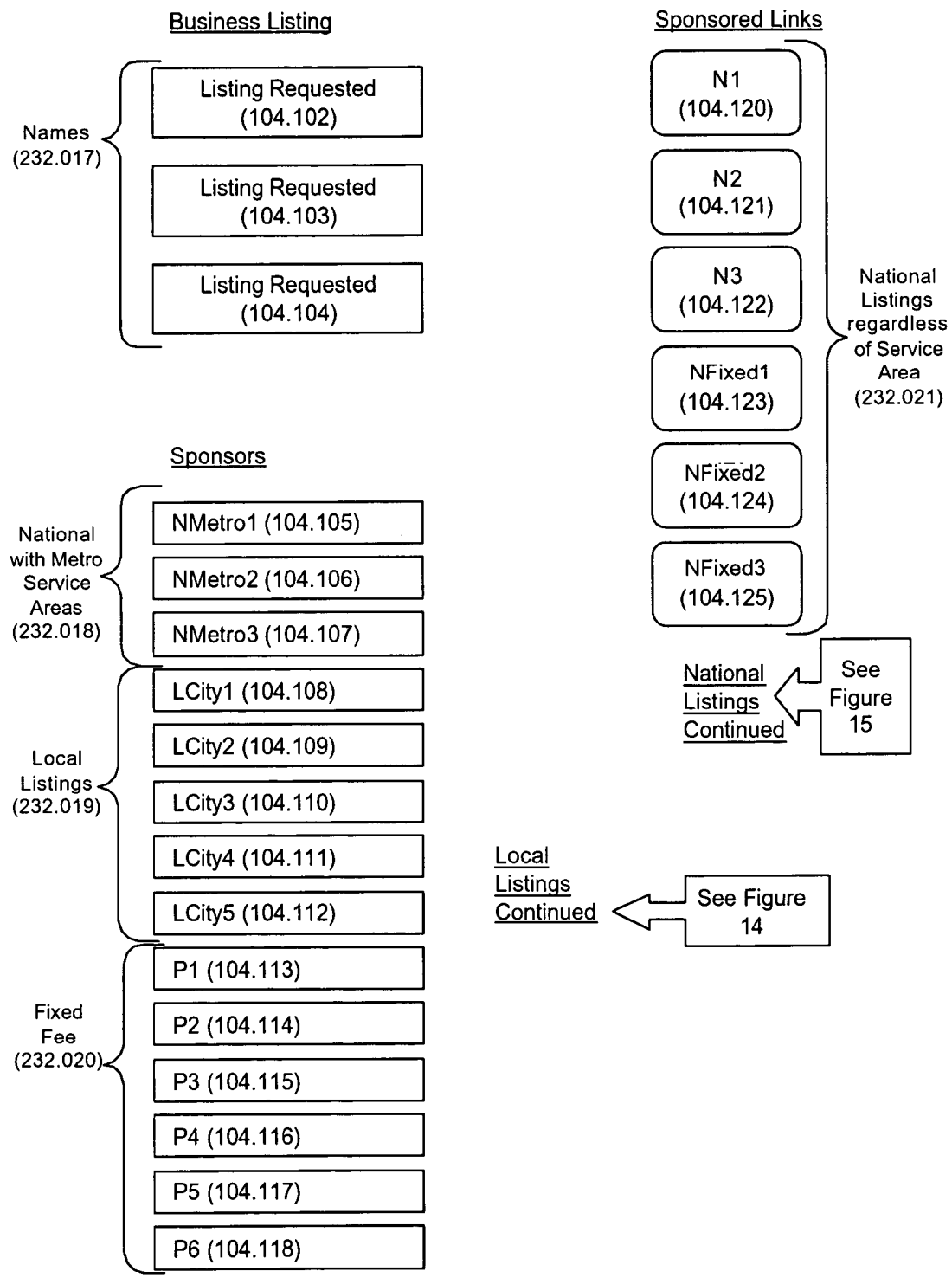
FIG. 17 is a block diagram illustrating one example of a response displayed on a screen in accordance with one embodiment of the placement heuristic after the submission of a request using a business name or phone number.

FIG. 17 is a block diagram illustrating one example of a response displayed on a screen in accordance with one embodiment of the placement heuristic 174 after the submission of a request using a business name or phone number.

The first group at the top left hand side of the screen is selected on the basis of business names or phone number. Anywhere from 1-3 listings 104 will be displayed, depending on how many listings 104 correspond to the search criteria. For example, there should only be one advertiser 102 associated with a particular phone number, but multiple advertisers 102 may share the same name. Listings 104.102 through 104.104 in Group 232.017 can be sorted in accordance with priority metric 179.

The second group 232.018 is made up of national listings associated with metro service areas (NMetro). These listings 104 are made up of national advertisers 102 who have identified a metro service area for their listing 104 that corresponds to the geography selection 136 made by the user 130. The geography selection 136 by the user 130 can correspond to the geography relating to the phone number or business name, or the geography selection 136 can relate to an affirmative geography selection 136 made by the user 130. NMetro1 104.105 through NMetro3 104.107 can be sorted on the basis of priority metric 179 associated with those listings 104.

The third group is made up of local listings with city service areas (LCity) 232.019. These listings 104 are made up of local advertisers 102 who have identified a city service area for their listing 104 that corresponds to the geography selection 136 made by the user 130. The geography selection 136 by the user 130 can correspond to the geography relating to the phone number or business name, or the geography selection 136 can relate to an affirmative geography selection 136 made by the user 130. LCity1 104.108 through LCity5 104.112 are sorted on the basis of the priority metric 179 associated with those listings 104.

The fourth group is made of fixed fee listings 104 with the same fixed fee amount 111. Thus, the distinguishing input for the priority metric 179 is the seniority of each listing 104 with respect to the system 100.

The national sponsored links on the right hand of the screen are the same as those discussed above with respect to FIGS. 13-16.

4. National Search

Figure 18:
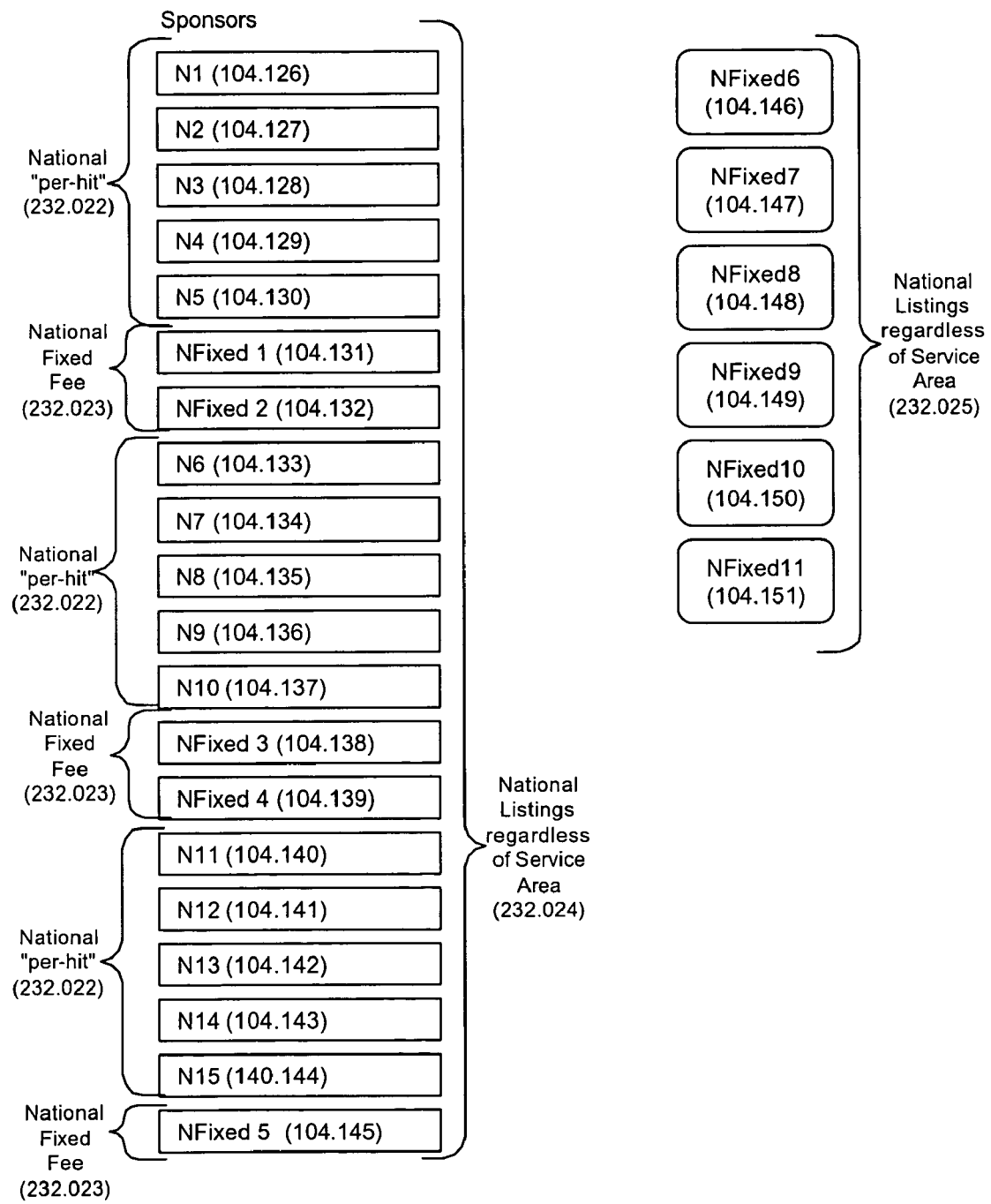
FIG. 18 is a block diagram illustrating one example of a response displayed on a screen in accordance with one embodiment of the placement heuristic after the submission of a request that includes a blank value for a geography selection.

FIG. 18 is a block diagram illustrating one example of a response 144 displayed on a screen in accordance with one embodiment of the placement heuristic 174 after the submission of a request that includes a blank value for a geography selection 136. In some embodiments, a specific button or other interface mechanism allows the user 130 to expressly select a national search. In other embodiments, a national search is performed by an absence of a geography selection 136.

The sole group 232.024 on the left side of the screen is made up of national listings without reference to any subset of service areas. This group 232.024 is made up of two sub groups, a national per-hit group (N) 232.022 and a national fixed fee group (NFixed) 232.023. These two groups are interspersed on the left side of the screen in a predefined manner as set forth by the placement heuristic 174. The system 100 can incorporate a wide variety of different arrangements for two or more groups.

The national sponsors on the right side of the screen are a continuation of the NFixed group 232.023 on the left side of the screen.

B. Calculation of Priority Metrics in Positioning of Listings

1. Priority Metrics Used for Intra-Group Sorting

Figure 19:
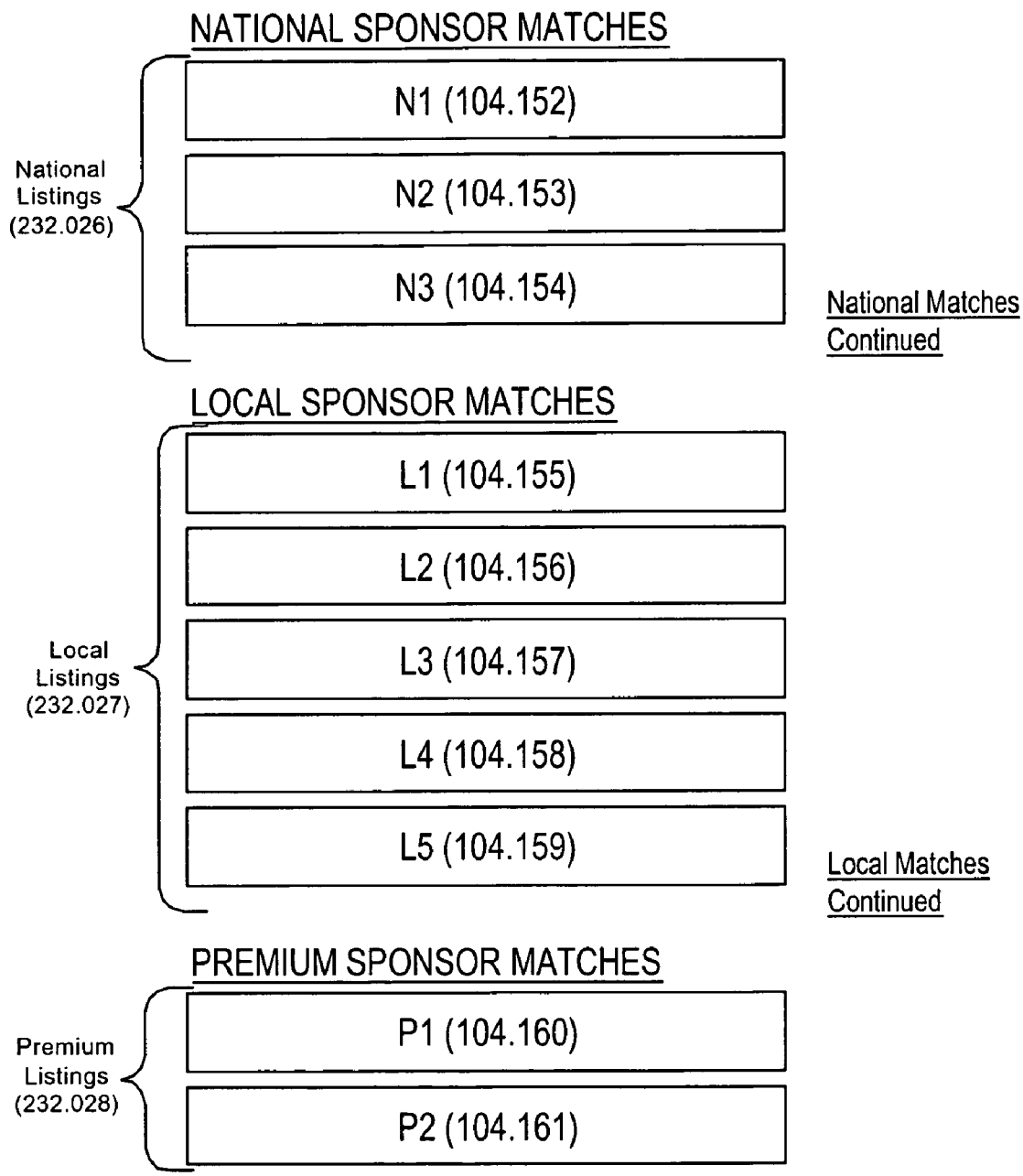
FIG. 19 is a block diagram illustrating one example of a bid-based approach where the listings are not displayed in order of bid amount.

FIG. 19 is a block diagram illustrating one example of a bid-based approach where the listings are not displayed in order of bid amount. The positions of the three groups of listings 104 in FIG. 19 are predefined by the placement heuristic 174. The intra-group positions are determined by comparing the priority metrics 179. Example A below provides an example of the underlying data that can result in the response 144 disclosed in FIG. 19.

a. EXAMPLE A

| Advertiser | Display Order (Group) | Per-Hit Fee Amount | Enhanced Display Fee | Priority Metric Value | Position Adjustment Factor | Fixed Fee |
|---|---|---|---|---|---|---|
| N1 | 1 | $0.50 | $0.00 | 50 | 0 | $0 |
| N2 | 2 | $0.55 | $0.10 | 45 | 0 | $0 |
| N3 | 3 | $0.60 | $0.20 | 40 | 0 | $0 |
| L1 | 1 | $0.39 | $0.00 | 39 | 0 | $0 |
| L2 | 2 | $0.40 | $0.05 | 35 | 0 | $0 |
| L3 | 3 | $0.40 | $0.10 | 30 | 0 | $0 |
| L4 | 4 | $0.28 | $0.00 | 28 | 0 | $0 |
| L5 | 5 | $0.30 | $0.05 | 25 | 0 | $0 |
| P1 | 1 | $0.00 | $0.00 | 10 | 10 | $100 |
| P2 | 2 | $0.00 | $0.00 | 5 | 5 | $100 |

Example A illustrates how the enhanced display fee 163 can add to the per-hit fee amount 113 for a listing 104, while decreasing the value of the per-hit fee amount 113 used to determine the priority metric 179. This is because less of the per-hit fee amount 113 is being allocated for priority metric 179 purposes. The per-hit fee amount 113 is not independent of other listing attributes 106. Thus, N2 and N3 involve a higher per-hit fee a mount 113 than N1, but N1 has a higher priority metric 179. The factors by which the per-hit fee amount 113, the enhanced display fee 163, and the position adjustment factor 176 impact the priority metric 179 can vary from embodiment to embodiment. In the example above and below, there is a 1:1 ratio between all non-monetary amounts, a $1:$1 ratio between all monetary amounts, and a $0.01:1 ratio between all monetary amounts and all numerical factors. For example, the priority metric for N2 is=Per Hit Fee Amount−Enhanced Display Fee+Position Adjustment Factor ($0.55−$0.10+0). Different embodiments may use different ratios. In some embodiments, different groups 232 within the same response can utilize different ratios. For the purposes of subsequent examples, the ratios will be kept constant.

b. EXAMPLE B

| Advertiser | Display Order (Group) | Per-Hit Fee Amount | Enhanced Display Fee | Priority Metric Value | Position Adjustment Factor | Fixed Fee |
|---|---|---|---|---|---|---|
| N1 | 1 | $0.40 | $0.00 | 50 | 10 | $0 |
| N2 | 2 | $0.45 | $0.00 | 45 | 0 | $0 |
| N3 | 3 | $0.35 | $0.00 | 44 | 9 | $0 |
| L1 | 1 | $0.39 | $0.00 | 39 | 0 | $0 |
| L2 | 2 | $0.35 | $0.00 | 35 | 0 | $0 |
| L3 | 3 | $0.40 | $0.00 | 40 | 0 | $0 |
| L4 | 4 | $0.28 | $0.00 | 28 | 0 | $0 |
| L5 | 5 | $0.30 | $0.00 | 25 | 0 | $0 |
| P1 | 1 | $0.00 | $0.00 | 10 | 10 | $100 |
| P2 | 2 | $0.00 | $0.00 | 15 | 5 | $100 |

Example B illustrates how the position adjustment factor 176 can increase the value of the priority metric 179 such that listings 104 associated with lower per-hit fees 113 can end up with more desirable positions within the sequence.

c. EXAMPLE C

| Advertiser | Display Order (Group) | Per-Hit Fee Amount | Enhanced Display Fee | Priority Metric Value | Position Adjustment Factor | Fixed Fee |
|---|---|---|---|---|---|---|
| N1 | 1 | $0.40 | $0.00 | 50 | 10 | $0 |
| N2 | 2 | $0.45 | $0.10 | 45 | 10 | $0 |
| N3 | 3 | $0.35 | $0.00 | 35 | 0 | $0 |
| L1 | 1 | $0.39 | $0.00 | 39 | 0 | $0 |
| L2 | 2 | $0.35 | $0.00 | 35 | 0 | $0 |
| L3 | 3 | $0.10 | $0.00 | 40 | 30 | $0 |
| L4 | 4 | $0.28 | $0.00 | 28 | 0 | $0 |
| L5 | 5 | $0.30 | $0.05 | 25 | 0 | $0 |
| P1 | 1 | $0.00 | $0.00 | 10 | 10 | $100 |
| P2 | 2 | $0.00 | $0.00 | 5 | 5 | $100 |

Example C illustrates an example that includes both enhanced display fees 163 and position adjustment factors 176. As illustrated in the example, these two attributes can offset each other to some extent.

d. EXAMPLE D

| Advertiser | Display Order (Group) | Per-Hit Fee Amount | Enhanced Display Fee | Priority Metric Value | Position Adjustment Factor | Fixed Fee |
|---|---|---|---|---|---|---|
| N1 | 1 or 2 | $0.19 | $0.00 | 20 | 0 | $0 |
| N2 | 1 or 2 | $0.13 | $0.00 | 20 | 0 | $0 |
| N3 | 3 | $0.07 | $0.00 | 10 | 0 | $0 |
| L1 | 1 | $0.39 | $0.00 | 39 | 0 | $0 |
| L2 | 2 | $0.35 | $0.00 | 35 | 0 | $0 |
| L3 | 3 | $0.10 | $0.00 | 40 | 30 | $0 |
| L4 | 4 | $0.28 | $0.00 | 28 | 0 | $0 |
| L5 | 5 | $0.30 | $0.05 | 25 | 0 | $0 |
| P1 | 1 | $0.00 | $0.00 | 10 | 10 | $100 |
| P2 | 2 | $0.00 | $0.00 | 5 | 5 | $100 |

Example D illustrates an example that includes bid tiers 169 for the national advertisers 102. Bids from $0.01 through $0.10 belong to same tier. Bids $0.11 through $0.20 belong to the same tier, and so on and so forth. Within a bid tier 169, each listing 104 has the same priority metric 179.

e. EXAMPLE E

| Advertiser | Display Order (Group) | Per-Hit Fee Amount | Enhanced Display Fee | Priority Metric Value | Position Adjustment Factor | Fixed Fee |
|---|---|---|---|---|---|---|
| N1 | 1 | $0.30 | $0.00 | 30 | 0 | $0 |
| N2 | 2 | $0.24 | $0.00 | 24 | 0 | $0 |
| N3 | 3 | $0.20 | $0.00 | 20 | 0 | $0 |
| L1 | 1 | $0.45 | $0.00 | 45 | 0 | $0 |
| L2 | 2 | $0.44 | $0.00 | 44 | 0 | $0 |
| L3 | 3 | $0.43 | $0.00 | 43 | 0 | $0 |
| L4 | 4 | $0.41 | $0.00 | 41 | 0 | $0 |
| L5 | 5 | $0.40 | $0.00 | 40 | 0 | $0 |
| P1 | 1 | $0.00 | $0.00 | 10 | 10 | $100 |
| P2 | 2 | $0.00 | $0.00 | 5 | 5 | $100 |

Example E illustrates an example where different groups have different minimum bids. In the example above, national listings have minimum per-hit fee amounts 113 of $0.20 while local listings have minimum per-hit fee amounts 113 of $0.40.

f. EXAMPLE F

| Advertiser | Display Order (Group) | Per-Hit Fee Amount | Enhanced Display Fee | Priority Metric Value | Position Adjustment Factor | Fixed Fee |
|---|---|---|---|---|---|---|
| N1 | 1 | $0.60 | $0.00 | 60 | 0 | $0 |
| N2 | 2 | $0.50 | $0.00 | 50 | 0 | $0 |
| N3 | 3 | $0.40 | $0.00 | 40 | 0 | $0 |
| L1 | 1 | $0.70 | $0.00 | 70 | 0 | $0 |
| L2 | 2 | $0.65 | $0.00 | 65 | 0 | $0 |
| L3 | 3 | $0.60 | $0.00 | 60 | 0 | $0 |
| L4 | 4 | $0.55 | $0.00 | 55 | 0 | $0 |
| L5 | 5 | $0.50 | $0.00 | 50 | 0 | $0 |
| P1 | 1 | $0.00 | $0.00 | 10 | 10 | $100 |
| P2 | 2 | $0.00 | $0.00 | 5 | 5 | $100 |

Example F illustrates an example similar to Example E, except that in addition to the minimum bid restrictions, there are also minimum bid increments 167 for listings 104 in both the national and local groups. The minimum bid increment for national listings 104 in this example is $0.10 and the minimum bid increment for local listings 104 is $0.05. The minimum bid for national listings is $0.40 and the minimum bid for local listings is $0.50.

g. EXAMPLE G

| Advertiser | Display Order | Per-Hit Fee Amount | Enhanced Display Fee | Priority Metric Value | Position Adjustment Factor | Fixed Fee |
|---|---|---|---|---|---|---|
| N1 | 1 | $0.54 | $0.00 | 64 | 10 | $0 |
| N2 | 2 | $0.58 | $0.00 | 58 | 0 | $0 |
| N3 | 3 | $0.57 | $0.00 | 57 | 0 | $0 |
| N4 | 4 | $0.56 | $0.00 | 56 | 0 | $0 |
| N5 | 5 | $0.55 | $0.00 | 65 | 0 | $0 |
| N6 | 6 | $0.54 | $0.00 | 54 | 0 | $0 |
| N7 | 7 | $0.53 | $0.00 | 53 | 0 | $0 |
| N8 | 8 | $0.52 | $0.00 | 52 | 0 | $0 |
| N9 | 9 | $0.51 | $0.00 | 51 | 0 | $0 |
| N10 | 10 | $0.50 | $0.00 | 50 | 0 | $0 |

Example G and subsequent examples do not relate to FIG. 19. Example G illustrates an example of a single group response 144 where the listing 104 with the highest per-hit fee 113 does not possess the highest priority metric 179 due to a position adjustment factor 176 associated with another listing 104.

h. EXAMPLE H

| Advertiser | Display Order | Per-Hit Fee Amount | Priority Metric Value | Enhanced Display Fee | Priority Metric Value | Position Adjustment Factor | Fixed Fee |
|---|---|---|---|---|---|---|---|
| N1 | 1 | $0.64 | 64 | $0.00 | 64 | 0 | $0 |
| N2 | 2 | $0.68 | 58 | $0.10 | 58 | 0 | $0 |
| N3 | 3 | $0.57 | 57 | $0.00 | 57 | 0 | $0 |
| N4 | 4 | $0.56 | 56 | $0.00 | 56 | 0 | $0 |
| N5 | 5 | $0.55 | 65 | $0.00 | 65 | 0 | $0 |
| N6 | 6 | $0.54 | 54 | $0.00 | 54 | 0 | $0 |
| N7 | 7 | $0.53 | 53 | $0.00 | 53 | 0 | $0 |
| N8 | 8 | $0.52 | 52 | $0.00 | 52 | 0 | $0 |
| N9 | 9 | $0.51 | 51 | $0.00 | 51 | 0 | $0 |
| N10 | 10 | $0.50 | 50 | $0.00 | 50 | 0 | $0 |

Example H illustrates an example of a single group response 144 where the listing 104 with the highest per-hit fee amount 113 does not possess the highest value for purposes of the priority metric 179 due to an enhanced display fee 163 relating to that listing 104.

i. EXAMPLE I

| Advertiser | Display Order | Per-Hit Fee Amount | Enhanced Display Fee | Priority Metric Value | Position Adjustment Factor | Fixed Fee |
|---|---|---|---|---|---|---|
| N1 | 1 | $0.64 | $0.00 | 64 | 0 | $0 |
| N2 | 2 | $0.58 | $0.00 | 58 | 0 | $0 |
| NFixed1 | 3 | $0.00 | $0.00 | 100 | 0 | $100 |
| N3 | 4 | $0.56 | $0.00 | 56 | 0 | $0 |
| N4 | 5 | $0.55 | $0.00 | 65 | 0 | $0 |
| N5 | 6 | $0.54 | $0.00 | 54 | 0 | $0 |
| N6 | 7 | $0.53 | $0.00 | 53 | 0 | $0 |
| N7 | 8 | $0.52 | $0.00 | 52 | 0 | $0 |
| N8 | 9 | $0.51 | $0.00 | 51 | 0 | $0 |
| N9 | 10 | $0.50 | $0.00 | 50 | 0 | $0 |

Example I illustrates an example of a multiple-group response that is not sorted in order determined by the priority metric 179 because the two groups within the response have pre-defined slots reserved for a certain number of listings 104 in those groups 232. In Example I, the third spot in the display order is reserved for fixed-fee listings 104 while spots 1, 2, and 4-10 are reserved for per-hit fee amount 113 listings 104 determined in accordance with the priority metric 179. In example I, the prioritization metric 179 is limited to intra-group comparisons.

j. EXAMPLE J

| Advertiser | Display Order | Per-Hit Fee Type 1 | Per-Hit Fee Type 2 | Enhanced Display Fee | Priority Metric Value | Position Adjustment Factor |
|---|---|---|---|---|---|---|
| N1 | 1 | $0.10 | $0.64 | $0.00 | 65 | 0 |
| N2 | 2 | $0.40 | $0.58 | $0.00 | 62 | 0 |
| N3 | 3 | $0.60 | $0.56 | $0.00 | 62 | 0 |
| N4 | 4 | $0.20 | $0.55 | $0.00 | 57 | 0 |
| N5 | 5 | $0.00 | $0.54 | $0.00 | 54 | 0 |
| N6 | 6 | $0.00 | $0.53 | $0.00 | 53 | 0 |
| N7 | 7 | $0.10 | $0.52 | $0.00 | 53 | 0 |
| N8 | 8 | $0.10 | $0.51 | $0.00 | 52 | 0 |
| N9 | 9 | $1.00 | $0.10 | $0.00 | 20 | 0 |

Example J illustrates an example of a single-group response 144 that is sorted on the basis of the priority metric 179. Example J involves a situation where there is more than one type of per hit fee amount 113. For example, the per hit fee type 2 could relate to "map hits" to the advertiser's 102 website, while per hit fee type 1 could relate to "web hits." Map hits, web hits, and other types of hits are described in greater detail above. Different embodiments can involve a wide variety of different weights given to different types of per hit fee types in the calculation of the priority metric 179.

k. EXAMPLE K

| Advertiser | Display Order | Per-Hit Fee Amount | Enhanced Display Fee | Priority Metric Value | Relevance Metric | Popularity Metric |
|---|---|---|---|---|---|---|
| N1 | 1 | $0.20 | $0.00 | 80 | 10 | 50 |
| N2 | 2 | $0.58 | $0.00 | 78 | 10 | 10 |
| N3 | 3 | $0.56 | $0.00 | 74 | 0 | 18 |
| N4 | 4 | $0.63 | $0.00 | 68 | 5 | 0 |
| N5 | 5 | $0.64 | $0.00 | 64 | 0 | 0 |
| N6 | 6 | $0.53 | $0.00 | 63 | 10 | 0 |
| N7 | 7 | $0.38 | $0.00 | 53 | 15 | 0 |
| N8 | 8 | $0.51 | $0.00 | 51 | 0 | 0 |
| N9 | 9 | $0.10 | $0.00 | 10 | 0 | 0 |

Example K illustrates an example of a single-group response 144 that is sorted on the basis of the priority metric 179. Example K involves a situation where a relevance metric and a popularity metric are incorporated into the process of determining the priority metric 179 and there is a 1:1 ratio between all non-monetary amounts, a $1:$1 ratio between all monetary amounts and a $0.01:1 ratio between all monetary amounts and non-monetary amounts.

l. EXAMPLE L

| Advertiser | Display Order | Per-Hit Fee Type 1 | Per-Hit Fee Type 2 | Priority Metric Value | Hit Threshold | Time Frame (hours) |
|---|---|---|---|---|---|---|
| N1 | 1 | $0.10 | $0.80 | 65 | 1000 | 24 |
| N2 | 2 | $0.40 | $0.60 | 62 | 500 | 36 |
| N3 | 3 | $0.60 | $0.40 | 62 | 1000 | 24 |
| N4 | 4 | $0.20 | $0.20 | 57 | 0 | 0 |
| N5 | 5 | $0.00 | $0.00 | 54 | 0 | 0 |
| N6 | 6 | $0.00 | $0.00 | 53 | 0 | 0 |
| N7 | 7 | $0.10 | $0.10 | 53 | 0 | 0 |
| N8 | 8 | $0.10 | $0.10 | 52 | 0 | 0 |
| N9 | 9 | $1.00 | $1.00 | 20 | 0 | 0 |

Example L illustrates an example of a per-hit fee adjustment based on a pre-determined hit threshold. The column "Per-hit fee type 1" illustrates the fee paid for a number of hits within a predetermined time represented by the column "Time Frame" that are less than the number illustrated in the column "Hit Threshold". Once the hit threshold is reached each additional hit within the pre-determined time will be in accordance with the corresponding listing associated with the column "Per-Hit Fee Type 2". In the example, the per-hit fee for N1 increases from $0.10 to $0.80 if there are more than 1000 hits within 24 hours. The adjustment for N2 is activated after only 500 hits within 36 hours. In contrast to N1 and N2, N3 pays less per-hit once the hit threshold is reached. In many embodiments, the pre-determined time will be fixed and adjustments made to the hit threshold. Thus, the time frame will not be explicitly provided as a variable.

It is possible to have different fees as the number of hits within the pre-determined time continues to increase in accordance with a step function. In this example, only a single adjustment is shown.

m. EXAMPLE M

| Advertiser | Display Order | Per Hit Fee Type 1 | Priority Metric Value | Competitive Rank | Tier |
|---|---|---|---|---|---|
| N1 | 1, 2, or 3 | $0.90 | 90 | 1 | 1 |
| N2 | 1, 2, or 3 | $0.80 | 80 | 2 | 1 |
| N3 | 1, 2, or 3 | $0.70 | 70 | 3 | 1 |
| N4 | 4, 5, or 6 | $0.68 | 68 | 4 | 2 |
| N5 | 4, 5, or 6 | $0.63 | 63 | 5 | 2 |
| N6 | 4, 5, or 6 | $0.49 | 49 | 6 | 2 |
| N7 | 7, 8, or 9 | $0.47 | 47 | 7 | 3 |
| N8 | 7, 8, or 9 | $0.30 | 30 | 8 | 3 |
| N9 | 7, 8, or 9 | $0.20 | 20 | 9 | 3 |

Example M illustrates an example of a multiple-tier 169 response 144. In the example, there are three tiers 169 that are made up of three listings 104 each. The tier placement heuristic 176 for each tier 169 in the example is a random heuristic. Thus, although N3 has underbid N1 by $0.20/hit, N1, N2 and N3 each have a 1/3 probability of being listing first in the particular response 144.

n. EXAMPLE N

| Advertiser | Display Order (Group) | Per-Hit Fee Amount | Rating | Priority Metric Value | Position Adjustment Factor | Fixed Fee |
|---|---|---|---|---|---|---|
| N1 | 1 | $0.50 | 10 | 10.5 | 0 | $0 |
| N2 | 2 | $0.55 | 9 | 9.55 | 0 | $0 |
| N3 | 3 | $0.60 | 8 | 8.6 | 0 | $0 |
| L1 | 1 | $0.39 | 10 | 10.39 | 0 | $0 |
| L2 | 2 | $0.40 | 8 | 8.4 | 0 | $0 |
| L3 | 3 | $0.40 | 8 | 8.4 | 0 | $0 |
| L4 | 4 | $0.28 | 6 | 6.28 | 0 | $0 |
| L5 | 5 | $0.30 | 4 | 4.3 | 0 | $0 |
| P1 | 1 | $0.00 | 8 | 18 | 10 | $100 |
| P2 | 2 | $0.00 | 6 | 11 | 5 | $100 |

Example N illustrates how review and/or rating information 171 can effectively add to the per-hit fee amount 113 for a listing 104, while decreasing the value of the per-hit fee amount 113 used to determine the priority metric 179. That is, in this example, less of the per-hit fee amount 113 is being allocated for priority metric 179 purposes. The per-hit fee amount 113 is not independent of other listing attributes 106. Thus, N2 and N3 involve a higher per-hit fee amount 113 than N1, but N1 has a higher priority metric 179. The factors by which the per-hit fee amount 113, review and/or rating information 171, and the position adjustment factor 176 impact the priority metric 179 can vary from embodiment to embodiment. In this example, review and/or rating information 171 is effectively weighted so that review and/or rating information 171 is given more emphasis than per hit-fee amount 113. Thus, in this example, the priority metric for N2 is 9.55=Per Hit Fee Amount+Rating+Position Adjustment Factor ($0.55+9+0). Different embodiments may use different weightings or different priority metrics altogether to account for review and/or rating information 171.

As noted above, review and/or rating information 171 in some embodiments includes ratings associated with multiple review and/or rating attributes 109. Thus, the "rating" included in priority metric 179 could be a combination of ratings for various review and/or rating attributes 109 associated with a listing 104.

o. EXAMPLE O

| Advertiser | Display Order (Group) | Per-Hit Fee Amount | Rating | Enhanced Display Fee | Priority Metric Value | Position Adjustment Factor | Fixed Fee |
|---|---|---|---|---|---|---|---|
| N3 | 1 | $0.60 | 8 | $0.20 | 10.6 | 0 | $0 |
| N1 | 2 | $0.50 | 10 | $0.00 | 10.5 | 0 | $0 |
| N2 | 3 | $0.55 | 9 | $0.00 | 9.55 | 0 | $0 |
| L1 | 1 | $0.39 | 10 | $0.00 | 10.39 | 0 | $0 |
| L2 | 2 | $0.40 | 8 | $0.00 | 8.4 | 0 | $0 |
| L3 | 3 | $0.40 | 8 | $0.00 | 8.4 | 0 | $0 |
| L4 | 4 | $0.28 | 6 | $0.00 | 6.28 | 0 | $0 |
| L5 | 5 | $0.30 | 4 | $0.00 | 4.3 | 0 | $0 |
| P1 | 1 | $0.00 | 8 | $0.00 | 18 | 10 | $100 |
| P2 | 2 | $0.00 | 6 | $0.00 | 11 | 5 | $100 |

Example O shows an instance in which an advertiser 102 (N3) with a lower rating than other advertisers 102 (N1 and N2) is nonetheless displayed as the first listing 104 in its group because of an enhanced display fee and a higher per-hit fee amount 113. In this example, priority metric 179 for N3 is 10.6=Per Hit Fee Amount+Rating+Position Adjustment Factor+(Enhanced Display Fee)*10 ($0.60+8+0+($0.20)(10)).

p. EXAMPLE P

| Advertiser | Display Order (Group) | Per-Hit Fee Amount | Rating | Ratings Tier Assigned Weight | Priority Metric Value | Position Adjustment Factor | Fixed Fee |
|---|---|---|---|---|---|---|---|
| N2 | 1 | $0.55 | 9 | 1.25 | 11.8 | 0 | $0 |
| N3 | 2 | $0.60 | 8 | 1.25 | 10.6 | 0 | $0 |
| N1 | 3 | $0.50 | 10 | 0.75 | 8.0 | 0 | $0 |
| L1 | 1 | $0.39 | 10 | 1 | 10.4 | 0 | $0 |
| L2 | 2 | $0.40 | 8 | 1 | 8.4 | 0 | $0 |
| L4 | 3 | $0.28 | 6 | 1.25 | 7.8 | 0 | $0 |
| L3 | 4 | $0.40 | 8 | 0.75 | 6.4 | 0 | $0 |
| L5 | 5 | $0.30 | 4 | 1 | 4.3 | 0 | $0 |
| P1 | 1 | $0.00 | 8 | 1 | 18.0 | 10 | $100 |
| P2 | 2 | $0.00 | 6 | 0.5 | 8.0 | 5 | $100 |

Example P shows an example in which ratings tiers 173 have influenced the sort order. Example P is otherwise very similar to Example N, and a comparison with Example N shows how ratings tiers 173 can influence response 144. Here the priority metric for N2 is 11.8=Per Hit Fee Amount+ (Rating)*(Ratings Tier Assigned Weight)+Position Adjustment Factor ($0.55+9+0).

2. Priority Metrics Used for Inter-Group Sorting

In one preferred embodiment, the prioritization metric 179 is limited to intra-group sequencing. In alternative embodiments, it may be used for inter-group sequencing, as illustrated in Example P.

| Advertiser | # | Per-Hit Fee Amt. | Enhanced Display Fee | Priority Metric Value | Position Adjustment Factor | Fixed Fee | Category Factor | Geography Factor | Rating |
|---|---|---|---|---|---|---|---|---|---|
| LCity2 | 2 | $0.41 | $0.06 | 95 | 0 | $0 | 10 | 30 | 8 |
| LCity1 | 1 | $0.40 | $0.00 | 89 | 0 | $0 | 10 | 30 | 9 |
| LFixed1 | 3 | $0.00 | $0.00 | 82 | 0 | $50 | 5 | 20 | 7 |
| N1 | 4 | $0.35 | $0.00 | 73 | 0 | $0 | 30 | 0 | 8 |
| N2 | 6 | $0.31 | $0.00 | 70 | 0 | $0 | 30 | 0 | 9 |
| LFixed2 | 5 | $0.00 | $0.00 | 69 | 0 | $43 | 0 | 20 | 6 |
| NFixed1 | 7 | $0.00 | $0.00 | 64 | 0 | $40 | 20 | 0 | 4 |
| LCity3 | 8 | $0.08 | $0.00 | 46 | 0 | $0 | 0 | 30 | 8 |
| N3 | 9 | $0.20 | $0.00 | 30 | 0 | $0 | 0 | 0 | 10 |

In many embodiments, the priority metric 179 will involve different ratios when dealing with fixed monetary amounts 111 than in the context of a per hit fee amount 113. Typically, either the fixed fee will need to be divided by some number or the per-hit fee amount 113 multiplied by some number in order to prevent all fixed fee listings 104 from dominating the per-hit fee listings 104. For example, the priority metric 179 in Example P above is calculated as follows: (Per Hit Fee Amount+Enhanced Display Fee)*100+Position Adjustment Factor+Fixed Fee+Category Factor+Rating. As described below, those skilled in the art will understand that the various factors used in calculating priority metric 179 can be weighted to achieve whatever results are desired.

C. Use of Information Within the Detailed View

Information within the detailed view 127 of a listing 104 can be taken into consideration by the system 100 in providing results and responses 144 to requests 132. For example, the user 130 submitting the request 132 might be interested in a particular brand of a digital camera. The category hierarchy 164 may not have enough levels to include brand identities within the category hierarchy 164. However, if the detailed view 127 for a particular listing 104 includes the particular brand, the priority metric 179 can be adjusted accordingly so that the listing 104, which includes the particular brand, receives more favorable treatment than it otherwise would.

Different embodiments can use different processes for modifying the priority metric 179 for a listing 104 on the basis of information within the detailed view 127 of the listing 104. For example, if the focus is on rating and/or review information 171, greater weight could be given to a rating for a listing 104 by multiplying it by a factor of 10, 100, or any other number. Further, as noted above, the focus on different rating and/or review attributes 109 can be fine-tuned by incorporating including only review and/or rating information 171 associated with particular review and/or rating attributes 109 into priority metric 179, or by assigning different weights within priority metric 179 to different ratings associated with various review and/or rating attributes 109.

X. Interface Views

A. Request Submission Page

FIG. 20 is a screen print illustrating an example of a request submission web page that includes various high-level categories (e.g. level 1 categories 182), and some more detailed categories (e.g. level 2 categories 184). As illustrated in the Figure, request attributes 134 can take the form of directory selections as well as the input of data by the user 130. Request attributes 134 can include text describing the product, such as brand information. Requests 132 can also include the name of a particular advertiser 102. As indicated by the word "optional," all of the geographic selections 136 are optional with respect to the particular embodiment displayed in the Figure. Other embodiments may involve different rules regarding what is or is not required. As indicated on the left side of the Figure, the illustrated embodiment provides users 130 with the ability to save requests 132, responses 144, and potentially other types of information.

FIG. 21 is a screen print illustrating an example of a request submission web page with a text string corresponding to a category selection entered by a user 130. Although the text string does not directly equate to any of the category headings displayed on the screen, submission of the text string "furniture" would constitute a category selection 138. The submission of such a request 132 would invoke the system 100 to identify the appropriate category within the category hierarchy 164 described above.

FIG. 22 is a screen print illustrating an example of a request submission web page with text strings corresponding to a category selection 138 and a geography selection 136 entered by a user 130. This Figure provides an example of request 132 that includes both a non-null category selection 138 and a non-null geography selection 136.

FIG. 23 is a screen print illustrating an example of a request submission web page displaying more detailed sub-categories associated with the higher furniture category. The categories displayed on this screen are all sub-categories of the furniture category. Thus, the potential category selections 138 on this page are significantly lower on the category hierarchy 164 than in FIGS. 20-22 discussed above. In some embodiments, as displayed in FIG. 23, fixed fee amount listings 104 can be displayed on the more detailed directory pages.

B. Response Page

FIG. 24 is a screen print illustrating an example of a web page displaying listings 104 associated with the sub-category of "room accessories." This Figure illustrates an example of a user drilling down the directory of FIG. 23, and ultimately running out of lower category level options. The system 100 reacted to the request 132 of a "room accessories" category selection 138 and a "null" or "blank" geographic selection 136. The user 130 is in the process of modifying their request 132 so that a geography selection 136 of White Plains, N.Y. will be sent to the system 100.

FIG. 25a is a top portion of a screen print illustrating an example of a web page displaying listings 104 associated with the antiques sub-category. Unlike the example in FIG. 24, FIG. 25a provides an example where there are non-null inputs for both the category selection 138 and the geography selection 136. This Figure also illustrates "compare" check boxes and a "compare" button for invoking the compare function described above. The various subdivisions among the listings 104 indicate that several different groups 232 are included in the displayed response 144. FIG. 25b is a bottom portion of the screen print in FIG. 25a.

FIG. 26a is a top portion of a screen print illustrating an example of a web page displaying listings 104 associated with the furniture category and a local geography. The listings 104 displayed on this screen illustrate some examples of enhanced displays meriting the charge of an enhanced display fee 163. For example, two of the listings 104 include text that is substantially larger in size than the other listings 104. A logo for "Freedmans furniture" is shown. Other listings 104 include a click through icon with the words "Click Here!" and the icons themselves are different. Various listings 104 include additional useful information. The various subdivisions among the listings 104 indicate that several different groups 232 are included in the displayed response 144. FIG. 26b is a bottom portion of the screen print of FIG. 26a.

FIG. 27a is a top portion of a screen print illustrating an example of a web page displaying listings 104 associated with the furniture category and a local geography. According to the note at the top of the screen, the system 100 has some reason to believe that the user 130 is interested in the antiques sub-category (see bottom of FIG. 27a and top of FIG. 27b). This could be due to a user profile, recent navigations by the user 130, or some other historical attribute. FIG. 27b is a bottom portion of the screen print in FIG. 27a.

Figure 28A:
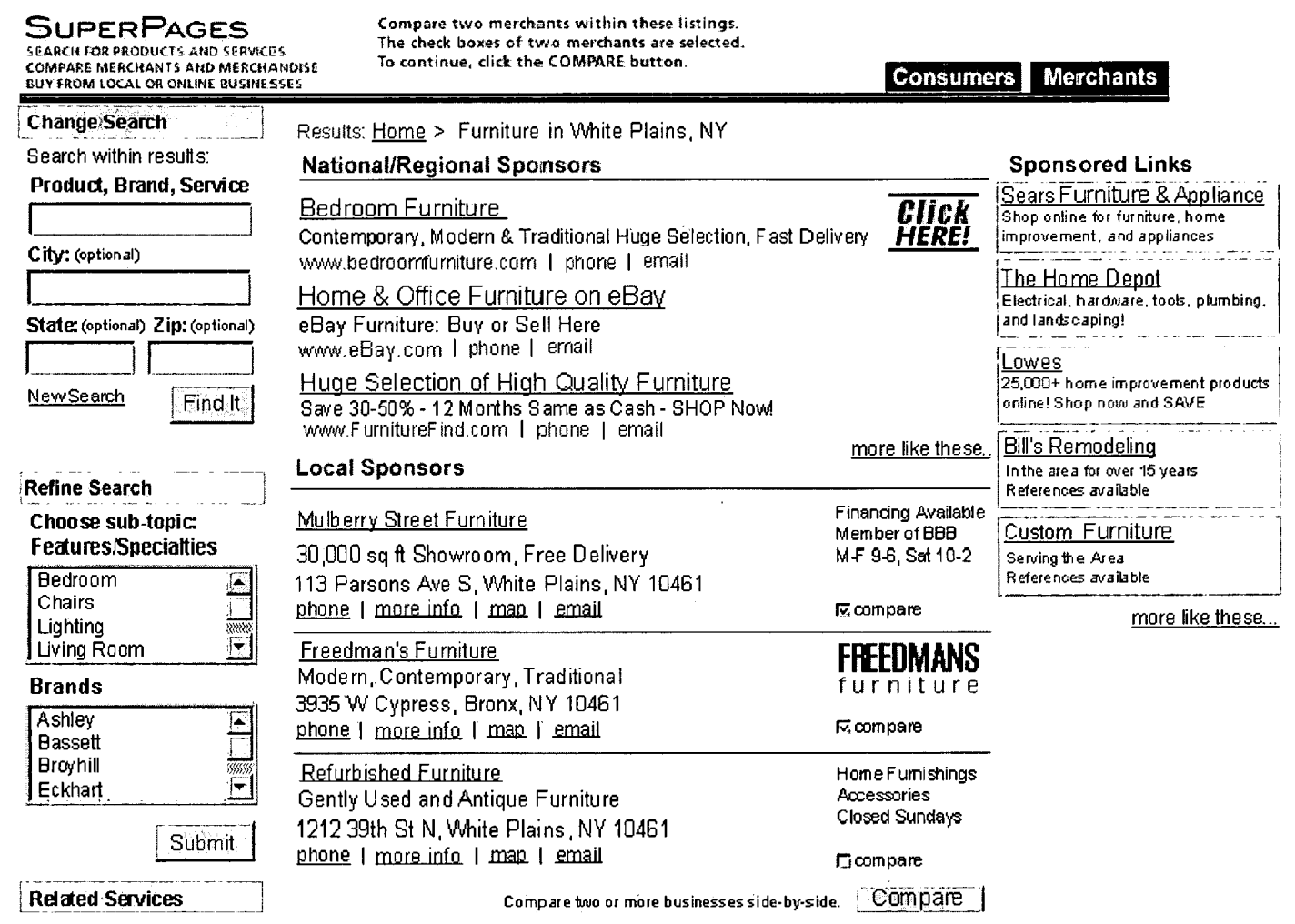

FIG. 28a is a top portion of a screen print illustrating an example of a web page displaying listings associated with the furniture category and a local geography, including two listings that have been selected for the purposes of a "compare" function. (See FIG. 36 for the result of selecting the comparison function). FIG. 28b is the bottom portion of the screen print in FIG. 28b.

FIG. 29a is a top portion of a screen print illustrating an example of a web page displaying listings associated with the furniture category and a local geography. The sub-category "living room" is highlighted from a sub-category selection window, and the top of the screen explains that the submit button should be pressed to include the category selection 138 of "living room" as part of the request 132. FIG. 29b is the bottom portion of a screen print in FIG. 29a.

FIG. 30a is a top portion of a screen print illustrating an example of a web page displaying listings associated with the furniture category and a local geography. The user 130 has activated the phone link for one of the listings 104, and the top of the screen is displaying the appropriate message. FIG. 30b is the bottom portion of the screen print in FIG. 30a.

FIG. 31a is a top portion of a screen print illustrating an example of a web page displaying listings associated with the "living room" sub-category and a local geography. In accordance with the message at the top of the screen, the e-mail link for one of the listings 104 has been highlighted, but not yet activated. FIG. 31b is the bottom portion of the screen print in FIG. 31b.

C. Contact Information Page

Figure 32:
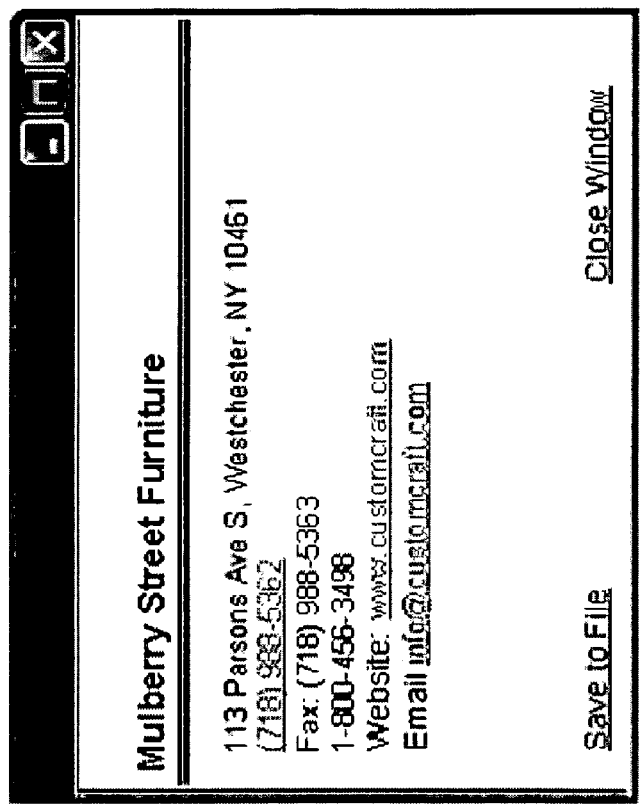
FIG. 32 is a screen print illustrating an example of an advertiser contact information web page.

FIG. 32 is a screen print illustrating an example of an advertiser contact information web page. Different advertisers 102 can include a wide variety of different contact information. One feature disclosed on this screen is the ability to invoke an Internet phone service by clicking on the phone link. Some embodiments may provide for an automated fax service. The contact information can be saved by the user 130 for future use.

D. Bid Selection Page

Figure 33:
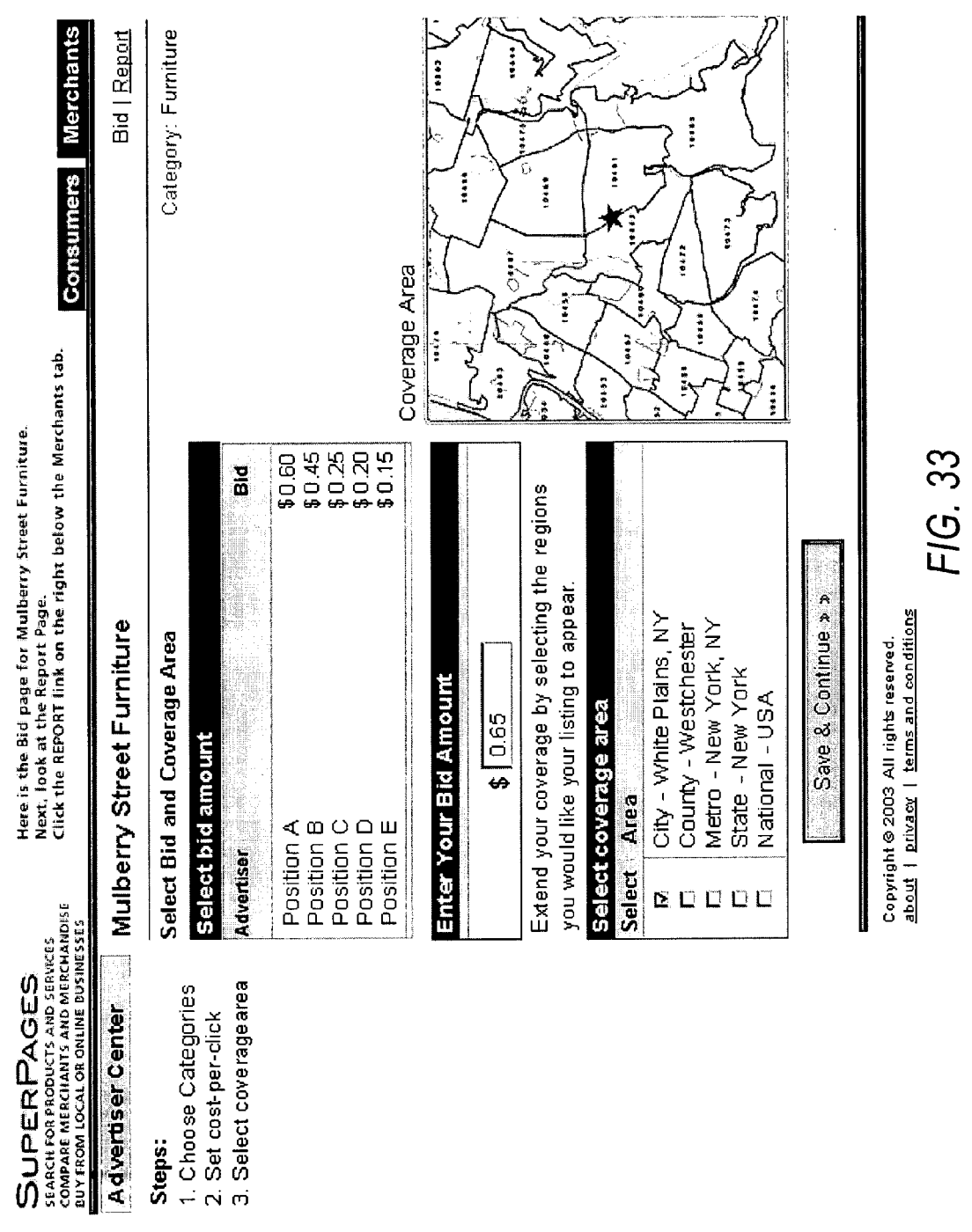

FIG. 33 is a screen print illustrating an example of a bid entry web page for use by advertisers 102. Each of the check-boxes is associated with a different geographical region, and each region can be associated with a separate bid amount. The functionality of this screen is configured by the administrative rules 122 discussed above. If the particular embodiment of the system 100 includes minimum fees 165, minimum bid increments 167, bid tiers 169, or enhanced display fees 163, those restrictions can be represented on the web page accessed by the advertiser 102.

E. Advertiser Report Page

FIG. 34 is a screen print illustrating an example of a monthly report web page accessible by advertisers 102. The disclosed web page also provides a "change" feature for the advertiser 102 to alter their bid with respect to a particular listing 104. As indicated by the Figure, categories with hierarchical relationships with each other can be associated with different bid amounts and other fees. Sofas, furniture, and interior decorating are each categories with direct relationships with each other.

F. Detailed View of a Listing

FIG. 35a is a top portion of a screen print illustrating an example of a detailed view 127 of a listing 104. FIG. 35b is the bottom portion of the screen print in FIG. 35a. Different detailed views 127 within the same response 144 may display different listing attributes 106. The administrative rules 122 can be configured to restrict certain listing attributes 106, while requiring other listing attributes 106.

G. Compare Screen

FIG. 36 is a screen print illustrating an example of a "compare" feature. Two listings 104 are displayed adjacent to each other. In alternative embodiments, different physical layouts can be used to facilitate the comparison of two or more listings 104.

H. Directions Page

Figure 37A:
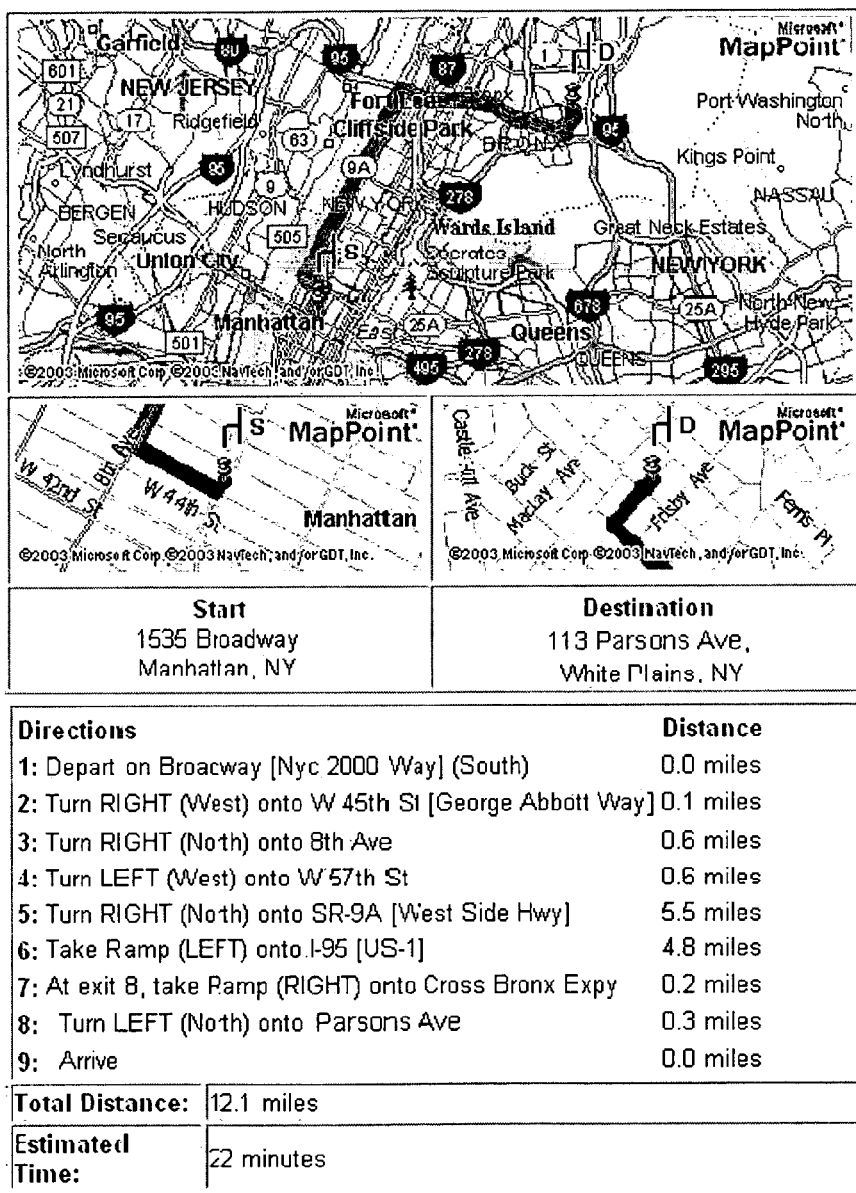
FIG. 37a is a bottom portion of a screen print illustrating an example of a "directions" feature.
Figure 37B:
FIG. 37b is a top portion of a screen print illustrating an example of a "directions" feature.

FIG. 37a is the bottom portion of a screen print illustrating an example of a "directions" feature. To reach this screen, the user 130 clicked on a "directions" link for a listing 104 within the response 144. FIG. 37b is the top portion of the screen print in FIG. 37b.

I. E-mail Function

Figure 38:
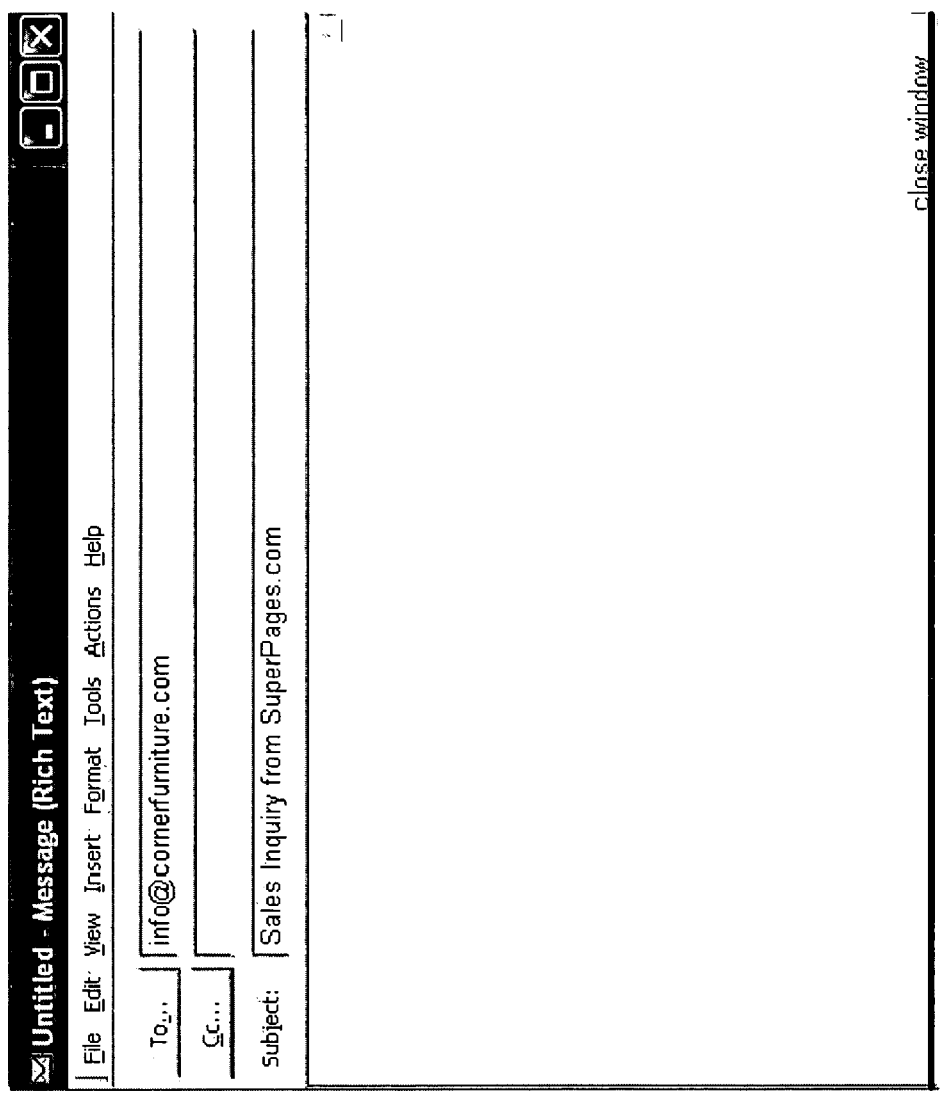
FIG. 38 is a screen print illustrating an example of an "e-mail" feature.

FIG. 38 is a screen print illustrating an example of an "e-mail" feature. E-mail links within the various listings 104 can be configured so that the advertiser 102 is made aware of the fact that the user 130 obtained the e-mail address for the advertiser 102 through the system 100. This allows the advertiser 102 to monitor the number of communications that result from system 100 communications. A per e-mail charge can be incorporated into the business relationship between the advertiser 102 and the administrator 160.

XI. Alternative Embodiments

In accordance with the provisions of the patent statutes, the principles and modes of operation of this invention have been explained and illustrated in preferred embodiments. However, it must be understood that this invention may be practiced otherwise than is specifically explained and illustrated without departing from its spirit or scope.

The invention claimed is:

1. An information distribution system, comprising:
a request subsystem, including a request, wherein said request subsystem receives said request, wherein said request includes at least one rating selection and at least one of a geography selection and a category selection; and
a response subsystem, including a response, a placement heuristic that determines an order of listings and is based at least in part on a fee amount and a rating, a plurality of listings, and a plurality of fee types;

wherein said response subsystem generates said response based upon said request and said placement heuristic;

the response subsystem including at least one priority metric that is influenced by a relevance metric that takes into consideration an estimated relevance of a particular listing to the request;

wherein said placement heuristic receives said priority metric as an input and the order of listings further based at least in part on a user profile that ranks a relative importance of the rating selection and at least one of the geography selection and the category selection;

wherein said response includes two or more listings from said plurality of listings, each listing being associated with at least one fee type in said plurality of fee types; and further wherein the rating is assigned to a ratings tier according to a source of the rating.

2. The system of claim 1, wherein said plurality of fee types comprise a fixed-fee and a per-hit fee, whereby said fee amount is based on either a fixed fee or a per hit fee.

3. The system of claim 1, wherein said placement heuristic determines an order of listings and is based at least in part on a number of ratings.

4. The system of claim 1, further comprising a results subsystem, said results subsystem including a result, wherein said response subsystem generates said response from said result based at least in part on the rating selection and one or more of the following: a category attribute, a geography attribute, and a fee amount, wherein said result includes more said listings than said response.

5. The system of claim 4, wherein said response subsystem generates said response from said result based at least in part on the rating selection and one or more of the following: a category attribute, a geography attribute, and a fee amount, wherein said result includes more said listings than said response, and further wherein a listing in the plurality of listings is included in the response only if the number of ratings associated with the listing in the plurality of listings exceeds the predetermined threshold number.

6. The system of claim 1, wherein the response subsystem is capable of determining whether there is a number of ratings associated with each of the listings that exceeds a predetermined threshold number.

7. The system of claim 1, wherein at the least one rating selection includes a plurality of rating selections associated with a plurality of rating attributes.

8. The system of claim 7, wherein the plurality of rating selections includes at least one weight that is assigned to at least one of the rating attributes.

9. The system of claim 8, further comprising a results subsystem, said results subsystem including a result, wherein said response subsystem generates said response from said result based at least in part on the rating selections and one or more of the following: a category attribute, a geography attribute, and a fee amount, wherein said result includes more said listings than said response.

10. A method, comprising:
receiving a request, wherein said request includes at least one rating selection and at least one of a geography selection and a category selection;

generating at least one priority metric that is influenced by a relevance metric that takes into consideration an estimated relevance of a particular listing to the request, said relevance being determined at least in part by a user profile that ranks a relative importance of the rating selection and at least one of the geography selection and the category selection;

generating a response based upon said request and a placement heuristic; wherein said response includes two or more listings from a plurality of listings, each listing being associated with at least one fee type in a plurality of fee types;

assigning a rating to a ratings tier according to a source of the rating; and determining an order of listings using the placement heuristic based at least in part on a fee amount and a rating associated with each of the listings, said placement heuristic receiving said priority metric as an input and determining the order of listings based at least in part on the priority metric.

11. The method of claim 10, wherein said plurality of fee types comprise a fixed-fee and a per-hit fee, whereby said fee amount is based on either a fixed fee or a per hit fee.

12. The method of claim 10, further comprising using said placement heuristic to determine an order of listings, the order of listing being based at least in part on a number of ratings.

13. The method of claim 10, further comprising:
generating a result; and
generating said response from said result based at least in part on the rating selection and at least one of the following: a category attribute, a geography attribute, and a fee amount, wherein said result includes more said listings than said response.

14. The method of claim 10, further comprising determining whether there is a number of ratings associated with each of the listings that exceeds a predetermined threshold number.

15. The method of claim 14, wherein further comprising generating said response from a result based at least in part on the rating selection and at least one of the following: a category attribute, a geography attribute, and a fee amount; wherein said result includes more said listings than said response; and further wherein a listing in the plurality of listings is included in the response only if the number of ratings associated with the listing in the plurality of listings exceeds the predetermined threshold number.

16. The method of claim 10, wherein at the least one rating selection includes a plurality of rating selections associated with a plurality of rating attributes.

17. The method of claim 16, wherein the plurality of rating selections includes at least one weight that is assigned to at least one of the rating attributes.

18. The method of claim 17, further comprising:
generating a result; and generating said response from said result based at least in part on the rating selections and one or more of the following: a category attribute, a geography attribute, and a fee amount, wherein said result includes more said listings than said response.

* * * * *